United States Patent
Shimizu

(10) Patent No.: US 11,364,824 B2
(45) Date of Patent: Jun. 21, 2022

(54) SEAT BACKREST

(71) Applicant: TS TECH CO., LTD., Asaka (JP)

(72) Inventor: Shuichi Shimizu, Tochigi (JP)

(73) Assignee: TS TECH CO., LTD., Asaka (JP)

(*) Notice: Subject to any disclaimer, the term of this patent is extended or adjusted under 35 U.S.C. 154(b) by 0 days.

(21) Appl. No.: 17/002,198

(22) Filed: Aug. 25, 2020

(65) Prior Publication Data

US 2020/0406796 A1 Dec. 31, 2020

Related U.S. Application Data

(63) Continuation of application No. 16/378,621, filed on Apr. 9, 2019, now abandoned, which is a continuation
(Continued)

(30) Foreign Application Priority Data

Oct. 1, 2012 (JP) .................................. 2012-219610

(51) Int. Cl.
*B60N 2/42* (2006.01)
*B60N 2/68* (2006.01)
(Continued)

(52) U.S. Cl.
CPC ....... *B60N 2/4228* (2013.01); *B60N 2/42745* (2013.01); *B60N 2/665* (2015.04); *B60N 2/68* (2013.01)

(58) Field of Classification Search
CPC ........ B60N 2/665; B60N 2/4228; B60N 2/68; B60N 2/42745; B60N 2/42; B60N 2/64
(Continued)

(56) References Cited

U.S. PATENT DOCUMENTS 4,678,230 A 7/1987 Winkle
4,893,873 A 1/1990 Iwamoto et al.
(Continued)

FOREIGN PATENT DOCUMENTS

CN 1950237 A 4/2007
CN 102015363 A 4/2011
(Continued)

OTHER PUBLICATIONS

Aug. 4, 2020 Office Action issued in Japanese Application No. 2019-209242.
(Continued)

*Primary Examiner* — Milton Nelson, Jr.
(74) *Attorney, Agent, or Firm* — Oliff PLC

(57) ABSTRACT

A seat backrest includes right and left side frame segments, a pressure receiving member disposed between the side frame segments movably in a front-back direction, and a cushion pad covering the front of the side frame segments and pressure receiving member. The pressure receiving member includes a main body part, and extending parts extending laterally from both sides of the main body part. The cushion pad includes a back receiving part covering the front of the main body part, and bank parts disposed on both sides of the back receiving part, protruding forward from both sides, and covering the front of the extending parts and side frame segments. A recess is formed at an area, facing a corresponding extending part of the extending parts, of a rear surface of each bank part.

12 Claims, 59 Drawing Sheets

Related U.S. Application Data of application No. 15/606,703, filed on May 26, 2017, now Pat. No. 10,300,816, which is a continuation of application No. 14/432,772, filed as application No. PCT/JP2013/076474 on Sep. 30, 2013, now Pat. No. 9,694,723.

(51) Int. Cl.
*B60N 2/427* (2006.01)
*B60N 2/66* (2006.01)

(58) Field of Classification Search
USPC ................................................ 297/284.6
See application file for complete search history.

(56) References Cited

U.S. PATENT DOCUMENTS

| | | | |
|---|---|---|---|
| 5,088,790 A | 2/1992 | Wainwright et al. | |
| 5,967,603 A | 10/1999 | Genders et al. | |
| 6,027,171 A * | 2/2000 | Partington | B60N 2/0232 297/452.18 |
| 6,129,419 A * | 10/2000 | Neale | B60N 2/58 297/284.4 |
| 6,386,577 B1 | 5/2002 | Kan et al. | |
| 7,152,920 B2 * | 12/2006 | Sugiyama | B60N 2/002 297/284.6 |
| 7,393,005 B2 | 7/2008 | Inazu et al. | |
| 7,905,547 B2 | 3/2011 | Lawall et al. | |
| 8,444,220 B2 | 5/2013 | Okamoto et al. | |
| 8,662,530 B2 | 3/2014 | Festag et al. | |
| 8,833,852 B2 | 9/2014 | Festag | |
| 8,876,206 B2 | 11/2014 | Yamaguchi et al. | |
| 8,936,317 B2 | 1/2015 | Yamaguchi et al. | |
| 9,056,568 B2 | 6/2015 | Matsumoto et al. | |
| 9,102,252 B2 | 8/2015 | Sugiyama et al. | |
| 2005/0179306 A1 | 8/2005 | White et al. | |
| 2009/0001785 A1 | 1/2009 | Swan et al. | |
| 2009/0102270 A1 | 4/2009 | Wissner et al. | |
| 2010/0187874 A1 | 7/2010 | Matsui | |
| 2011/0204693 A1 * | 8/2011 | Nitsuma | B60N 2/888 297/391 |
| 2011/0241403 A1 | 10/2011 | Yamaguchi et al. | |

FOREIGN PATENT DOCUMENTS

| | | | |
|---|---|---|---|
| CN | 102069735 A | 5/2011 |
| CN | 102205807 A | 10/2011 |
| CN | 102205809 A | 10/2011 |
| FR | 2 761 310 A1 | 10/1998 |
| JP | S57-194120 A | 11/1982 |
| JP | S60-052136 U | 4/1985 |
| JP | S61-196741 U | 12/1986 |
| JP | H05-115335 A | 5/1993 |
| JP | H11-34707 A | 2/1999 |
| JP | 2000-139627 A | 5/2000 |
| JP | 2001-150988 A | 6/2001 |
| JP | 3201591 B2 | 8/2001 |
| JP | 2007-535443 A | 12/2007 |
| JP | 2010-083269 A | 4/2010 |
| JP | 4452860 B2 | 4/2010 |
| JP | 2010-173353 A | 8/2010 |
| JP | 2010-179754 A | 8/2010 |
| JP | 2011-207442 A | 10/2011 |
| JP | 2011-207443 A | 10/2011 |
| JP | 2011-255698 A | 12/2011 |
| JP | 2012-035811 A | 2/2012 |
| JP | 2012-136056 A | 7/2012 |
| JP | 2013-129245 A | 7/2013 |
| WO | 2008/031374 A1 | 3/2008 |
| WO | 2014/054553 A1 | 4/2014 |

OTHER PUBLICATIONS

Dec. 10, 2013 International Search Report issued in International Application No. PCT/JP2013/076474.
Dec. 10, 2013 Written Opinion issued in International Application No. PCT/JP2013/076474.
Mar. 30, 2016 Office Action issued in Chinese Patent Application No. 201380051461.5.
Nov. 3, 2016 Office Action issued in U.S. Appl. No. 14/432,772.
Feb. 14, 2017 Office Action issued in Chinese Application No. 201380051461.5.
May 9, 2017 Office Action issued in Japanese Application No. 2014-539715.
Oct. 3, 2017 Office Action issued in Japanese Application No. 2014-539715.
Sep. 7, 2018 Office Action issued in U.S. Appl. No. 15/606,703.
Mar. 26, 2019 Office Action issued in Japanese Patent Application No. 2018-088993.

* cited by examiner

FIG.1
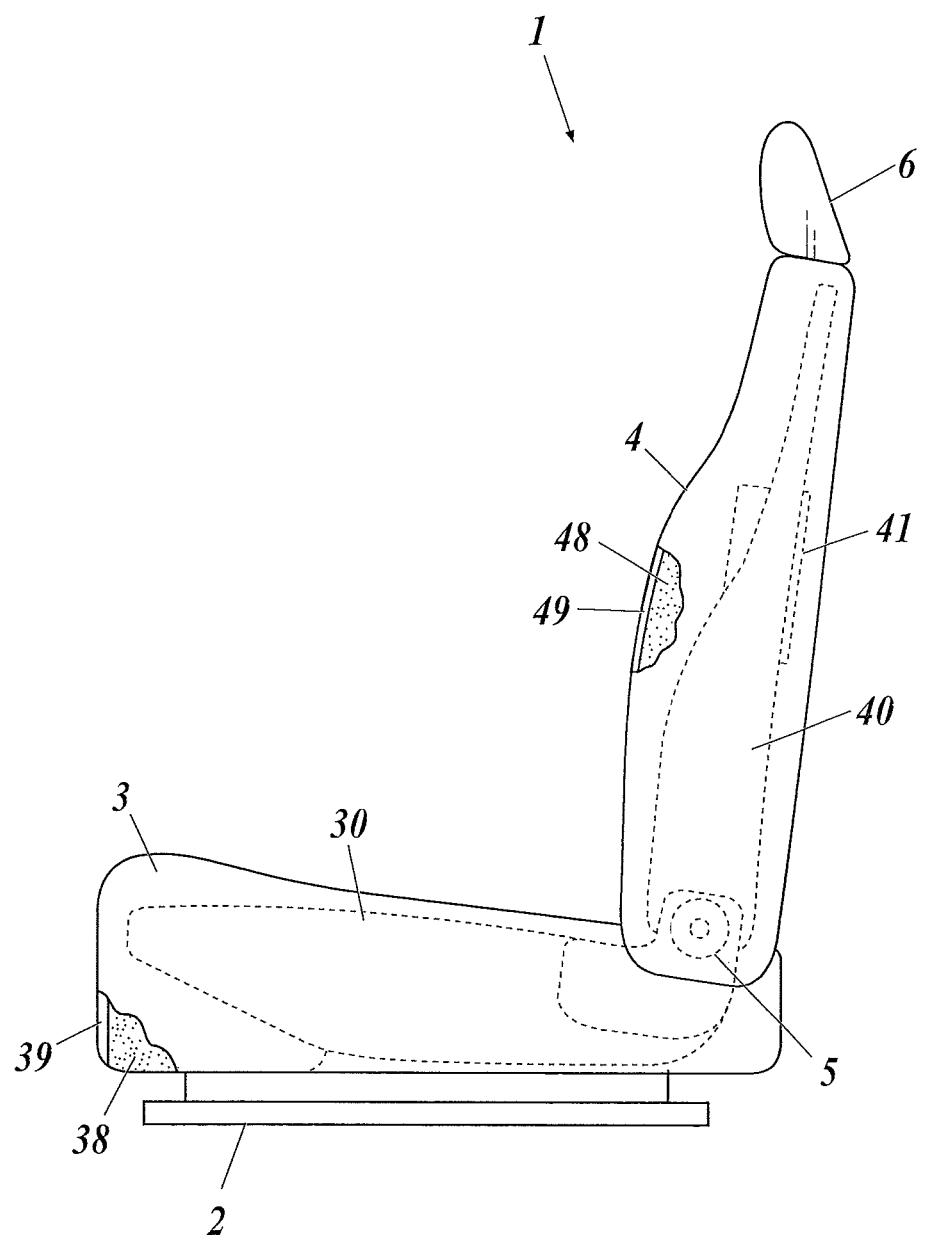
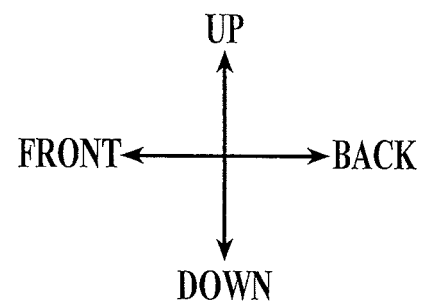

FIG.2
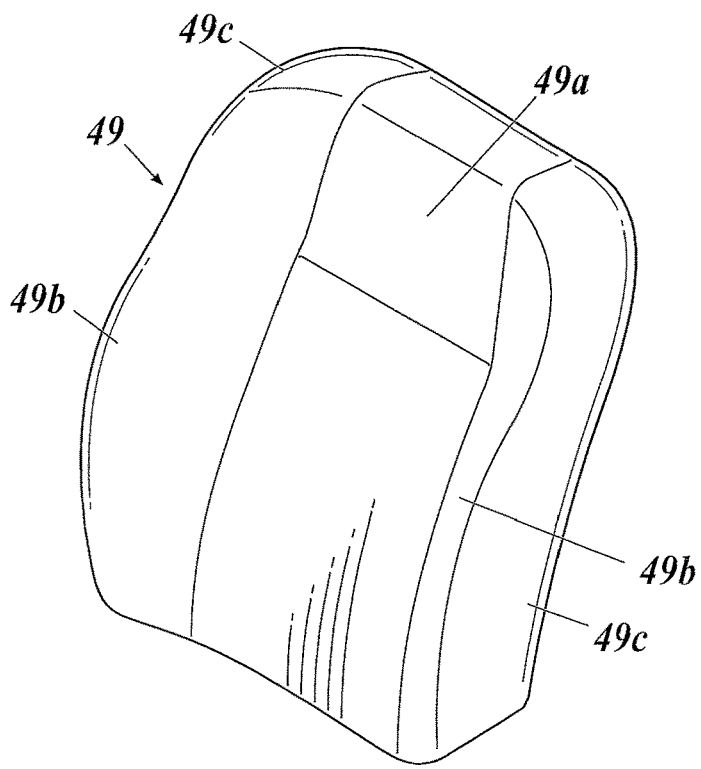
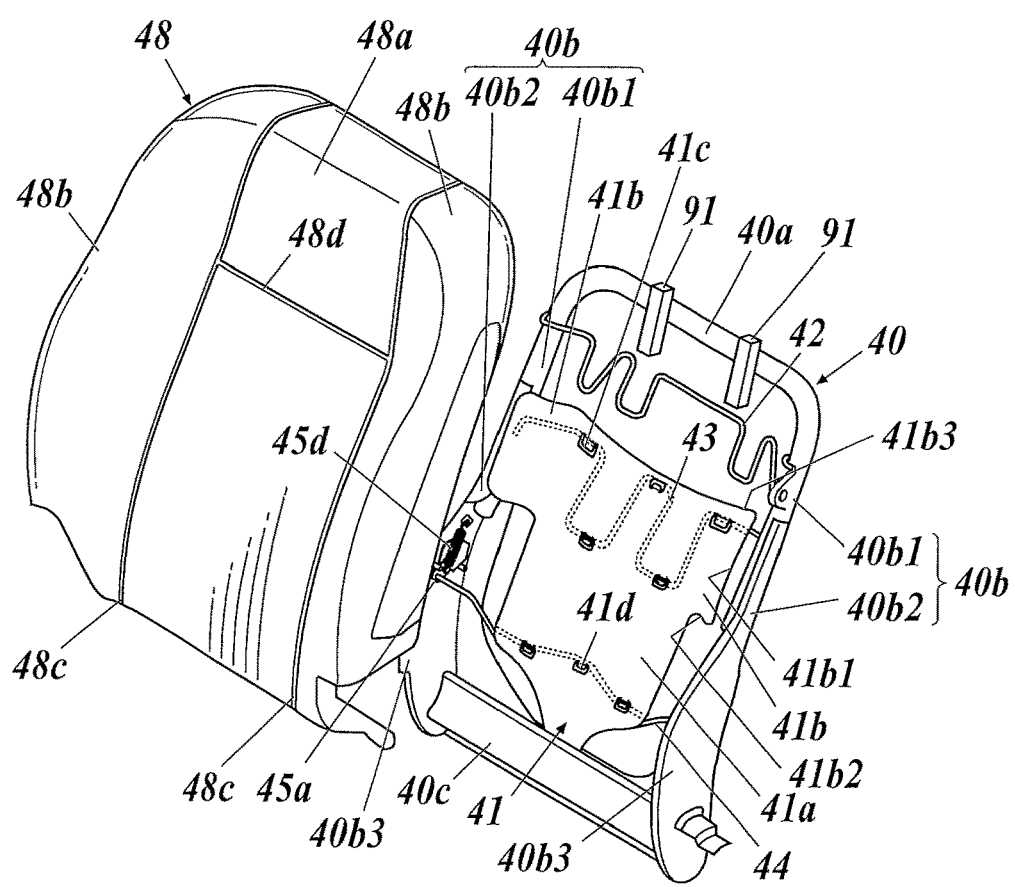

SEAT BACKREST

This is a continuation application of application Ser. No. 16/378,621, filed Apr. 9, 2019, which is a continuation of application Ser. No. 15/606,703, filed May 26, 2017, which is a continuation application of application Ser. No. 14/432,772 filed Apr. 1, 2015, which is a 371 of International Application No. PCT/JP2013/076474 filed Sep. 30, 2013, which claims priority to JP 2012-219610 filed Oct. 1, 2012. The disclosures of the prior applications are hereby incorporated by reference herein in their entirety.

TECHNICAL FIELD

The present invention relates to a seat backrest.

BACKGROUND ART

The backrest of a vehicle seat is provided with a headrest on its top. The headrest supports the head of an occupant from the rear. At a rear-end collision by another vehicle, the headrest receives the head of the occupant to cushion the impact on the neck region of the occupant.

While an occupant is seated on a vehicle seat, the occupant often leans the upper body against the backrest with the head slightly spaced apart from the headrest. At a rear-end collision by another vehicle, the head of the occupant is received by the headrest while slightly inclined backward and then tilted forward by the reaction of the impact force. This impairs the advantageous effects of the headrest, i.e., shock-absorbing advantageous effects on the neck of the occupant.

Technology has been developed that allows the headrest to receive the head of an occupant rapidly by letting the upper body of the occupant deeply sink into the backrest of a vehicle seat at a rear-end collision by another vehicle (See PTL 1). More specifically, a pressure receiving member is provided within the frame of a backrest such that the pressure receiving member is movable in the front-back direction. At least the front surface of the frame and the pressure receiving member is covered with a cushion pad (See PTL 1). In the technology disclosed in PTL 1, at a rear-end collision by another vehicle, the upper body of the occupant sinks into the cushion pad and the central portion of the cushion pad and the pressure receiving member retreat, thus allowing the headrest to rapidly receive the head of the occupant.

In the technology disclosed in PTL 2, an upper coupling wire is bridging the upper portions of the left and right side frames of the backrest. The lower coupling wire is bridging the lower portions of the left and right side frames. A plate-like pressure receiving member is coupled to the left and right side frames via the coupling wires and disposed between the left and right side frames to support the backrest pad from the rear.

In the technology disclosed in PTL 3, multiple springs are fixed to the backrest frame such that they extend across the lateral width. A support material is mounted in front of the springs. An airbag is mounted in front of the support material. The inflation or deflation of the airbag changes the shape of a pad disposed in front of the airbag. This operation can adjust the lumbar support position of an occupant.

The side frames of the backrest disclosed in PTL 1 are each provided with a reinforcing cloth attaching member (reinforcing cloth fixing bracket). The reinforcing cloth attaching members are disposed around the pressure receiving member. The reinforcing cloth attaching members are connected with a reinforcing cloth to control the direction of deploying the airbag.

In the technology disclosed in PTL 4, a hook and an airbag module are mounted on the side frames of the backrest. A reinforcing cloth is stretched from the hook to a skin seam via the vicinity of the airbag module. At the inflation of an airbag in the airbag module, the airbag is guided to the seam by the reinforcing cloth. Further pulling of the reinforcing cloth by the inflating airbag causes the skin seam to be torn and the air bag to protrude from the torn seam (See PTL 4).

In the technology disclosed in PTL 5, a vibration generator that generates vibrations is disposed within the backrest. The vibration of the seat back by the vibration generator can provide the occupant with massage and awakening effects.

PRIOR ART LITERATURES

Patent Literatures

PTL 1: Japanese Unexamined Patent Application Publication No. 2012-136056
PTL 2: Japanese Unexamined Patent Application Publication No. 2010-179754
PTL 3: Japanese Unexamined Patent Application Publication No. 2001-150988
PTL 4: Japanese Patent No. 4452860
PTL 5: Japanese Unexamined Utility Model Application Publication No. 61-196741

DISCLOSURE OF INVENTION

Problems to be Solved by the Invention

Bank parts are provided on the right and left of the front of the cushion pad of a backrest. The bank parts protrude forward more than the central portion of the back receiving part. The bank parts enhance the ability to hold an occupant and receive the right and left sides (mainly, shoulders, shoulder blades, franks and upper arms) of the upper body of the occupant. At a rear-end collision by another vehicle, the bank parts receives the right and left sides of the upper body of the occupant. The central portion of the back receiving part and the pressure receiving member retreat and then the bank parts are pressed backward and compressed by the right and left sides of the upper body of the occupant. Thus, the bank parts may reduce the effect of sinking the upper body of the occupant backward.

An object of the present invention, which has been made to solve the problem, is to prevent the bank parts from reducing the effect of sinking the upper body of the occupant backward.

Means for Solving Problems

In order to achieve the above-described object, a seat backrest according to the present invention includes: right and left side frame segments disposed in parallel in a right-left direction; a pressure receiving member disposed between the side frame segments, the pressure receiving member being movable in a front-back direction; and a cushion pad covering front surfaces of the side frame segments and a front surface of the pressure receiving member, wherein the pressure receiving member includes: a main body part; and right and left extending parts extending rightward and leftward from right and left sides of the main body part, wherein the cushion pad includes: aback receiving part covering a front surface of the main body part, and bank parts disposed on right and left sides of the back receiving part, protruding forward from right and left sides of a front surface of the back receiving part, and covering front surfaces of the extending parts and the front surfaces of the side frame segments, and wherein a recess is formed at an area of a rear surface of each bank part, the area facing a corresponding extending part of the extending parts.

Effects of the Invention

According to the present invention, recesses are formed on the rear surfaces of the bank parts to provide a space into which the recess areas of the bank parts retreat and bend. At a rear-end collision by other vehicle, the recess areas of the bank parts retreat and bend although the sides of the upper body of an occupant are received by the bank parts. This can prevent the bank parts from reducing the backward sinking of the upper body of the occupant.

When an occupant leans against the backrest, the recess areas of the bank parts are received by the extending parts of the pressure receiving member. Although the recesses formed on the rear surfaces of the bank parts reduce the holding ability of the bank parts themselves, the extending parts can compensate for the reduced holding ability.

BRIEF DESCRIPTION OF DRAWINGS

FIG. 1 is a side view of a seat according to a first embodiment of the present invention.

FIG. 2 is an exploded perspective view of a backrest according to the first embodiment of the present invention.

EMBODIMENTS TO CARRY OUT THE INVENTION

Figure 3:
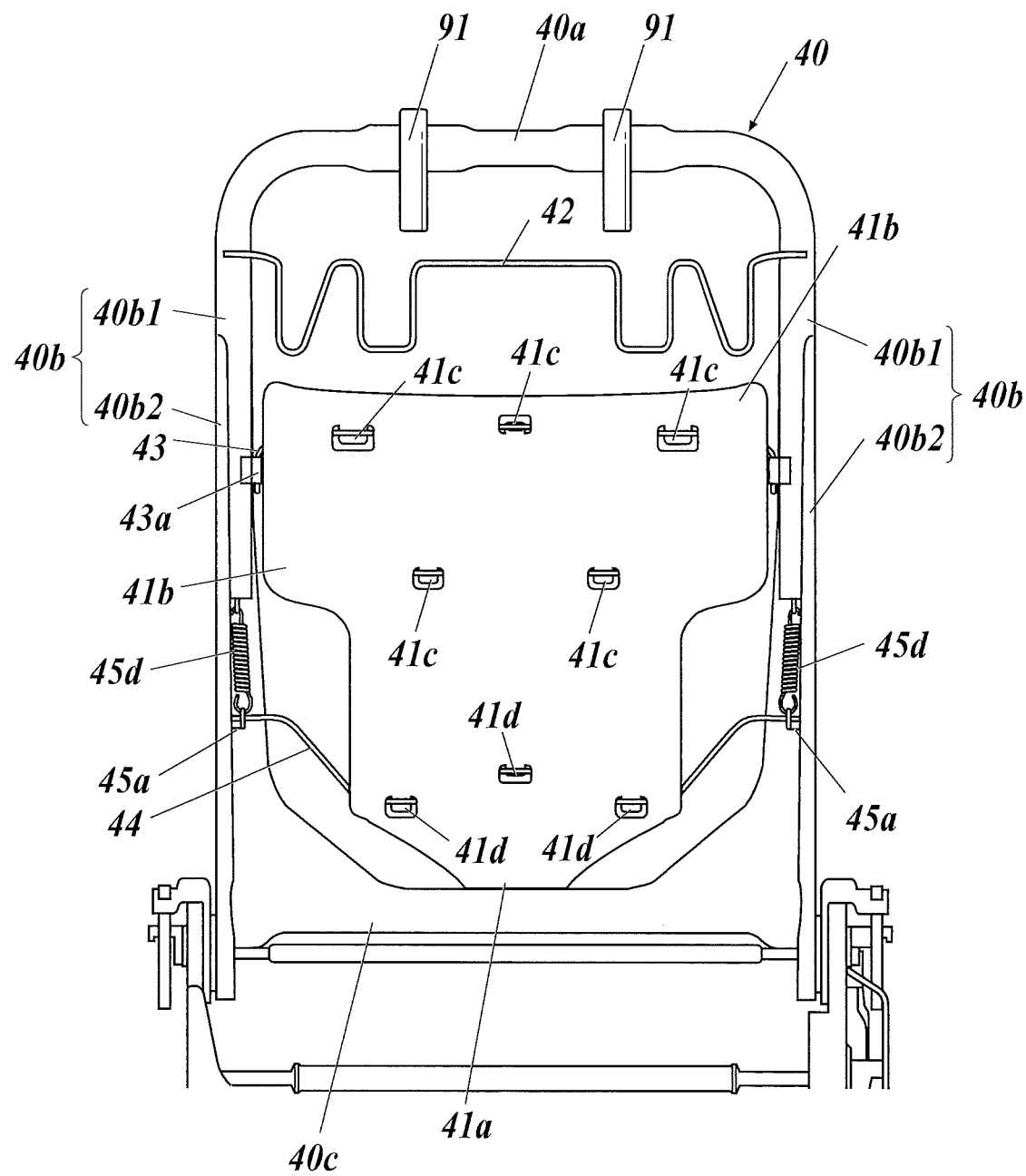
FIG. 3 is a front view of a frame of the backrest according to the first embodiment of the present invention.

Embodiments of the present invention will now be described with reference to the accompanying drawings. Although the following embodiments include various limitations that are technically preferred in the practice of the present invention, the scope of the present invention should not be limited to the embodiments or illustrated examples.

In the following description, right and left sides are determined by the back and front sides of the seat 1. That is, the right and left sides depend on the perspective of a person seated in the seat 1.

First Embodiment

FIG. 1 is a side view of a seat 1. FIG. 2 is a perspective view of a frame of the seat 1.

The seat 1 is a vehicle seat. In particular, the seat 1 is a vehicle seat provided in the interior of an automobile. The seat 1, which is an automotive seat, is used as driver's seat or passenger's seat.

The seat 1 includes slide rails 2, a bottom seat (seat cushion) 3, a backrest (seat back) 4, a recliner mechanism 5 and a headrest 6.

The headrest 6 is mounted on the top end of the backrest 4. The backrest 4 has the bottom end coupled to the rear end of the bottom seat 3 via the recliner mechanism 5. The backrest 4 stands on the rear end of the bottom seat 3. The recliner mechanism 5 allows the backrest 4 to tilt in the front-back direction with respect to the bottom seat 3 around the bottom end of the backrest 4. The recliner mechanism 5 locks the backrest 4 to the bottom seat 3 to stop tilting back of the backrest 4 and unlocks the backrest 4 to urge the backrest 4 forward.

When an occupant is seated on the seat 1, the hip and the thighs of the occupant are supported from the bottom by the bottom seat 3 and the upper body of the occupant is supported from the back by the backrest 4. The head of the occupant is supported from the back by the headrest 6. At a rear-end collision by a vehicle running back (with the seat 1 mounted) against another vehicle or an obstacle or at a rear-end collision by another vehicle, a backward load is applied from the upper body of the occupant to the backrest 4 (details will be given in detail later). Even in such a case, the seat 1 can sink the upper body of the occupant into the backrest 4.

The bottom seat 3 includes a bottom seat frame 30, a cushion pad 38 and a skin 39. The frame 30 is within the bottom seat 3 and constitutes part of the bottom seat 3. Viewed from the above, the frame 30 is a skeleton covered with the cushion pad 38. The cushion pad 38 is covered with the skin 39. The skin 39 is made, for example, of artificial leather or cloth. The frame 30 is mounted on the slide rails 2, which enables the bottom seat 3 to move in the front-back direction.

The backrest 4 includes a backrest frame 40, a pressure receiving member 41, a cross member 42, an upper wire rod 43, a lower wire rod 44, a cushion pad (backrest pad) 48 and a skin 49. The backrest frame 40 is within the backrest 4 and constitutes part of the backrest 4. Viewed from the front, the backrest frame 40 is a skeleton. The pressure receiving member 41 is disposed inside the backrest frame 40. The backrest frame 40 and the pressure receiving member 41 are covered with the cushion pad 48. The cushion pad 48 is covered with the skin 49. The skin 49 is made, for example, of artificial leather or cloth. The backrest frame 40 has the bottom end coupled to the recliner mechanism 5. The recliner mechanism 5 is coupled to the rear end of the frame 30. The recliner mechanism 5 makes the backrest frame 40 movable in the front-back direction. The frame 30 in the bottom seat 3, the backrest frame 40 in the backrest 4, and the recliner mechanism 5 are assembled into a seat frame.

With reference to FIGS. 2 and 3, the backrest frame 40 of the backrest 4 will now be described in detail. FIG. 2 is an exploded perspective view of the backrest 4. FIG. 3 is the front view of the backrest frame 40 of the backrest 4.

The backrest frame 40 includes an upper frame segment (horizontal pipe segment) 40a, side frame segments 40b, and a lower frame segment 40c. The side frame segments 40b are disposed on the right and left respectively in parallel at a certain interval and extend vertically. The upper frame segment 40a extends in the right-left direction, with the left end of the upper frame segment 40a coupled to the top end of the left side frame segment 40b and the right end of the upper frame segment 40a coupled to the top end of the right side frame segment 40b. Support brackets 91 for mounting the headrest 6 are fixed on the upper frame segment 40a by welding. The lower frame segment 40c extends in the right-left direction, with the left end of the lower frame segment 40c coupled to the bottom end of the left side frame segment 40b and the right end of the lower frame segment 40c coupled to the bottom end of the right side frame segment 40b.

The side frame segments 40b each include vertical pipe segments 40b1 and main body parts 40b2 of the side frame segments. The right and left vertical pipe segments 40b1 are bent downward from the right and left ends of the upper frame segment 40a and are integrated with the upper frame segment 40a. A pipe is bent into a gate shape (for example, reversed U shape, C shape, or angular U-shape) to form the vertical pipe segments 40b1 and the upper frame segment 40a. The main body parts 40b2 of the side frame segments are made of a pressed metal sheet. The main body parts 40b2 of the side frame segments each have a substantially U shaped cross section along the right-left and front-back directions. The main body parts 40b2 of the side frame segments face each other and are disposed along the right-left direction at a certain interval. The right and left main body parts 40b2 of the side frame segments are welded to the bottom ends of the right and left vertical pipe segments 40b1, respectively, and extend therefrom. The lower frame segment 40c is made of a metal sheet. The lower frame segment 40c has right and left ends coupled to the bottom ends of the main body parts 40b2 of the side frame segments. The lower portions of the main body parts 40b2 of the side frame segments each have a protrusion 40b3 protruding forward.

A cross member 42 is disposed between the side frame segments 40b. The cross member 42 is a meandrous rod in front view. The cross member 42 has right and left ends coupled to the vertical pipe segments 40b1 by welding.

Figure 4:
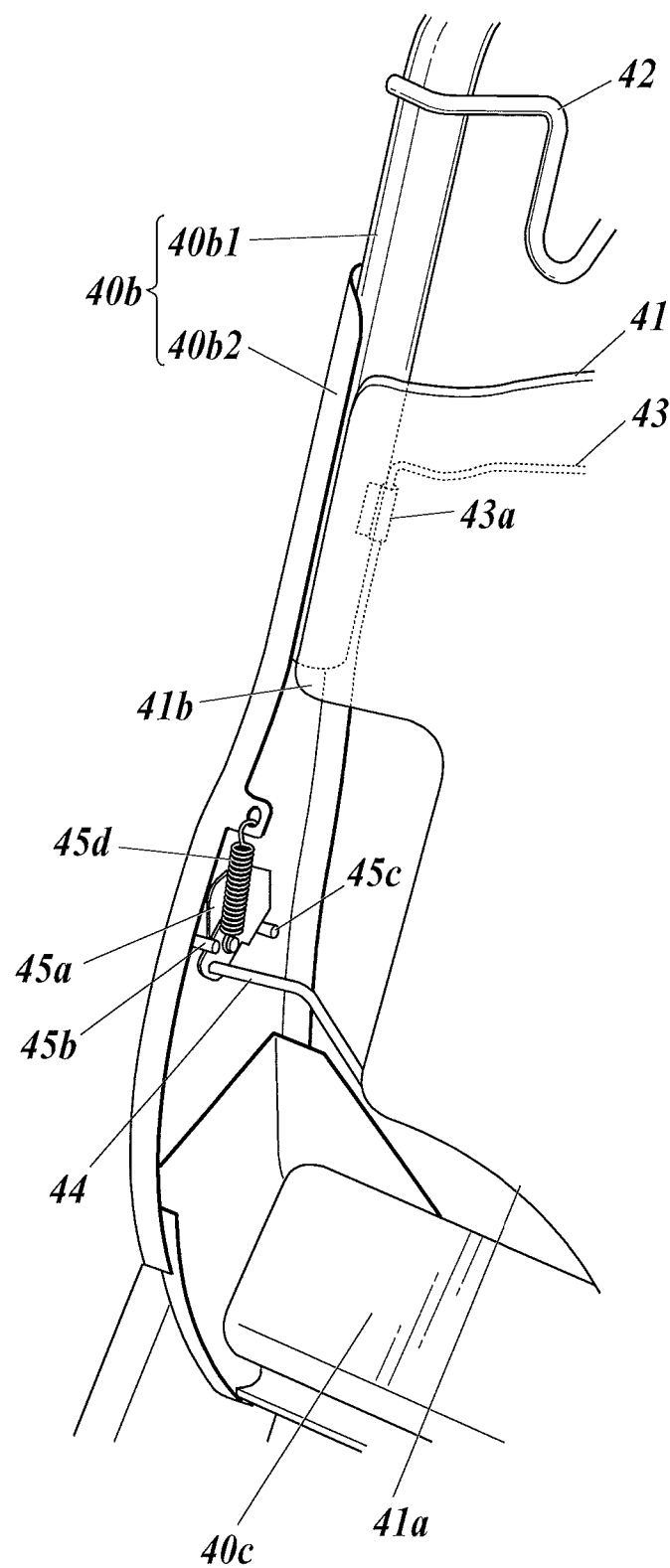
FIG. 4 is a perspective view of a side frame of the backrest according to the first embodiment of the present invention.

With reference to FIGS. 2 to 4, the pressure receiving member 41, the upper wire rod (upper coupling wire rod) 43 and the lower wire rod (lower coupling wire rod) 44 will now be described. FIG. 4 is a perspective view of the side frame segment 40b.

The pressure receiving member 41 is coupled to the backrest frame 40 with the upper wire rod 43 and the lower wire rod 44 such that the pressure receiving member 41 can retreat with respect to the main body parts 40b2 of the side frame segments. In other words, the pressure receiving member 41 partially blocks an opening surrounded by the backrest frame 40 and is movable in the front-back direction by the upper wire (rod) 43 and the lower wire (rod) 44.

The upper wire rod (spring wire) 43 and the lower wire rod (spring wire) 44 couple the pressure receiving member 41 to the backrest frame 40.

The upper wire rod 43 bridges the side frame segments 40b below the cross member 42. The upper wire rod 43 has right and left ends coupled to the vertical pipe segments 40b1. More specifically, mounts (supporting tongues) 43a are attached to the vertical pipe segments 40b1, respectively, by welding. The right and left ends of the upper wire rod 43 are hooked to the mounts 43a, thereby coupling the right and left ends of the upper wire rod 43 to the vertical pipe segments 40b1 via the mounts 43a. The mounts 43a are attached to the vertical pipe segments 40b1 at positions avoiding the front ends of the vertical pipe segments 40b1 and within the range from the front ends of the vertical pipe segments 40b1 inside of the backrest frame 40. The upper wire rod 43 has a meandrous shape in front view. The upper wire rod 43 has flexibility and resilience. The cross member 42 has much higher rigidity than the upper wire rod 43.

The lower wire rod 44 bridges the main body parts 40b2 of the side frame segments below the upper wire rod 43. More specifically, the lower wire rod 44 has a right end coupled to a right swing member (link member) 45a. The lower wire rod 44 has a left end thereof coupled to a left swing member 45a. These swing members 45a are coupled to the main body parts 40b2 of the left and right side frame segments such that the swing members 45a can move in the front-back direction. The swing members 45a are each provided with stoppers 45b and 45c in front and rear thereof. The stoppers 45b and 45c are fixed to the main body part 40b2 of each side frame segment. Each swing member 45a is coupled to one end of a tension spring 45d. The tension spring 45d is coupled to the side frame segment 40b diagonally upward to the front of the swing member 45a. The tension spring 45d pulls the swing member 45a forward. The swing member 45a comes into contact with the front stopper 45b. This allows the stopper 45b to receive the tensile load of the tension spring 45d. The application of a backward load exceeding a predetermined value to the lower wire rod 44 and the pressure receiving member 41 causes the swing members 45a to move back against the tensile load of the tension springs 45d and brings the swing members 45a into contact with the rear stoppers 45c, thereby stopping the swing members 45a.

The lower wire 44 has a meandrous shape in front view. The lower wire 44 has flexibility and resilience. The cross member 42 has much higher rigidity than that of the lower wire 44.

The pressure receiving member 41 is supported by the upper wire rod 43 and the lower wire rod 44 and disposed between the side frame segments 40b such that the pressure receiving member 41 is suspended by the upper wire rod 43 and the lower wire rod 44. The pressure receiving member 41 is disposed below the cross member 42.

The pressure receiving member 41 is a plate made of resin. More specifically, the pressure receiving member 41 is made of synthetic resin, such as polypropylene, and has a predetermined strength enough to support a seated person. Multiple claws (engaging claws) 41c and 41d are provided on the rear surface of the pressure receiving member 41. The upper wire rod 43 is hooked to the claws 41c. The lower wire rod 44 is hooked to the claws 41d. This configuration allows the pressure receiving member 41 to be supported by the upper wire rod 43 and the lower wire rod 44 while the pressure receiving member 41 stands. The upper wire rod 43 is engaged with the claws 41c formed on the upper rear surface of the pressure receiving member 41 to couple the upper portion of the pressure receiving member 41 to the left and right side frame segments 40b. The lower wire rod 44 is engaged with the claws 41d formed on the lower rear surface of the pressure receiving member 41 to couple the pressure receiving member 41 to the left and right side frame segments 40b.

The claws 41c and 41d each are substantially L-shaped, viewed from the right or left. That is, the claws 41c and 41d each extend backward from the rear of the main body part 41a, bend, and extend downward.

The pressure receiving member 41 includes a main body part (pressure receiving part) 41a and a pair of the right and left extending parts (supporting parts) 41b. The main body part 41a is a plate-like member and extends vertically and horizontally. The left extending part 41b extends leftward from the upper left side of the main body part 41a. The right extending part 41b extends rightward from the upper right side of main body part 41a. More specifically, the extending parts 41b extend from the main body part 41a at the breast height of the occupant diagonally forward to the outside in the horizontal direction. The extending parts 41b curve forward from the right and left sides of the main body part 41a. In top view, the extending parts 41b and the main body part 41a, as a whole, are curved into a cylindrical shape. The cylindrical shape is concave viewing from the front and convex viewing from the rear. The extending parts 41b and the main body part 41a are formed integrally. The extending parts 41b are resiliently deformable.

Figure 6:
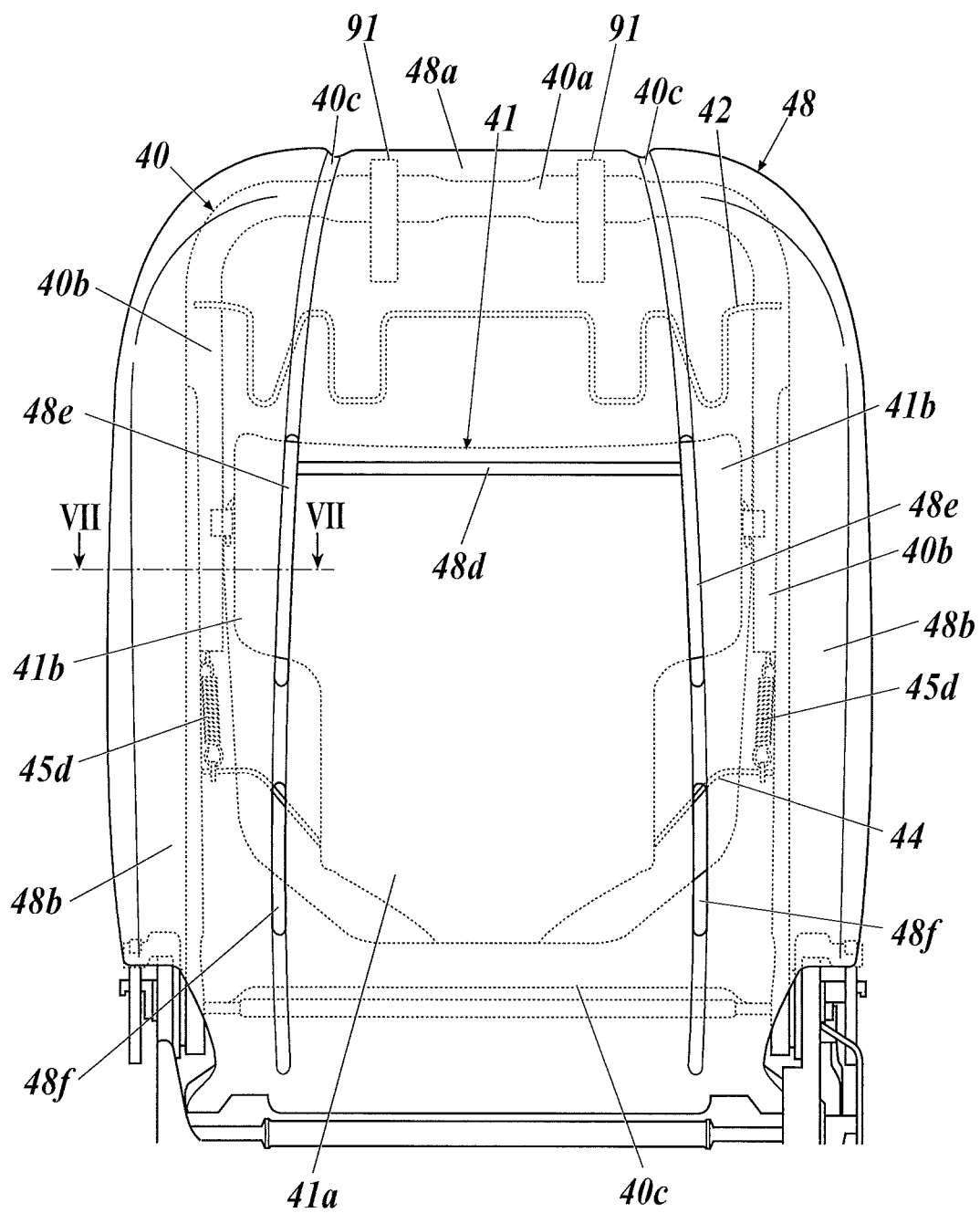
FIG. 6 is a front view of the backrest according to the first embodiment of the present invention.
Figure 7:
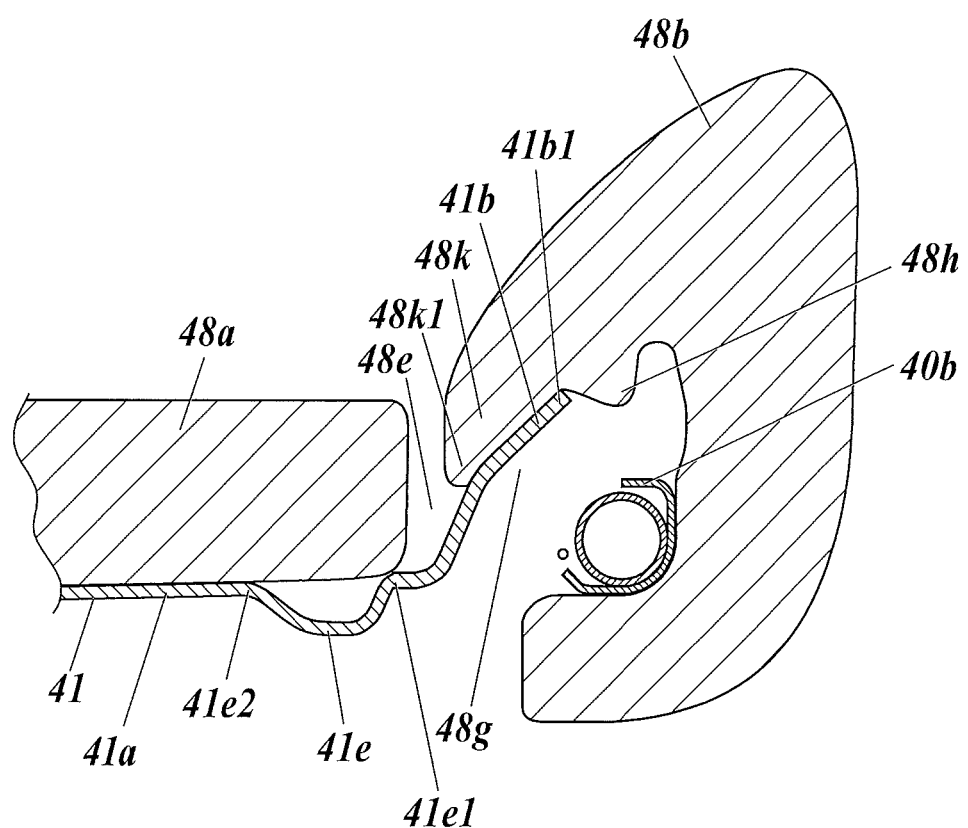
FIG. 7 is a transverse sectional view taken along line VII-VII in FIG. 6, viewed in the direction of arrows.

FIG. 6 is a front view of the backrest 4. FIG. 7 is a transverse sectional view, viewed from above, taken along line VII-VII in FIG. 6. As shown in FIG. 7, a bead 41e is formed on the front and rear surfaces of the right and left parts of the main body part 41a. Each bead 41e is concave viewed from the front of the main body part 41a and convex viewed from the rear of the main body part 41a. The beads 41e extend vertically. Each extending part 41b extends from a lateral edge 41e1 of the bead 41e diagonally forward to the lateral side.

In response to a backward load applied to the pressure receiving member 41, the upper wire rod 43 and the lower wire rod 44 in FIGS. 2 to 4 are pulled backward by the pressure receiving member 41. This causes elastic deformation of the upper wire rod 43 and the lower wire rod 44. This, in turn, causes the pressure receiving member 41 to retreat backward. In response to a high backward load, such as an impulsive force, the swing members 45a are pulled by the lower wire rod 44 and moved backward against the tensile force of the tension springs 45d. The pressure receiving member 41 further retreats backward. The ends of the upper wire rod 43, which supports the upper portion of the pressure receiving member 41, are fixed to the side frame segments 40b. The ends of the lower wire rod 44, which supports the lower portion of the pressure receiving member 41, are coupled to the side frame segments 40b such that the ends of the lower wire rod 44 are movable in the front-back direction by the swing members 45a. Thus, the pressure receiving member 41 has a smaller backward displacement in the upper direction and a larger backward displacement in the lower direction.

While no backward load is applied to the pressure receiving member 41 (hereinafter referred to as "natural state"), the pressure receiving member 41 does not retreat. In such a natural state, the pressure receiving member 41, the main body part 41a of the pressure receiving member 41 and extending parts 41b are inclined upward toward the rear.

Figure 5:
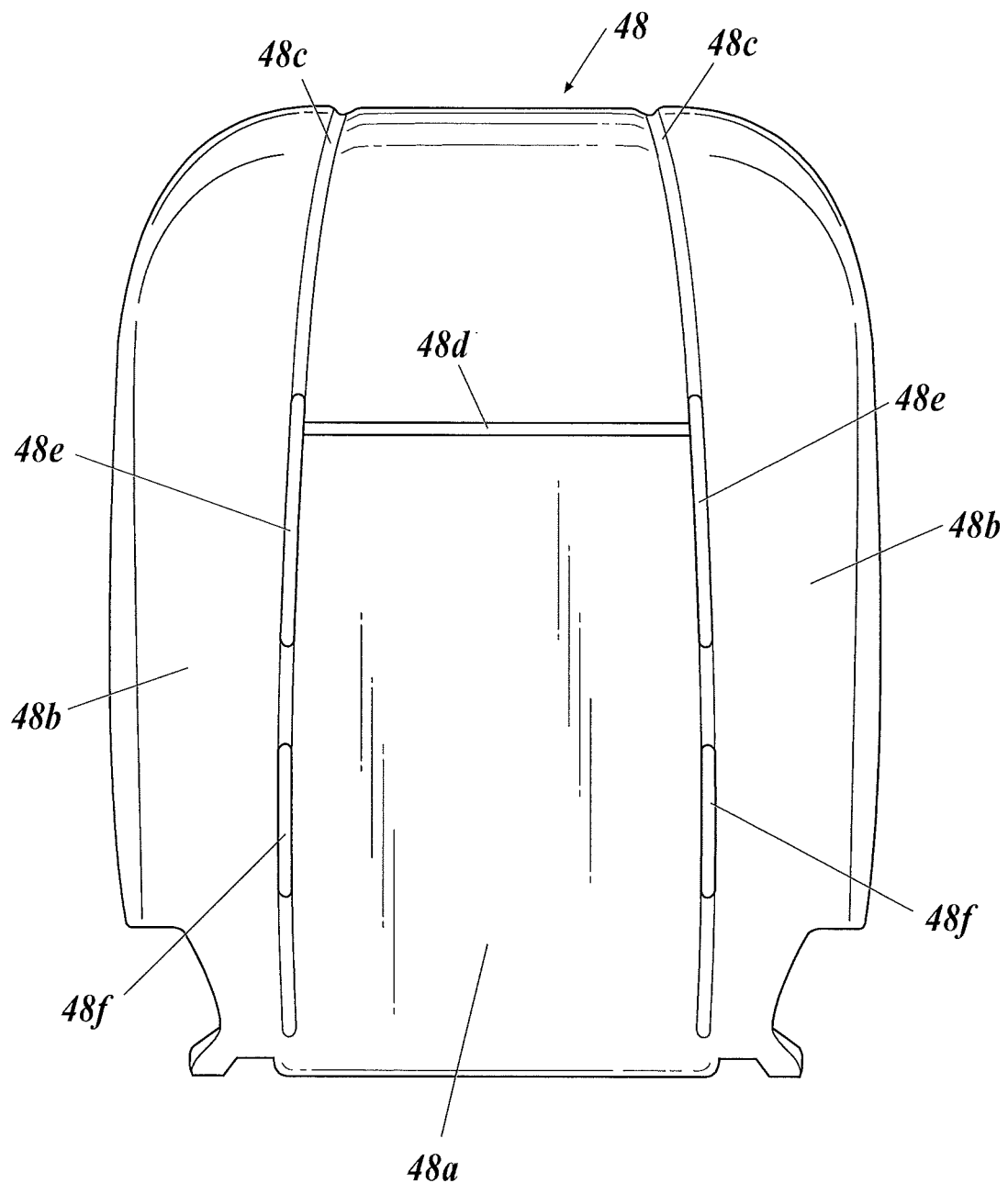
FIG. 5 is a front view of a cushion pad of the backrest according to the first embodiment of the present invention.
Figure 8:
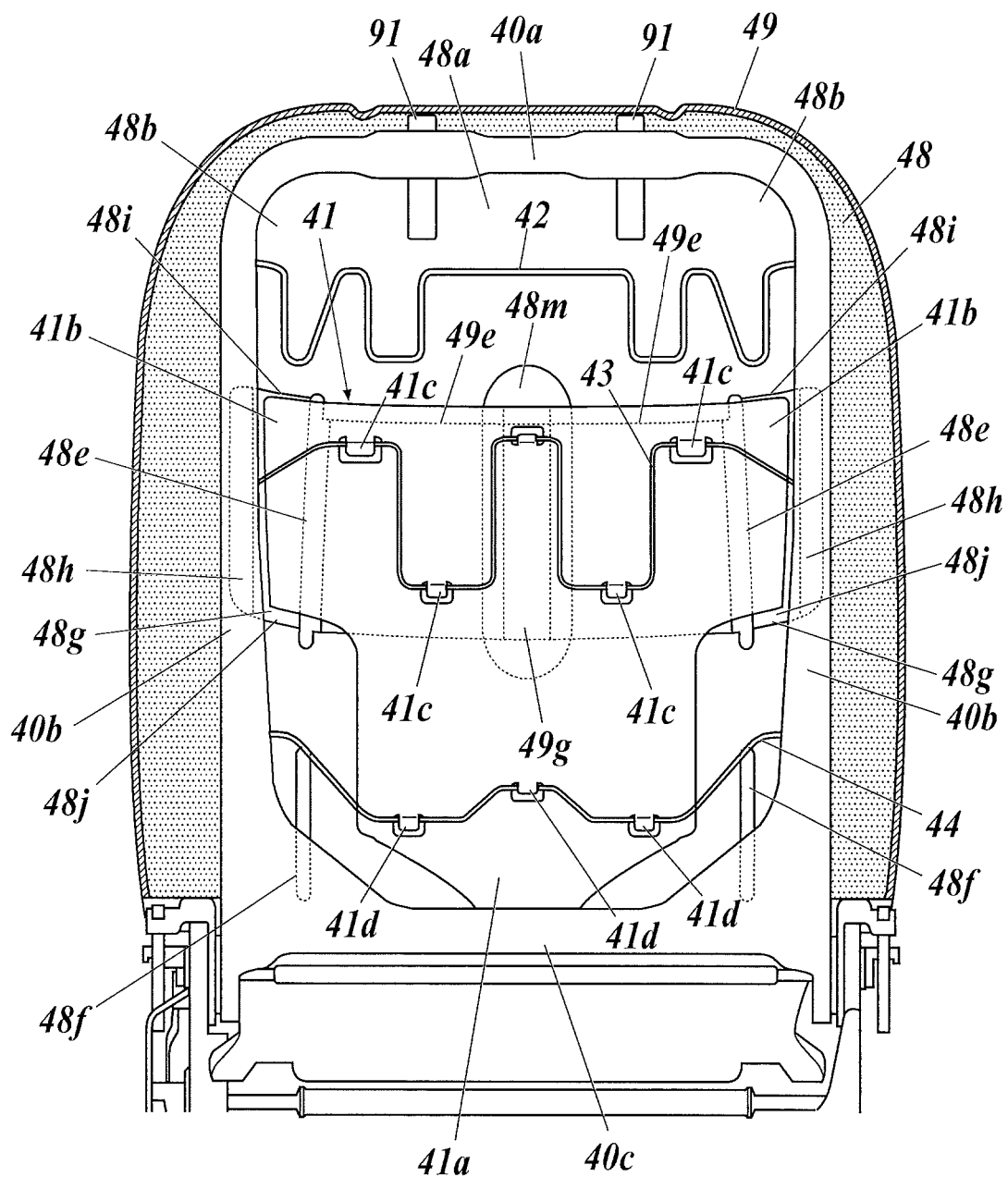
FIG. 8 is a partial cross-sectional back view that illustrates the back of the frame of the backrest and a partial longitudinal section of a cushion pad and a skin.

With reference to FIG. 2 and FIGS. 5 to 8, a cushion pad 48 will now be described. FIG. 5 is a front view of a cushion pad 48. FIG. 8 is a partial cross-sectional back view of the backrest 4 and a partial longitudinal section of a cushion pad 48.

The cushion pad 48 is made of a cushion material, such as urethane foam. The cushion pad 48 at least covers the front, left, right and upper surfaces of the backrest frame 40 and the pressure receiving member 41. The cushion pad 48 may further cover the rear surface of the backrest frame 40 and the pressure receiving member 41.

As shown in FIG. 5, the cushion pad 48 has a back receiving part (central part) 48a and right and left bank parts (side parts) 48b. The back receiving part 48a is the central portion of the cushion pad 48. The left bank part 48b is the left part of the cushion pad 48. The right bank part 48b is the right part of the cushion pad 48. The back receiving part 48a and the bank parts 48b are integrated such that the right bank part 48b is provided on the right side of the back receiving part 48a and the left bank part 48b is provided on the left side of the back receiving part 48a. As shown in FIG. 7, the bank parts 48b are provided such that they protrudes forward from the right and left sides of the back receiving part 48a. A valley is formed along the boundary between the front surface of each bank part 48b and the front surface of the back receiving part 48a.

Grooves 48c, 48c and 48d are formed on the front surface of the cushion pad 48. The grooves 48c each extend vertically along the boundary between each bank part 48b and the back receiving part 48a. The groove 48d is formed slightly above the central portion of the front surface of the back receiving part 48a and extends in the right-left direction. The left end of the groove 48d is in communication with the left groove 48c. The right end of the groove 48d is in communication with the right groove 48c.

Slits 48e and 48f are formed in the bottom of the right groove 48c. The holes in the slits 48e and 48f in the bottom of the groove 48c extend through the back receiving part 48a and the bank part 48b to the rear surfaces thereof. The slits 48e and 48f have an elongated shape and extend vertically along each groove 48c. The slit 48e is located above the slit 48f and slightly above the central portion of the back receiving part 48a. The slit 48f is located below the central portion of back receiving part 48a. Slits 48e and 48f are also formed in the bottom of the left groove 48c. The slits 48e and the grooves 48c are each formed at the boundary between the back receiving part 48a and each bank part 48b. Thus, the back receiving part 48a readily retreats when pressed backward.

As shown in FIG. 6, the back receiving part 48a covers the front surfaces of the lower frame segment 40c, the main body part 41a of the pressure receiving member 41, the cross member 42, and the upper frame segment 40a, as well as the upper surface of the upper frame segment 40a. The left bank part 48b covers the front surface of the left extending part 41b, as well as the front, left, and rear surfaces of the left side frame segment 40b. The left bank part 48b further covers the upper surface of the left end of the upper frame segment 40a and the upper surface of the left side frame segment 40b. The right bank part 48b covers the front surface of the right extending part 41b, as well as the front, right, and rear surfaces of the right side frame segment 40b. The right bank part 48b further covers the upper surface of the right end of the upper frame segment 40a and the upper surface of the right side frame segment 40b.

The lateral width of the back receiving part 48a is shorter than the lateral interval between the side frame segments 40b. The back receiving part 48a is disposed between the side frame segments 40b when viewed from the front of the backrest 4. The grooves 48c are located between the side frame segments 40b when viewed from the front of the backrest 4.

The lateral width of the main body part 41a of the pressure receiving member 41 is shorter than the lateral interval of the grooves 48c, the lateral interval of the slits 48*e*, and the lateral interval of the slits 48*f*. Thus, the main body part 41*a* of the pressure receiving member 41 is located between the grooves 48*c*, between the slits 48*e*, and between the slits 48*f* when viewed from the front of the backrest 4.

The right extending part 41*b* of the pressure receiving member 41 extends rightward from the right side of the main body part 41*a*. The right extending part 41*b* extends across the right slit 48*e* on the rear of the back receiving part 48*a* and the bank part 48*b*. Similarly, the left extending part 41*b* extends across the left slit 48*b*.

As shown in FIG. 7, the front surface of the main body part 41*a* of the pressure receiving member 41 is in contact with the rear surface of the back receiving part 48*a*. The right extending part 41*b* is in contact with the right portion of the rear surface of the back receiving part 48*a* and the left portion of the rear surface (inside) of the right bank part 48*b*.

As shown in FIGS. 7 and 8, a recess 48*g* is formed at an area, facing the right extending part 41*b*, of the rear (inner) surface of the right extending part 41*b*. A step 48*h* is provided at the right end (lateral side) of the recess 48*g* and protrudes from the bottom of the recess 48*g* diagonally backward to the right (lateral side). Thus, the right extending part 41*b* is in contact with the left portion of the rear surface (inside) of the right bank part 48*b* in the right recess 48*g*. In particular, a front edge (front end or end of the extending part) 41*b*1 (See FIG. 7) of the right extending part 41*b* is in contact with the rear surface (inside) of the right bank part 48*b* in the right recess 48*g*.

Similarly, the left extending part 41*b* is also in contact with the left portion of the rear surface of the back receiving part 48*a* and the right portion of the rear surface (inside) of the left bank part 48*b*. A recess 48*g* is formed at an area, facing the left extending part 41*b*, of the rear (inner) surface of the left extending part 41*b*. A step 48*h* is provided at the left end (lateral side) of the recess 48*g* and protrudes from the bottom of the recess 48*g* diagonally backward to the left (lateral side). Thus, the left extending part 41*b* is in contact with the left portion of the rear surface (inside) of the left bank part 48*b* in the left recess 48*g*. A front edge 41*b*1 of the left extending part 41*b* is also in contact with the rear surface (inside) of the left bank part 48*b* in the left recess 48*g*.

Each recess 48*g* is continuous with the slit 48*e*, extends along the edge, adjacent to the bank part 48*b*, of the slit 48*e*, and further extends toward the lateral side. Each recess 48*g* extends from front of the main body part 40*b*2 of the side frame segment to the slit 48*e*. The extending part 41*b* is located within the recess 48*g*. The contact portion between the extending part 41*b* and the rear surface of the bank part 48*b* corresponds to the bottom of the recess 48*g*. Each step 48*h* extends backward from the extending part 41*b*, with the rear summit of the step 48*h* positioned posterior to the lateral end of the extending part 41*b*. Since the steps 48*h* protrude diagonally backward to the lateral sides, the steps 48*h* deviate from the trajectories of the extending parts 41*b* drawn at backward retreat of the pressure receiving member 41.

The vertical length of each recess 48*g* is longer than that of the corresponding extending part 41*b*. A gap 48*i* is provided between the upper edge of the extending part 41*b* and the upper inner circumferential wall of the recess 48*g*. A gap 48*j* is provided between the lower edge of the extending part 41*b* and the lower inner circumferential wall of the recess 48*g*. The lower gap 48*j* is larger than the upper gap 48*i*.

The vertical length of each slit 48*e* is longer than that of the corresponding extending part 41*b* and that of the corresponding recess 48*g*. The upper portion of each slit 48*e* extends upward from the upper inner circumferential wall of the recess 48*g*, and the top end of the slit 48*e* is located above the upper inner circumferential wall of the recess 48*g*. The lower portion of the slit 48*e* extends downward from the lower inner circumferential wall of the recess 48*g*. The bottom end of the slit 48*e* is located above the lower inner circumferential wall of the recess 48*g*.

Since each recess 48*g* is formed on the rear surface of the bank part 48*b*, the bank part 48*b* is thin in the recess area where the recess 48*g* is formed. The thinned portion of the bank part is referred to as a thin wall 48*k*. A gap between the thin wall 48*k* and the main body part 40*b*2 of the side frame segment corresponds to the recess 48*g*. The thin wall 48*k* is harder than the other portion of the bank part 48*b* because voids are not formed in the thin wall 48*k* at the formation of foams in the cushion pad 48. Thus, the thin wall 48*k* has a lower porosity than other portion.

As shown in FIG. 7, one end 48*k*1 of the thin wall 48*k* is in contact with the extending part 41*b*. A lateral edge 41*e*1 of the bead 41*e* is in contact with the lateral edge, adjacent to the slit 48*e*, of the rear surface of the back receiving part 48*a*. The contact portion between the end 48*k*1 of the thin wall 48*k* and the extending part 41*b* lies anterior to the contact portion between the lateral edge 41*e*1 of the bead 41*e* and the lateral edge of the rear surface of the back receiving part 48*a*.

The skin 49 is stretched over the surface of the cushion pad 48. This indicates that the skin 49, which covers the front surface of the cushion pad 48, extends along the cushion pad 48 while the skin 49 is tensioned. Multiple first engaging members are provided on the rear surface of the skin 49. The first engaging members are disposed along the grooves 48*c* and 48*d* while avoiding the slits 48*e*. Multiple second engaging members are also disposed on the bottoms of the grooves 48*c* and 48*d*. The second engaging members are disposed along the grooves 48*c* and 48*d* avoiding the slits 48*e*. The first engaging members are inserted into the grooves 48*c* and 48*d*, while the skin 49 is tensioned and then engaged with the second engaging members, thus maintaining the tension of the skin 49. The skin 49 is stretched over the surface of the cushion pad 48 in such a manner.

The skin 49 is composed of several parts. These parts are sewn together to form the skin 49 into a bag. More specifically, the skin 49 includes front skin part 49*a*, a pair of right and left bank skin parts 49*b*, a pair of right and left side skin parts 49*c* and a back skin part. The bank skin parts 49*b* are sewn to the right and left sides of the front skin part 49*a*. The left side skin part 49*c* is sewn to the left side of the left bank skin part 49*b*. The right side skin part 49*c* is sewn to the right side of the right bank skin part 49*b*. The back skin part is sewn to the upper side of the front skin part 49*a*. The back skin part is folded back such that it comes into contact with the rear surface of the front skin part 49*a*. The side skin parts 49*c* are connected to right and left sides of the back skin part with a fastener such that the skin 49 can be opened and closed freely.

The cushion pad 48 and the backrest frame 40 are placed in the skin 49. The cushion pad 48 is covered with the skin 49. The front skin part 49*a* covers the front surface of the back receiving part 48*a*. The bank skin parts 49*b* cover the front surfaces of the bank parts 48*b*. The side skin parts 49*c* cover the side and rear surfaces of the bank parts 48*b*. The back skin part covers the rear surface of the backrest frame 40.

As shown in FIG. 8, a pair of right and left pull strips (pull members) 49*e* are coupled to the rear surface of the skin 49 by sewing, bonding or adhesion. More specifically, the pair of right and left pull strips (pull members) 49*e* are coupled to the seams between the front skin part 49*a* and the bank skin parts 49*b* inside the skin 49 by sewing, bonding or adhesion. More specifically, each of pull strip 49*e* is sewn to the front skin part 49*a* and the bank skin part 49*b*, while the pull strip 49*e* is sandwiched between the end of the front skin part 49*a* and the end of the bank skin part 49*b*. Each connection portion between the pull strip 49*e* and the skin 49 overlaps with the position of the slit 48*e*.

Each pull strip 49*e* extends through the slit 48*e* and is routed from the front surface of the back receiving part 48*a* and the bank part 48*b* to the rear surface thereof. The pull strips 49*e* are bonded together by a hook and loop fastener 49*g* on the rear surface of the back receiving part 48*a*, while the skin 49 is pulled backward by the pull strips 49*e*. The pull strips 49*e* are tensioned. The back receiving part 48*a* is tightened and compressed by the pull strips 49*e*. The width of each slit 48*e* is expanded by the pull strip 49*e*. This is how the skin 49 is stretched over the surface of the cushion pad 48, thereby maintaining the tension of the skin 49.

To prevent the hook and loop fastener 49*g* from being caught between the back receiving part 48*a* and the pressure receiving member 41, a dent 48*m* is formed on the portion of the rear surface of the back receiving part 48*a* that overlaps with the hook and loop fastener 49*g*. This can prevent an abnormal noise that would be generated when the hook and loop fastener 49*g* comes into contact with the back receiving part 48*a*, the pressure receiving member 41 or both.

The operation and use of the seat 1 with such a configuration will now be described.

Figure 9:
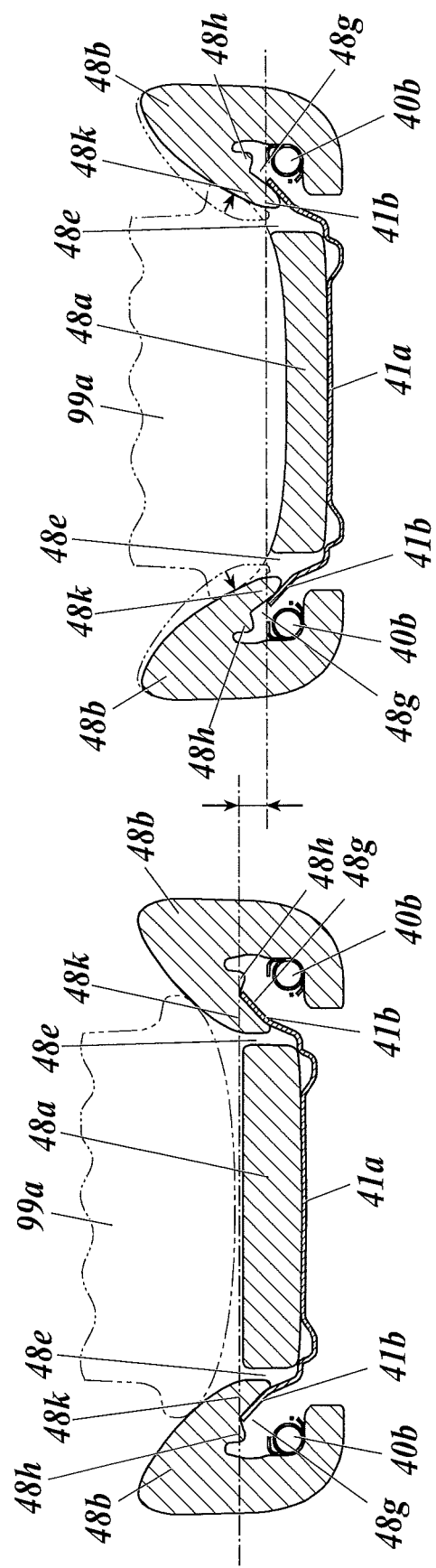
FIG. 9 is a transverse sectional view taken along VII-VII in FIG. 6 for describing the behavior of each part of the backrest.

An occupant is seated on the bottom seat 3 and leans the upper body 99*a* against the backrest 4 as shown in FIG. 9A. The occupant is often seated with the head slightly spaced apart from the headrest toward the front.

The back of the occupant is received by the front surface of the back receiving part 48*a*. The back receiving part 48*a* is resiliently compressed. The bank parts 48*b* receive the right and left sides of the upper body 99*a* of the occupant (mainly shoulders, shoulder blades, franks, upper arms, etc.) and are slightly compressed. The extending parts 41*b* mainly support the rear-half of the sides of the breast-height part of the occupant's upper body via bank parts 48*b*. Since the bank parts 48*b* (thin walls 48*k*) are supported from the rear by the extending parts 41*b*, the thin walls 48*k* are not significantly bent backward even if the thin walls 48*k* are pressed backward by the upper body 99*a* of the occupant. The extending parts 41*b* of the pressure receiving member 41 can achieve enough ability to laterally hold the upper body 99*a* of the occupant in spite of the recesses 48*g*. Although the thin walls 48*k* are harder than other portion and have reduced cushioning performance, the extending parts 41*b* can compensate for the reduced cushioning performance.

The slits 48*e* help backward deformation of the thin walls 48*k*. The thin walls 48*k*, however, are not significantly bent backward even if the upper body 99*a* of the occupant leaning against the backrest 4 presses the thin walls 48*k* backward since the extending parts 41*b*, which extend across the slits 48*e*, receive the thin walls 48*k* from the rear. Thus, the upper body 99*a* of the occupant can be laterally held.

In addition, the support of the back of the occupant by the surface of the pressure receiving member 41 stabilizes the sitting posture of the occupant.

Each extending part 41*b* is in contact with the rear surface of the bank part 48*b* (thin wall 48*k*) even if the occupant does not lean against the backrest 4. When the occupant leans against the backrest 4, the upper body 99*a* of the occupant is laterally held by the bank parts 48*b*. The ability to laterally hold the upper body 99*a* of the occupant can be maintained regardless of the weight of the occupant.

At a rear-end collision by a vehicle running back (with the seat 1 mounted) against another vehicle or an obstacle or at a rear-end collision by another vehicle, a backward inertial force is applied to the occupant and the seat 1. In such a case, the back receiving part 48*a* and the pressure receiving member 41 retreat (refer to FIG. 9B). The upper body 99*a* sinks backward while the occupant leaning against the backrest 4 is hunched over. Almost at the same time, the back of occupant's head hits the headrest 6. This indicates that the back of occupant's head is received by the headrest 6 while the upper body 99*a* of the occupant is hunched over. This can prevent the backward tilting of the neck region of the occupant, thus reducing load applied to the neck region.

The rear surface of the upper portion of the back receiving part 48*a* is supported by the cross member 42. The central and lower portions of the back receiving part 48*a* retreat along with the pressure receiving member 41. This is likely to cause the upper body 99*a* of the occupant to be hunched over. The back of occupant's head is received by the headrest 6 in concurrence with the retreat of the upper body 99*a* of the occupant in a hunched posture. This can prevent the backward tilting of the neck region of the occupant, thus reducing load applied to the neck region.

The slits 48*e* and 48*f*, which are formed between the back receiving part 48*a* and each bank part 48*b*, cause the back receiving part 48*a* and the pressure receiving member 41 to retreat significantly. At the time of retreat, the thin walls 48*k* of the bank parts 48*b* are pressed backward by the right and left sides of the upper body 99*a* of the occupant (mainly shoulders, shoulder blades, franks, upper arms, etc.) and the thin walls 48*k* of the bank parts 48*b* are bent backward. The extending parts 41*b* of the pressure receiving member 41 are also pressed backward by the thin walls 48*k* and the extending parts 41*b* are bent backward resiliently. Since the front edge 41*b*1 of each extending part 41*b* (see FIG. 7) is in contact with the rear surface of the thin wall 48*k*, the extending parts 41*b* are likely to bend backward. The recesses 48*g* are formed on the rear surfaces of the bank parts 48*b*. This indicates that a space for retreating the thin walls 48*k* and the extending parts 41*b* of the pressure receiving member 41 is disposed on the rear of the bank parts 48*b*. This configuration can prevent the bank parts 48*b* from reducing the backward sinking of the upper body 99*a* of the occupant.

Since the contact portion between the end 48*k*1 of each thin wall 48*k* and the extending part 41*b* lies anterior to the contact portion between the lateral edge 41*e*1 of the bead 41*e* and the lateral edge of the rear surface of the back receiving part 48*a* (See FIG. 7), the extending part 41*b* is more likely to bend backward. Since each extending part 41*b* extends from the lateral edge 41*e*1 of the bead 41*e* diagonally forward to the lateral side (See FIG. 7), the extending part 41*b* is more likely to bend backward at an opposite lateral edge 41*e*2 of the bead 41*e*.

Since the vertical length of each slit 48*e* is greater than that of the extending part 41*b*, the back receiving part 48*a* and the main body part 41*a* of the pressure receiving member 41 are likely to retreat, the thin walls 48*k* of the bank parts 48*b* are likely to bend backward, and the extending parts 41*b* of the pressure receiving member 41 are likely to retreat. All of this can prevent the cushion pad 48 from reducing the backward sinking of the upper body 99*a* of the occupant.

Since the widths of the slits 48e are expanded by the pull strips 49e, the back receiving part 48a is likely to retreat and the thin walls 48k of the bank parts 48b are likely to bend backward. This can prevent the cushion pad 48 from reducing the backward sinking of the upper body 99a of the occupant.

The gaps 48i and 48j are provided at the upper and lower edges of the extending part 41b. This prevents the bank parts 48b from reducing the retreat of extending parts 41b and the backward deformation of the extending parts 41b. This can prevent the extending parts 41b from reducing the backward sinking of the upper body 99a of the occupant.

A larger impulsive force moves the swing members 45a backward against the tensile load of the tension springs 45d and causes the pressure receiving member 41 to further retreat. With the backward movement of the swing members 45a, the backward displacement of the pressure receiving member 41 decreases toward the upper portion and increases toward the lower portion. The lower gaps 48j, which are larger than the upper gaps 48i, can prevent the bank parts 48b from reducing the retreat of the extending parts 41b when the pressure receiving member 41 moves backward in such a way as mentioned above. This can prevent the extending parts 41b from reducing the backward sinking of the upper body 99a of the occupant.

Since the lower portion of each slit 48e extends downward from the lower inner circumferential wall of the recess 48g, the lower portion of back receiving part 48a is likely to retreat. This causes the back receiving part 48a to retreat along with the pressure receiving member 41 even if the pressure receiving member 41 has an increasing backward displacement toward its bottom end.

Since the steps 48h protrude diagonally backward to the lateral sides, the steps 48h bend toward the lateral sides such that the recesses 48g open at the time of the backward deformation of the thin walls 48k of the bank parts 48b. This prevents the steps 48h from reducing the backward deformation of the extending parts 41b. This can prevent the extending parts 41b from reducing the backward sinking of the upper body 99a of the occupant.

Each step 48h protrudes diagonally backward to the lateral side such that the step 48h deviates from the trajectory of the front edge 41b1 of the extending part 41b (See FIG. 7) drawn when the extending part 41b is pressed and bent backward by the thin wall 48k. This prevents the steps 48h from reducing the backward deformation of the extending parts 41b.

Since the mounts 43a are attached to the vertical pipe segments 40b1 not at the front ends thereof, the front edges 41b1 of the extending parts 41b do not come into contact with the mounts 43a when the extending parts 41b are pressed and bent backward by the thin walls 48k. This prevents the mounts 43a from reducing the backward deformation of the extending parts 41b.

The thin walls 48k, which are harder than other portion, prevent the distribution of the inertial force applied when the upper body 99a of the occupant sinks backward over the bank parts 48b, thus making the thin walls 48k of the bank parts 48b more likely to bend backward. This can prevent the bank parts 48b from reducing the backward sinking of the upper body 99a of the occupant.

The scope of the present invention should not be limited to the above embodiment and various changes and modifications can be made without departing from the spirit and scope of the present invention.

In the above description, the seat 1 is a vehicle seat used in an automobile, but may be used for other means of transportation, such as railway, vessels and airplanes.

[Additional Statement on First Embodiment]

As is evident from the above description, the description of the first embodiment includes various disclosures on technical ideas in addition to the aspect of the invention described in the following notes.

Note 1.

A seat backrest, including:

right and left side frame segments disposed in parallel in a right-left direction;

a pressure receiving member disposed between the side frame segments, the pressure receiving member being movable in a front-back direction; and a cushion pad covering front surfaces of the side frame segments and a front surface of the pressure receiving member, wherein the pressure receiving member includes:

a main body part; and right and left extending parts extending rightward and leftward from right and left sides of the main body part, wherein the cushion pad includes:

a back receiving part covering a front surface of the main body part, and bank parts disposed on right and left sides of the back receiving part, protruding forward from right and left sides of a front surface of the back receiving part, and covering front surfaces of the extending parts and the front surfaces of the side frame segments, and wherein a recess is formed at an area of a rear surface of each bank part, the area facing a corresponding extending part of the extending parts.

Note 2.

The seat backrest according to Note 1, wherein each extending part is in contact with the rear surface of the bank part in the recess.

Note 3.

The seat backrest according to Note 1 or 2, wherein each extending part fits in the recess and each extending part is away from an inner circumferential wall of the recess.

Note 4.

The seat backrest according to Note 3, wherein a gap between a lower inner circumferential wall of the recess and the extending part is larger than a gap between an upper inner circumferential wall of the recess and the extending part.

Note 5.

The seat backrest according to one of Notes 1 to 4, wherein the area of the recess of each bank part is harder than other area of the bank part.

Note 6.

The seat backrest according to one of Notes 1 to 5, wherein a step protrudes from a bottom of each recess diagonally backward to a lateral side, the step being a lateral edge of the recess.

Note 7.

The seat backrest according to Note 6, wherein each step protrudes diagonally backward to the lateral side such that the step deviates from a trajectory of a front edge of the extending part, the trajectory being drawn when the extending part is pressed and bent backward by the area of the recess of the bank part.

Note 8.

The seat backrest according to one of Notes 1 to 7, wherein the cushion pad has right and left slits, each slit being formed at a boundary between the back receiving part and the corresponding bank part and penetrating from a front surface to a rear surface of the cushion pad, and wherein each extending part extends across the corresponding slit on a rear of the back receiving part and the bank part.

Note 9.

The seat backrest according Note 8, wherein a vertical length of the slit is greater than a vertical length of the extending part.

Note 10.

The seat backrest according to Note 8 or 9, wherein each recess is disposed along an edge, adjacent to the bank part, of the slit and extends from the edge, adjacent to the bank part, of the slit toward a lateral side, and wherein each slit extends downward from a lower inner circumferential wall of the recess.

Note 11.

The seat backrest according to one of Notes 8 to 10, further including:

a skin covering the cushion pad;

right and left pulling members disposed on a rear surface of the skin; and a hook and loop fastener disposed on the pulling members, wherein the pulling members extend through the slits and are routed to a rear surface of the back receiving part, the back receiving part is tightened with the pulling members, the pulling members are bonded with the hook and loop fastener, and a dent is formed at an area on the rear surface of the back receiving part, the area overlapping with the hook and loop fastener.

(a) Advantageous Effects of Present Invention Described in Note 1

Recesses are formed on the rear surfaces of the bank parts to provide a space into which the recess areas of the bank parts retreat and bend. Upon a rear-end collision by another vehicle, the bank parts receive the sides of the upper body of an occupant, while the recess areas of the bank parts retreat and bend. This can prevent the bank parts from reducing the backward sinking of the upper body of the occupant.

When an occupant leans against the backrest, the recess areas of the bank parts are received by the extending parts of the pressure receiving member. Although the recesses on the rear surfaces of the bank parts reduce the holding ability of the bank parts themselves, the extending parts can compensate for the reduced holding ability.

(b) Advantageous Effects of Present Invention Described in Note 2

The extending parts are in contact with the rear surfaces of the bank parts in the recesses. When an occupant leans against the backrest, the recess areas of the bank parts are readily received by the extending parts of the pressure receiving member. Thus, the extending parts enhance the advantageous effects of the supplemental holding ability.

(c) Advantageous Effects of Present Invention Described in Note 3

Since each extending part is apart from the inner circumferential wall of the recess, the extending parts do not come into contact with the inner circumferential walls of the recesses at the time of retreat of the extending parts along with the recess areas of the bank parts. This can prevent the extending parts from reducing the backward sinking of the upper body of the occupant.

(d) Advantageous Effects of Present Invention Described in Note 4

If the pressure receiving member has an increasing backward displacement toward its bottom end at a rear-end collision by another vehicle, contact between each extending part and the inner circumferential wall of the recess can be avoided since the gap between the lower inner circumferential wall of each recess and the extending part is larger than the gap between the upper inner circumferential wall of the recess and the extending part. This can prevent the extending parts from reducing the backward sinking of the upper body of the occupant.

(e) Advantageous Effects of Present Invention Described in Note 5

The recess areas, which are harder than other portions, prevent the distribution of the inertial force applied at the time of backward pressing of the recess areas by the upper body of an occupant over the bank parts. This action facilitates backward deformation of the recess areas. This can prevent the bank parts from reducing the backward sinking of the upper body of the occupant.

(f) Advantageous Effects of Present Invention Described in Note 6

Since the steps protrude diagonally backward to the lateral sides, the steps bend toward the lateral sides such that the recesses open at the time of the backward deformation of the recess areas. This prevents the steps from reducing the retreat and backward deformation of the extending parts. This can prevent the extending parts from reducing the backward sinking of the upper body of the occupant.

(g) Advantageous Effects of Present Invention Described in Note 7

The steps can maintain proper retreat and backward deformation of the extending parts. This prevents the extending parts from reducing the backward sinking of the upper body of the occupant.

(h) Advantageous Effects of Present Invention Described in Note 8

The slit formed in the boundary between the back receiving part and each bank part can cause the back receiving part and the pressure receiving member to retreat significantly. This enables the upper body of the occupant to more readily sink backward at a rear-end collision by another vehicle.

The formed slits enable the recess areas to readily bend backward. Since each extending part extends across the slit and faces the recess area, the recess areas do not significantly bend backward at the time of backward pressing of the recess areas by the upper body of the occupant leaning against the backrest. Thus, the upper body of the occupant can be laterally held.

(i) Advantageous Effects of Present Invention Described in Note 9

The vertical length of each slit, which is greater than that of the extending part, enables the back receiving part and the main body part of the pressure receiving member to readily retreat, the recess areas to readily bend backward, and the extending parts of the pressure receiving members to readily retreat. This can prevent the cushion pad from reducing the backward sinking of the upper body of an occupant.

(j) Advantageous Effects of Present Invention Described in Note 10

The lower portion of each slit, which extends downward from the lower inner circumferential wall of the recess, enables the lower portion of the back receiving part to readily retreat. This structure facilitates backward sinking of the upper body of the occupant at a rear-end collision by another vehicle.

(k) Advantageous Effects of Present Invention Described in Note 11

The pulling members passing through the slits tighten the back receiving part and thus expand the width of each slit. This structure facilitates backward sinking of the upper body of the occupant at a rear-end collision by another vehicle.

A dent is formed on the portion that overlaps with the hook and loop fastener on the rear surface of the back receiving part to prevent the hook and loop fastener from being caught between the back receiving part and the pressure receiving member. This structure can prevent an abnormal noise that would be generated by the contact between the hook and loop fastener and the back receiving part, the pressure receiving member or both.

Second Embodiment

Figure 10:
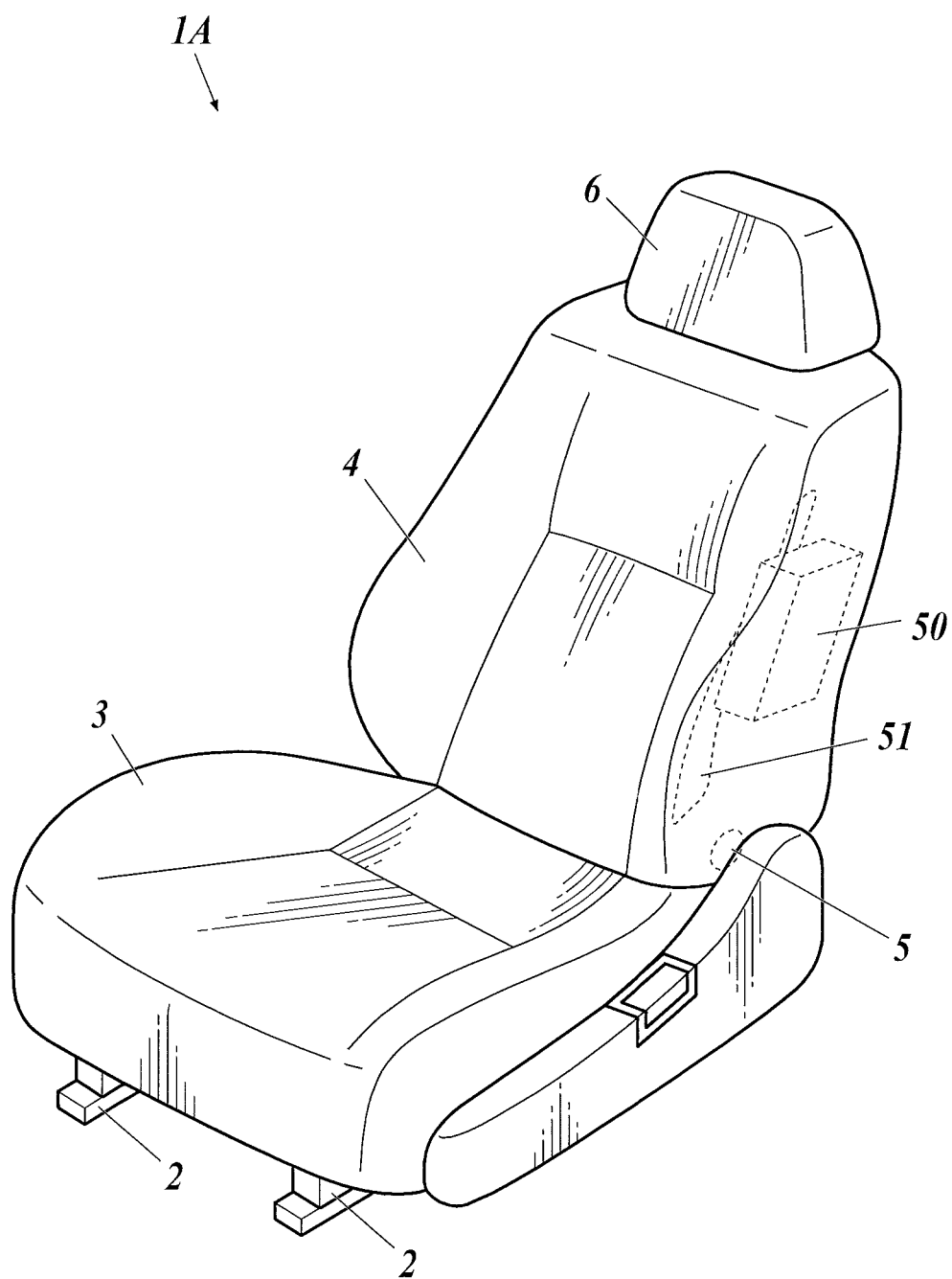
FIG. 10 is a perspective view of a seat according to a second embodiment of the present invention.

FIG. 10 is a perspective view of a seat 1A according to a second embodiment of the present invention. The same parts between the seat 1A according to the second embodiment and the seat 1 according to the first embodiment are given the same reference numerals. If the same parts are provided in the same manner, the explanation thereof will be omitted if possible. The following description focuses on differences between the seat 1A according to the second embodiment and the seat 1 according to the first embodiment.

The seat 1A is a vehicle seat, in particular an automotive seat. The seat 1A includes slide rails 2, a bottom seat 3, a recliner mechanism 5, and a headrest 6. These are provided in the same way as the slide rails 2, the bottom seat 3, the recliner mechanism 5, and the headrest 6 of the seat 1 according to the first embodiment.

Figure 11:
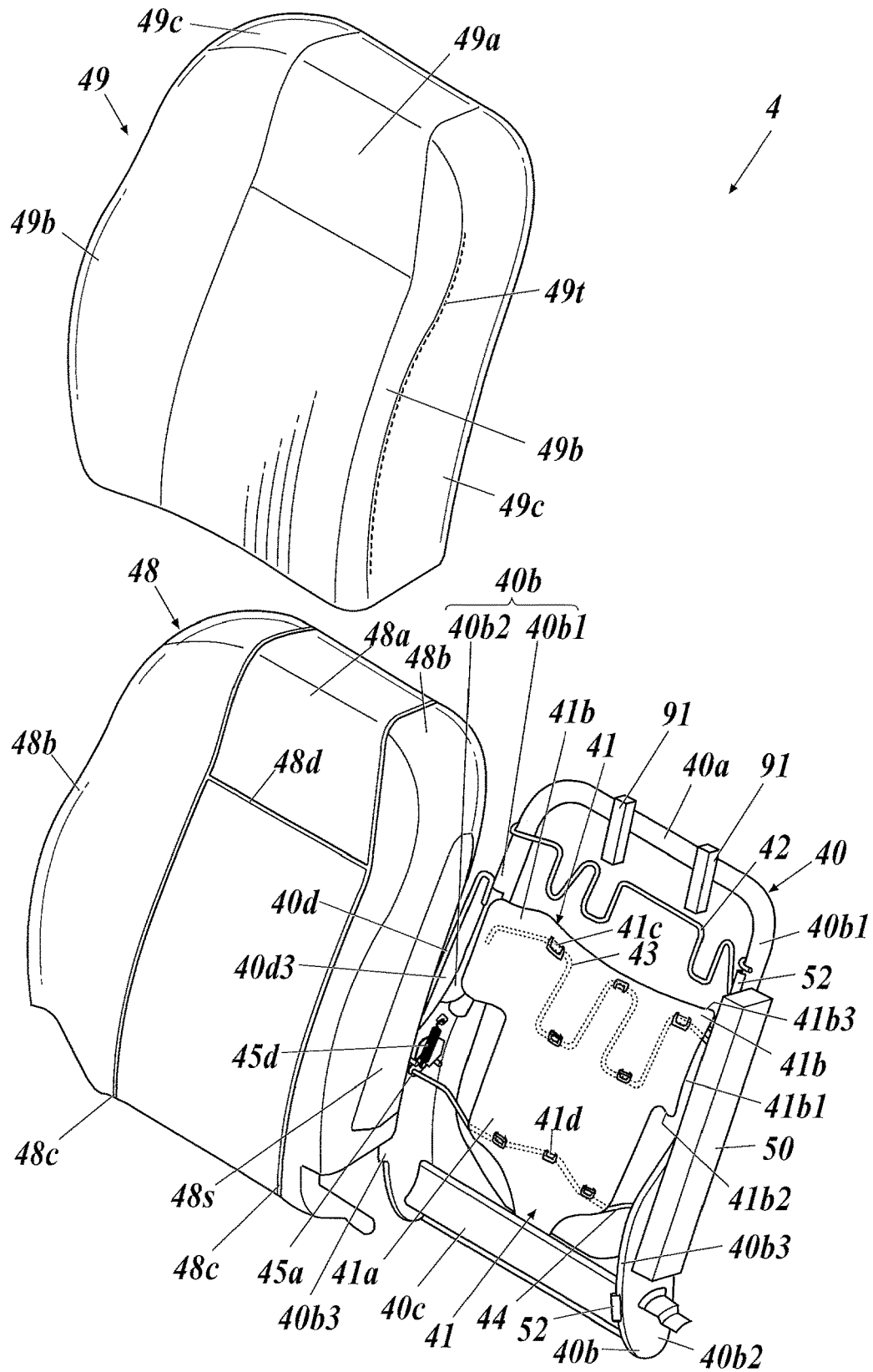
FIG. 11 is an exploded perspective view of a backrest according to the second embodiment of the present invention.
Figure 12:
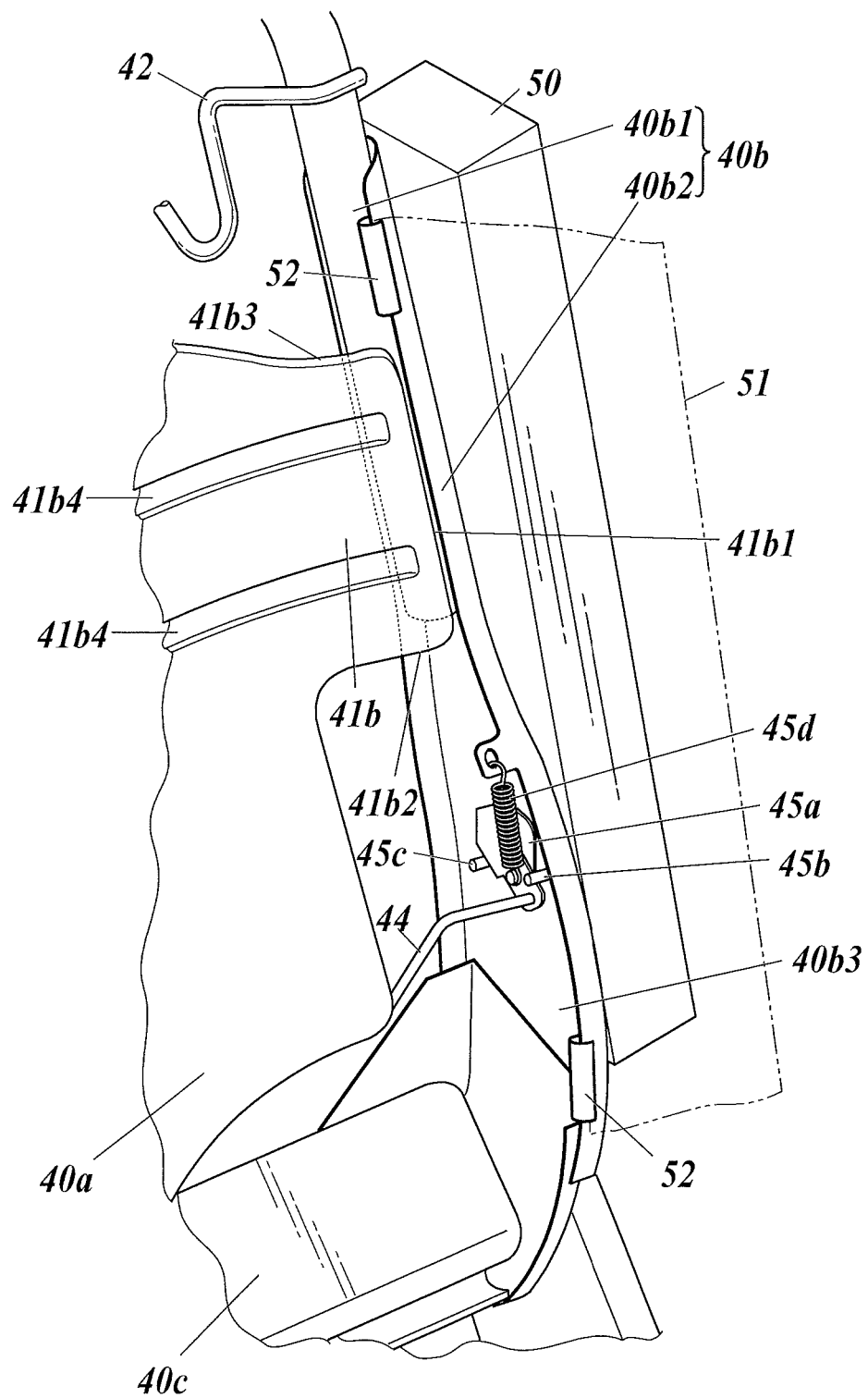
FIG. 12 is a perspective view of a side frame of the backrest according to the second embodiment of the present invention.
Figure 13:
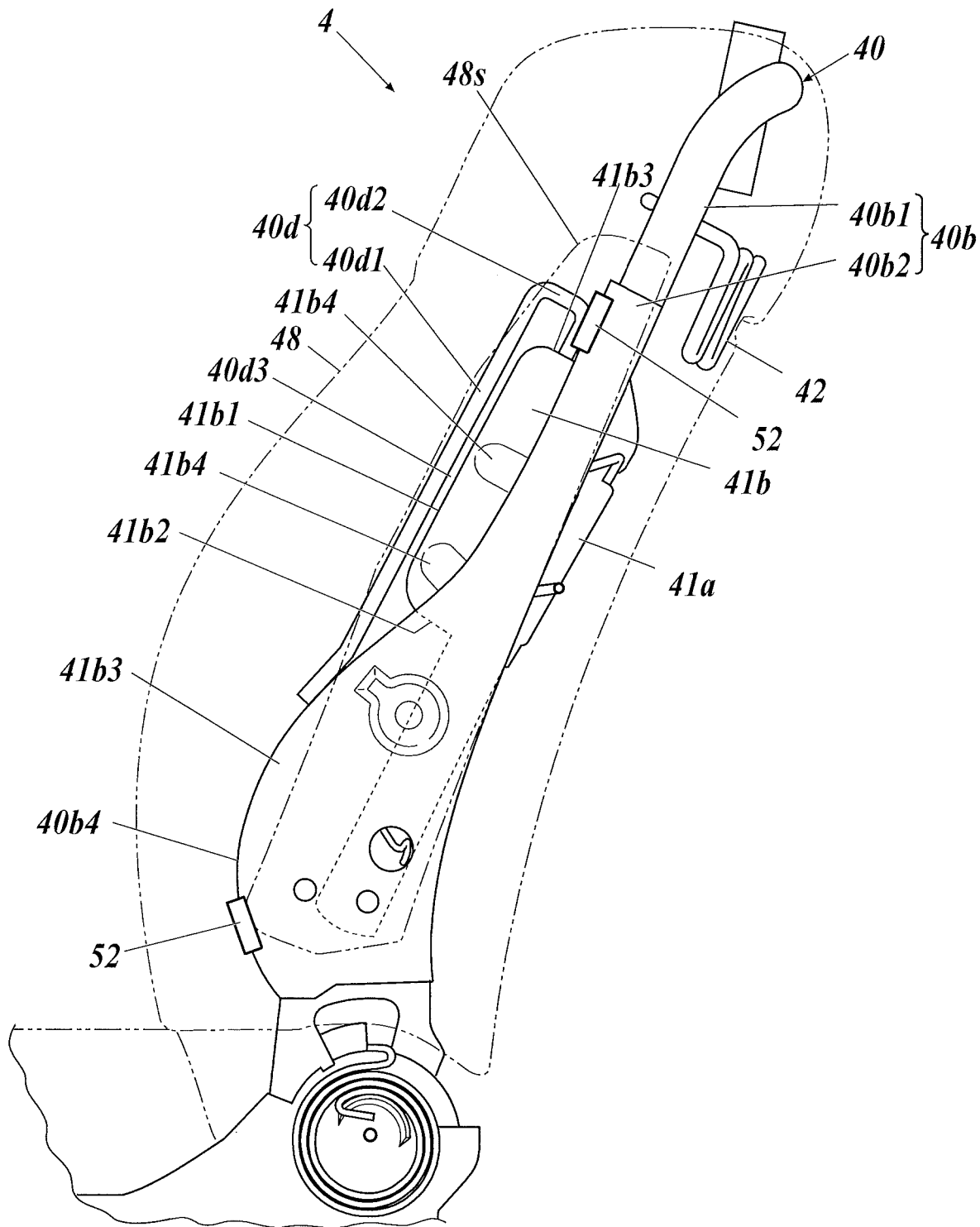
FIG. 13 is a side view of the backrest according to the second embodiment of the present invention.
Figure 14:
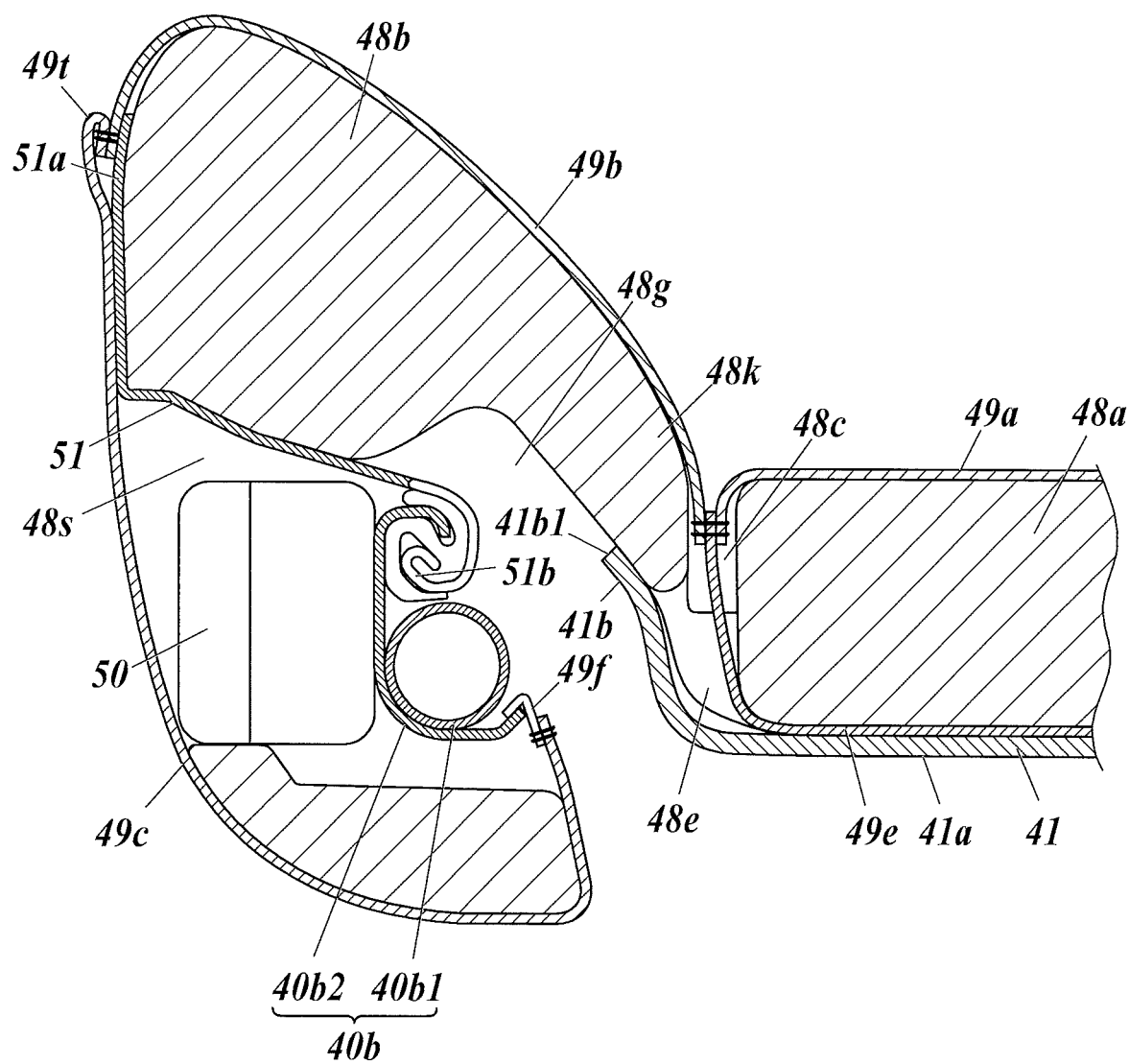
FIG. 14 is a transverse cross-sectional view of the backrest according to the second embodiment of the present invention.
Figure 15:
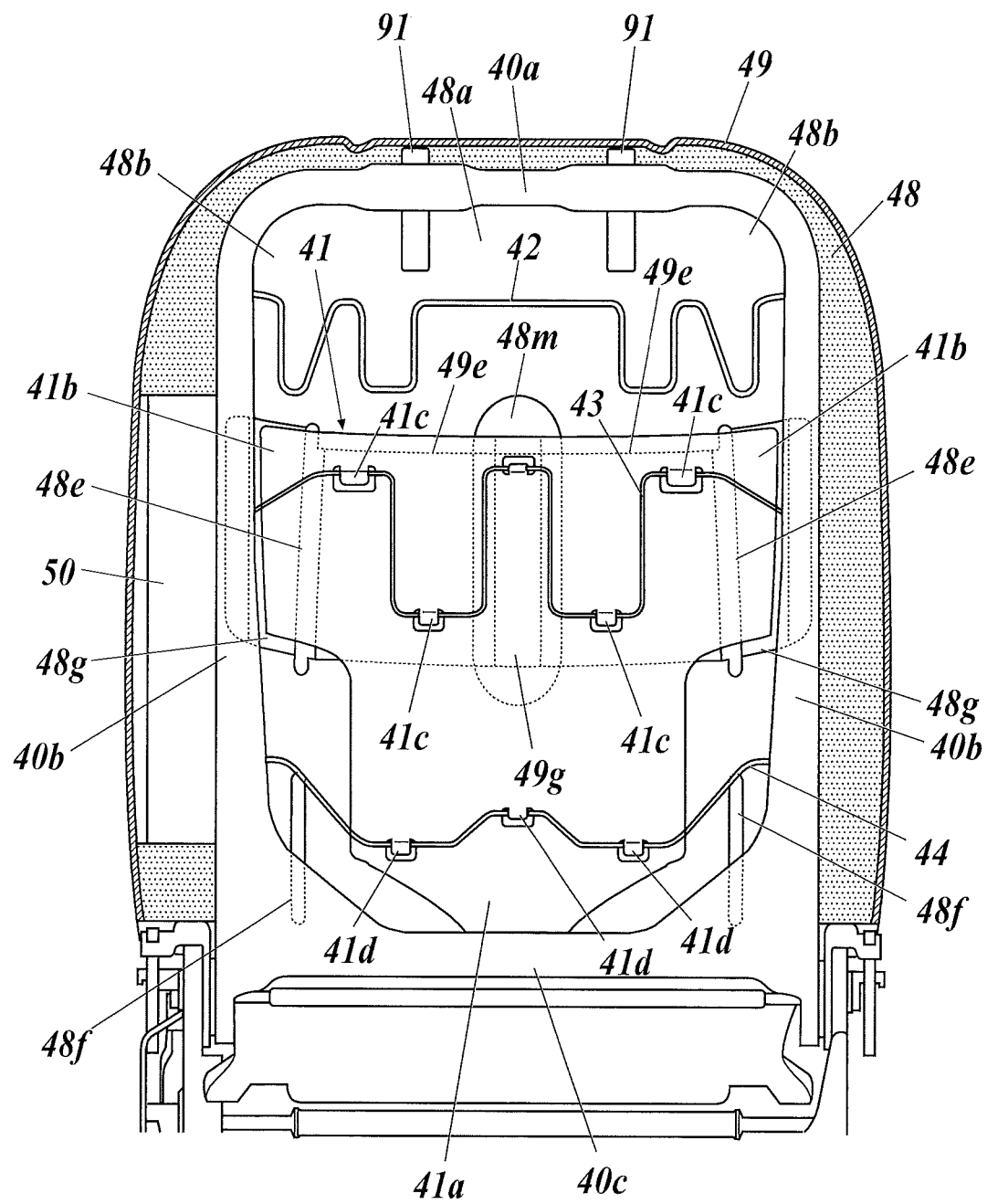
FIG. 15 is a partial cross-sectional back view that illustrates the back of the frame of the backrest and a partial longitudinal section of a cushion pad and a skin.

FIG. 11 is an exploded perspective view of the backrest 4. FIG. 12 is a perspective view of a side frame segment 40b of the backrest 4. FIG. 13 is a side view of the backrest 4. FIG. 14 is a transverse sectional view of the left portion of the backrest 4 in top view. FIG. 15 is a longitudinal sectional view of the cushion pad 48 and a partial cross-sectional back view of the backrest 4.

As shown in FIGS. 11 to 15, the backrest 4 includes a backrest frame 40, a pressure receiving member 41, a cross member 42, an upper wire rod 43, a lower wire rod 44, a cushion pad 48 and a skin 49, similarly to the first embodiment. The backrest 4 further includes an airbag module 50, a reinforcing cloth (guide cloth) 51, upper and lower reinforcing cloth attaching members 52 and a side support member 40d.

The backrest frame 40 in the second embodiment is provided in the same manner as that in the first embodiment.

The pressure receiving member 41 in the second embodiment is provided in the same manner as that in the first embodiment, except for beads 41b4. As shown in FIG. 12, the beads 41b4 are formed in the extending parts 41b and extend in the right-left direction. The beads 41b4 each have a concave shape on the front surfaces of the extending parts 41b and a convex shape on the rear surfaces of the extending parts 41b. The beads 41b4 enhance the rigidity of the extending parts 41b.

The beads 41b4 may each have a convex shape on the front surfaces of the extending parts 41b and a concave shape on the rear surfaces of the extending parts 41b. The beads 41b4 may be formed on the extending parts 41b also in the first embodiment.

The cushion pad 48 in the second embodiment is also provided in the same manner as that in the first embodiment, except for a storage space 48s. The storage space 48s is formed on the left of the cushion pad 48 in the second embodiment to store an airbag module 50. More specifically, the storage space 48s is formed on the left side of the left bank part 48b and extends from the left side to the inside of the left bank part 48b. An airbag module 50 is stored in the storage space 48s. The airbag module 50 is embedded in the left portion of the cushion pad 48 and the skin 49 covers the cushion pad 48 and the airbag module 50 such that the airbag module 50 is exposable from the left side of the cushion pad 48. More specifically, a left bank skin part 49b covers the airbag module 50 and blocks the storage space 48s.

The airbag module 50 will now be described.

As shown in FIGS. 10 to 15, the airbag module 50 is in contact with the outside (left) of a left side frame segment 40b. The airbag module 50 includes at least an inflator and an airbag, and if necessary, a retainer, a lid, an impact sensor, and a control circuit. Upon detection of a vehicle impact by the impact sensor, a signal from the impact sensor is input to the inflator via the control circuit. In response to the signal, the inflator is ignited. The gas generated in the inflator inflates the airbag instantly.

As shown in FIGS. 11 and 13, a side support member 40d is attached to the front end of the right side frame 40b by welding. The side support member 40d is composed of a rod member bent in a hook shape. The side support member 40d includes a vertical section 40d1 and a bent section 40d2. The vertical section 40d1 is apart from the front surface of the side frame segment 40b and extends vertically. The bent section 40d2 is bent backward at the top end of the vertical section 40d1 and then further bent downward. The rear end of the bent section 40d2 is fixed to the upper front end of the main body part 40b2 of the side frame segment by welding. The bottom end of the vertical section 40d1 is fixed to a portion above the front end of a protrusion 40b3 by welding. In lateral view, an area 40d3 surrounded by the front surface of the side frame segment 40b and the side support member 40d is formed between the vertical section 40d1 and the front surface of the side support member 40d.

In lateral view (see FIG. 13), the front edges (front ends or ends of the extending parts) 41b1 of the right and left extending parts 41b are each disposed within the area 40d3 surrounded by the front end of the side frame segment 40b and the side support member 40d. The front surface of the side support member 40d is covered with a right bank part 48b of the cushion pad 48. The side support member 40d supports the right bank part 48b from the back and causes the bank part 48b to protrude forward. The side support member 40d may be provided in the first embodiment.

The skin 49 and its stretching will now be described. In the portion of grooves 48c and 48d without slits 48e and 48f, the inner surface of the skin 49 is fixed to the cushion pad 48 by an engaging member, such as a C ring. A hook 49f is provided at the end of each side skin part 49c. The hook 49f is hooked to the side frame segment 40b. The skin 49 is stretched over the surface of the cushion pad 48 in such a manner as to maintain the tension of the skin 49.

As shown in FIGS. 14 and 15, a pair of right and left pull strips (pulling members) 49e are coupled to a seam between a front skin part 49a and the bank skin parts 49b by sewing, bonding or adhesion inside the skin 49. More specifically, each pull strip 49e is sewn to the front skin part 49a and the bank skin part 49b, while it is sandwiched between the end of the front skin part 49a and the end of the bank skin part 49b. The connection portions between the skin 49 and the pull strips 49e overlap with the positions of the slits 48e. Each pull strip 49e extends through the slit 48e and is routed from the front surface of the back receiving part 48a and the bank part 48b to the rear surface thereof. The pull strips 49e are bonded together by a hook and loop fastener 49g on the rear surface of the back receiving part 48a, while the skin 49 is pulled backward by the pull strips 49e. The pull strips 49e are tensioned. The back receiving part 48a is tightened by the pull strips 49e. The skin 49 is stretched over the surface of the cushion pad 48 in such a manner, thereby maintaining the tension of the skin 49.

A dent 48m is formed on the portion of the rear surface of the back receiving part 48a that overlaps with the hook and loop fastener 49g to prevent the hook and loop fastener 49g from being caught between the back receiving part 48a and the pressure receiving member 41. This can prevent an abnormal noise that would be generated by the contact between the hook and loop fastener 49g and the back receiving part 48a, the pressure receiving member 41 or both.

Figure 16:
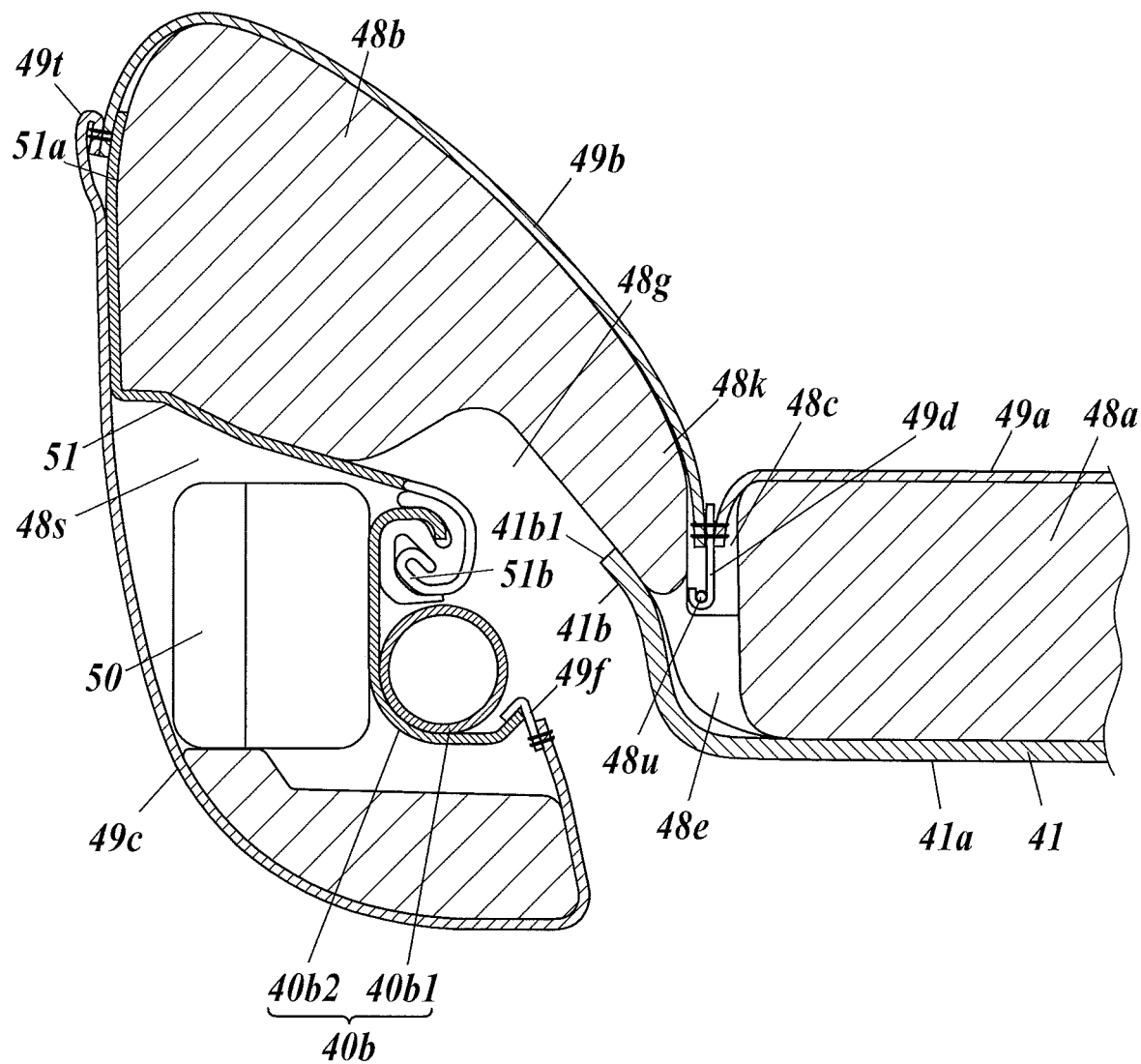
FIG. 16 is a transverse sectional view of the backrest for describing a point modified from the backrest shown in FIG. 14.

As shown in FIG. 16, a first engaging member 49d and a second engaging member 48u, instead of the pull strips 49e, may be used to stretch the skin 49 over the surface of the cushion pad 48. Multiple first engaging members 49d are provided inside the skin 49 at the seam between the front skin part 49a and each bank skin part 49b. The first engaging members 49d are disposed along the grooves 48c. The second engaging member 48u is also provided in the portion of each groove 48c that overlaps with the slit 48e. The first engaging members 49d are inserted into the grooves 48c while the skin 49 remains tensioned to engage the first engaging members 49d with the second engaging members 48u.

As shown in FIG. 11, a planned rupture portion 49t is provided on the skin 49. The planned rupture portion 49t is formed at the front of the side portion of a left bank part 48b. The seam between the left side skin part 49c and a left bank skin part 49b is the planned rupture portion 49t. The planned rupture portion 49t has lower strength than the other portion of the skin 49. The seam of the planned rupture portion 49t has lower strength than that of other seams on the skin 49. The seam of the planned rupture portion 49t has strength that can endure normal use but causes the seam to rupture with a tensile force applied at the inflation of the airbag in the airbag module 50.

A reinforcing cloth 51 and reinforcing cloth attaching members 52 will now be described.

As shown in FIG. 14, the reinforcing cloth 51 has one end 51a coupled to the inside of the skin 49. More specifically, the one end 51a of the reinforcing cloth 51 is sewn to the left bank skin part 49b and the side skin part 49c at the planned rupture portion 49t.

Figure 17:
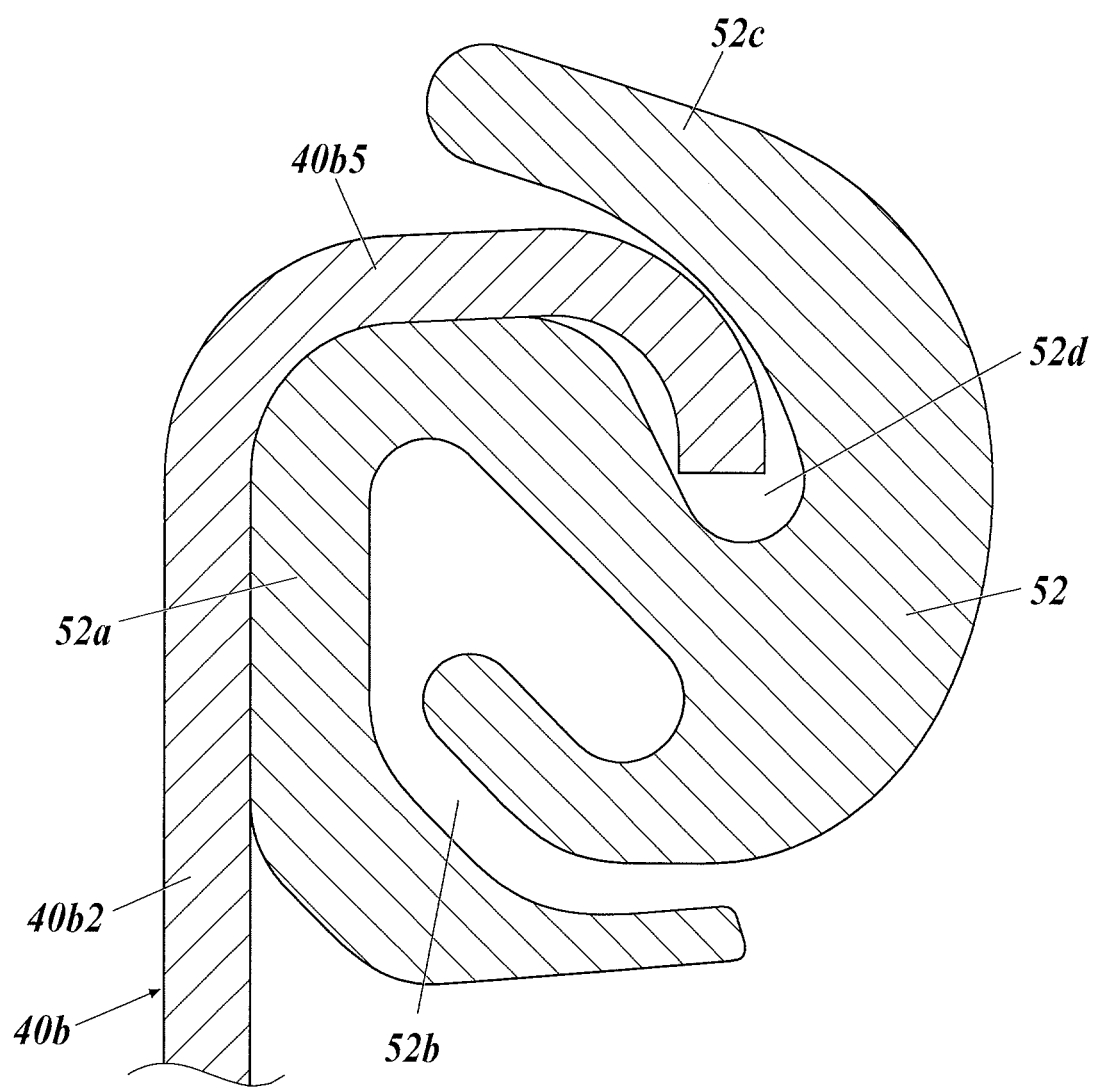
FIG. 17 is a transverse sectional view of the front end of the side frame of the backrest and a hook according to the second embodiment of the present invention.

The reinforcing cloth 51 has other end 51b coupled to the side frame segment 40b via the reinforcing cloth attaching member 52. FIG. 17 is a cross-sectional view showing how the reinforcing cloth attaching member 52 is attached to the side frame segment 40b. As shown in FIG. 17, the reinforcing cloth attaching member 52 is a clip made of a resin material. The reinforcing cloth attaching member 52 includes a spiral structure 52a, a spiral notch 52b, an engaging portion 52c and an arc notch 52d. The spiral structure 52a has arms wound with a gap formed between the arms. A gap created by the arm of the spiral structure 52a is the spiral notch 52b. The spiral notch 52b is opened at the outermost part of the spiral structure 52a. The engaging portion 52c extends from a near-center portion of the outermost periphery of the spiral structure 52a along the outermost periphery of the spiral structure 52a. A gap is formed between the engaging portion 52c and the spiral notch 52b. The gap is the arc notch 52d. The arc notch 52d opens at the end of the engaging portion 52c. The front end 40b5 of each side frame segment 40b (the main body part 40b2 of each side frame segment) is curved into a hook (the curved portion is hereinafter referred to as "hook 40b5"). The end of the hook 40b5 is inserted into the arc notch 52d. The spiral structure 52a is disposed inside the hook 40b5. The end of the hook 40b5 is held between the spiral structure 52a and the engaging portion 52c. The reinforcing cloth attaching member 52 is thereby attached to the side frame segment 40b. One end of the reinforcing cloth 51 is inserted into the spiral notch 52b, wound along the spiral notch 52b, and thus held by the spiral structure 52a. The reinforcing cloth attaching member 52 is attached to the end of the reinforcing cloth 51 in such a manner. A plate-like or rod-like filling member may be inserted into the spiral notch 52b so that the end of the reinforcing cloth 51 can be securely held by the spiral structure 52a.

As shown in FIG. 14, the reinforcing cloth 51 is stretched from the planned rupture portion 49t to each reinforcing cloth attaching member 52 via the periphery of the airbag module 50, while it is tensioned. More specifically, the reinforcing cloth 51 is stretched over the side of the bank part 48b from the front of the side surface of the left bank part 48b to the edge of the storage space 48s. The reinforcing cloth 51 further extends from the edge of the storage space 48s to the side frame segment 40b through the storage space 48s, while it is tensioned.

The reinforcing cloth 51 is composed of less stretching cloth. The inflation of the airbag in the airbag module 50 increases the tension of the reinforcing cloth 51. The reinforcing cloth 51 works to transmit the tension to the planned rupture portion 49t. The reinforcing cloth 51 is a guide member that guides the direction of deploying the airbag. The airbag is guided toward the planned rupture portion 49t by reinforcing cloth 51 during the inflation of the airbag in the airbag module 50. When the airbag inflates, it protrudes forward through the planned rupture portion 49t.

The positions of the reinforcing cloth attaching members 52 will now be described.

The reinforcing cloth attaching members 52 are positioned so as to deviate from the trajectory, drawn at a time of a front-back movement of the pressure receiving member 41, of the left extending part 41b (See FIGS. 11 to 14).

The lower reinforcing cloth attaching member 52 is attached to the side frame segment 40b at a position anterior to a front edge 41b1 of the left extending part 41b while the pressure receiving member 41 is in the natural state (a backward load is not applied to the pressure receiving member 41 and thus the pressure receiving member 41 does not retreat) (See FIGS. 13 and 14).

The upper reinforcing cloth attaching member 52 is attached to the side frame segment 40b above the lower edge 41b2 of the left extending part 41b while the pressure receiving member 41 is in the natural state (See FIGS. 11 to 13). The lower reinforcing cloth attaching member 52 is attached to the side frame segment 40b below the lower edge 41b2 of the left extending part 41b while the pressure receiving member 41 is in the natural state (See FIGS. 11 to 13).

The upper reinforcing cloth attaching member 52 is attached to the side frame segment 40b above an upper edge 41b3 of the left extending part 41b while the pressure receiving member 41 is in the natural state (See FIGS. 11 to 13). In other words, the reinforcing cloth attaching members 52 are attached to the side frame segment 40b at a position above the left extending part 41b and below the left extending part 41b while the pressure receiving member 41 is in the natural state. Either the upper reinforcing cloth attaching member 52 or the lower reinforcing cloth attaching member 52 may be omitted, i.e., one reinforcing cloth attaching member 52 may be attached to the side frame segment 40*b* above the left extending part 41*b* or below the left extending part 41*b* while the pressure receiving member 41 is in the natural state.

The reinforcing cloth attaching members 52 are each attached to the side frame segment 40*b* above or below a most forward protruding portion 40*b*4 of the protrusion 40*b*3 (See FIG. 13).

The reinforcing cloth attaching members 52 are each attached to the side frame segment 40*b* above or below the beads 41*b*4 while the pressure receiving member 41 is in the natural state (See FIG. 12).

The upper reinforcing cloth attaching member 52 is disposed above the left extending part 41*b*. The lower reinforcing cloth attaching member 52 is disposed below the left extending part 41*b*. These reinforcing cloth attaching members 52 are vertically separated from each other. This leads to a stable attachment of the reinforcing cloth 51.

The operation and use of the seat 1A with such a configuration will now be described.

An occupant is seated on the bottom seat 3 and leans the upper body against the backrest 4. The occupant is often seated with the head slightly spaced apart from the headrest toward the front.

The back of the occupant is received by the front surface of the back receiving part 48*a*. The back receiving part 48*a* is resiliently compressed. The bank parts 48*b* receive the right and left sides of the upper body 99*a* of the occupant (mainly shoulders, shoulder blades, franks, upper arms, etc.) and are slightly compressed. Since the bank parts 48*b* (thin walls 48*k*) are supported from the rear by the extending parts 41*b*, the thin walls 48*k* are not significantly bent backward even if the thin walls 48*k* are pressed backward by the upper body of the occupant. Thus, the extending parts 41*b* of the pressure receiving member 41 can prevent the reduction in the ability to laterally hold the upper body of the occupant due to recesses 48*g*.

The slits 48*e*, which are formed on the bottom of the grooves 48*c*, help backward deformation of the thin walls 48*k*. The thin walls 48*k*, however, are not significantly bent backward even if the upper body of the occupant leaning against the backrest 4 presses the thin walls 48*k* backward since the extending parts 41*b*, which extend across the slits 48*e*, receive the thin walls 48*k* from the rear. Thus, the upper body of the occupant can be laterally held.

Each extending part 41*b* is in contact with the rear surface of the bank part 48*b* (thin wall 48*k*) even if the occupant does not lean against the backrest 4. When the occupant leans against the backrest 4, the upper body of the occupant is laterally held by the bank parts 48*b*. The ability to laterally hold the upper body of the occupant can be maintained regardless of the weight of the occupant.

At a rear-end collision by a vehicle running back (with the seat 1A mounted) against another vehicle or an obstacle or at a rear-end collision by another vehicle, a backward inertial force is applied on the occupant and the seat 1A. In such a case, the back receiving part 48*a* and the pressure receiving member 41 retreat. The upper body sinks backward while the occupant leaning against the backrest 4 is hunched over. Almost at the same time, the back of occupant's head hits the headrest 6. This indicates that the back of occupant's head is received by the headrest 6 while the upper body of the occupant is hunched over. This can prevent the backward tilting of the neck region of the occupant, thus reducing load applied to the neck region.

The slits 48*e*, which are formed between the back receiving part 48*a* and the bank parts 48*b*, cause the back receiving part 48*a* and the pressure receiving member 41 to retreat significantly. At the time of retreat, the thin walls 48*k* of the bank parts 48*b* are pressed backward by the right and left sides of the upper body of the occupant (mainly shoulders, shoulder blades, franks, upper arms, etc.) and the thin walls 48*k* of the bank parts 48*b* are bent backward. The extending parts 41*b* of the pressure receiving member 41 are also pressed backward by the thin walls 48*k* and the extending parts 41*b* are bent backward. The recesses 48*g* are formed on the rear surfaces of the bank parts 48*b*. This indicates that a space for retreating the thin walls 48*k* and the extending parts 41*b* of the pressure receiving member 41 is disposed in front of the rear surfaces of the bank parts 48*b*. This configuration can prevent the bank parts 48*b* from reducing the backward sinking of the upper body of the occupant.

A larger impulsive force moves the swing members 45*a* backward against the tensile load of the tension springs 45*d* and causes the pressure receiving member 41 to further retreat. With the backward movement of the swing members 45*a*, the backward displacement of the pressure receiving member 41 decreases toward the upper portion and increases toward the lower portion.

As described above, the reinforcing cloth attaching members 52 deviate from the trajectory, drawn at a time of the retreat of the pressure receiving member 41, of the left extending part 41*b*. This configuration can prevent contact of the left extending part 41*b* with the reinforcing cloth attaching members 52, and thus maintain proper retreat of the left extending part 41*b* and the pressure receiving member 41. This ensures a desired retreating distance of the pressure receiving member 41 and prevents the reinforcing cloth attaching members 52 from reducing the backward sinking of the upper body of the occupant.

The lower reinforcing cloth attaching member 52 is attached to the side frame segment 40*b* at a position anterior to the front edge 41*b*1 of the left extending part 41*b*. This configuration can further prevent the lower reinforcing cloth attaching member 52 from reducing the retreat of the left extending part 41*b* and thus can further ensure a desired retreating distance of the pressure receiving member 41.

Although each extending part 41*b* has a larger backward displacement in the lower direction, the vertical positions of the reinforcing cloth attaching members 52 deviate from the lower edge 41*b*2 of the left extending part 41*b*. This configuration can further prevent the reinforcing cloth attaching members 52 from reducing the retreat of the left extending part 41*b* and thus can further ensure a desired retreating distance of the pressure receiving member 41.

The upper reinforcing cloth attaching member 52 is disposed above the left extending part 41*b* and the lower reinforcing cloth attaching member 52 is disposed below the left extending part 41*b*. This configuration can further prevent the reinforcing cloth attaching members 52 from reducing the retreat of the left extending part 41*b* and thus can further ensure a desired retreating distance of the pressure receiving member 41. This configuration can further increase the degree of freedom in the shape of each extending part 41*b* and thus can expand the extending part 41*b*. A larger extending part 41*b* has a greater ability to laterally hold the upper body of the occupant.

The reinforcing cloth attaching members 52 are attached to the side frame segment 40*b* above or below the most forward protruding portion 40*b*4 of the protrusion 40*b*3. This configuration can further prevent the reinforcing cloth attaching members 52 from reducing the retreat of the left extending part 41b. This configuration can further increase the degree of freedom in the shape of each extending part 41b and thus can expand the extending parts 41b. A larger extending part 41b has a greater ability to laterally hold the upper body of the occupant.

The front edge 41b1 of the right extending part 41b is within the area 40d3, which is surrounded by the front end of the side frame segment 40b and the side support member 40d. This configuration can prevent contact of the right extending part 41b with the side support member 40d at the backward deformation of the right extending part 41b. This can ensure a desired retreating distance of the pressure receiving member 41 and prevent the side support member 40d from reducing the backward sinking of the upper body of the occupant.

The reinforcing cloth attaching members 52, which are clips, can be made smaller. Smaller reinforcing cloth attaching members 52 can prevent contact of the extending part 41b with the reinforcing cloth attaching members 52 at the time of retreat of the pressure receiving member 41.

The scope of the present invention should not be limited to the above embodiment and various changes and modifications can be made without departing from the spirit and scope of the present invention. The following description focuses on several modifications. These modifications are the same as the second embodiment except for some changes. The following modifications may be combined according to demand.

[First Modification of Second Embodiment]

Figure 18:
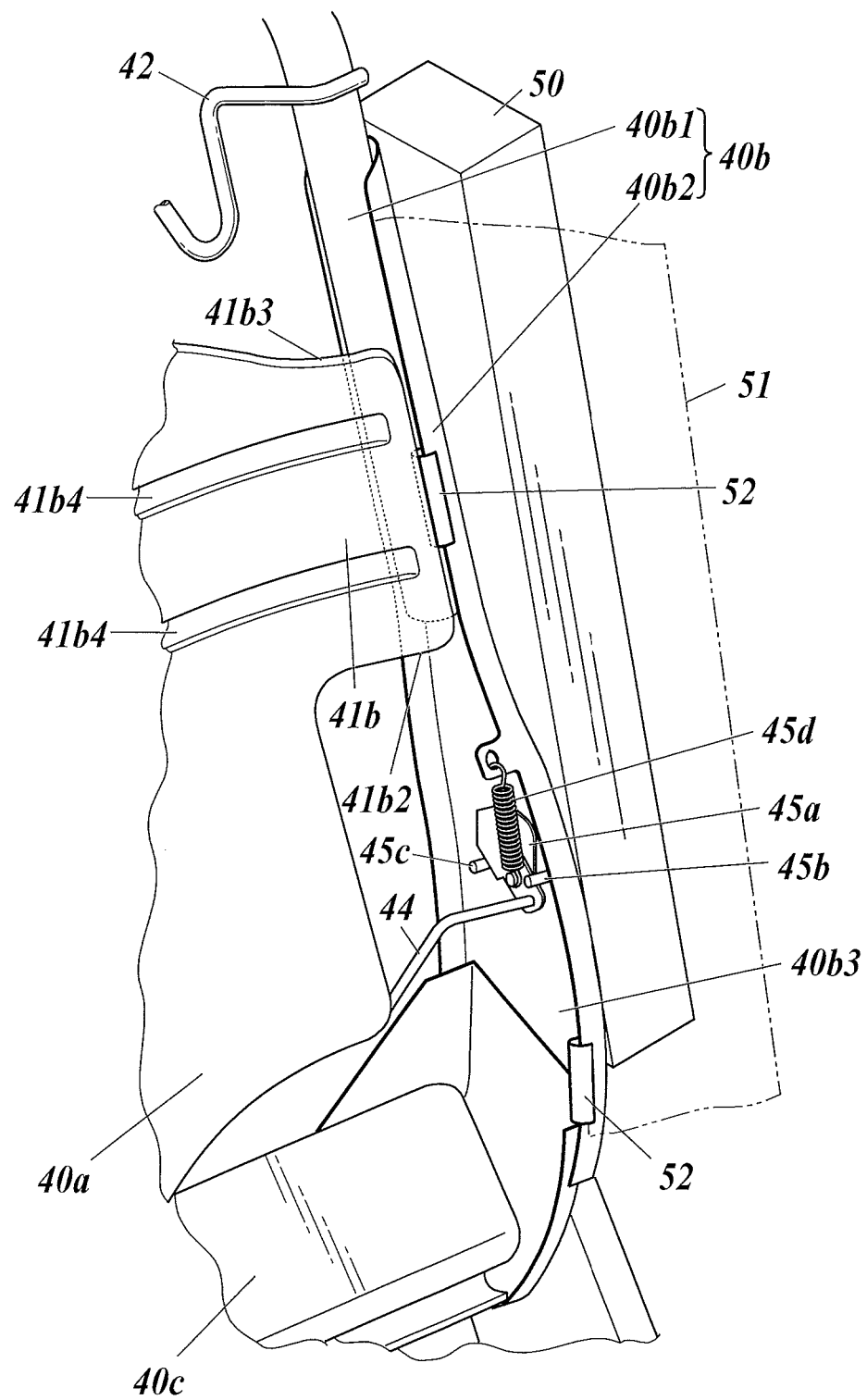
FIG. 18 is a perspective view of a side frame of a backrest according to a first modification of the second embodiment of the present invention.
Figure 19:
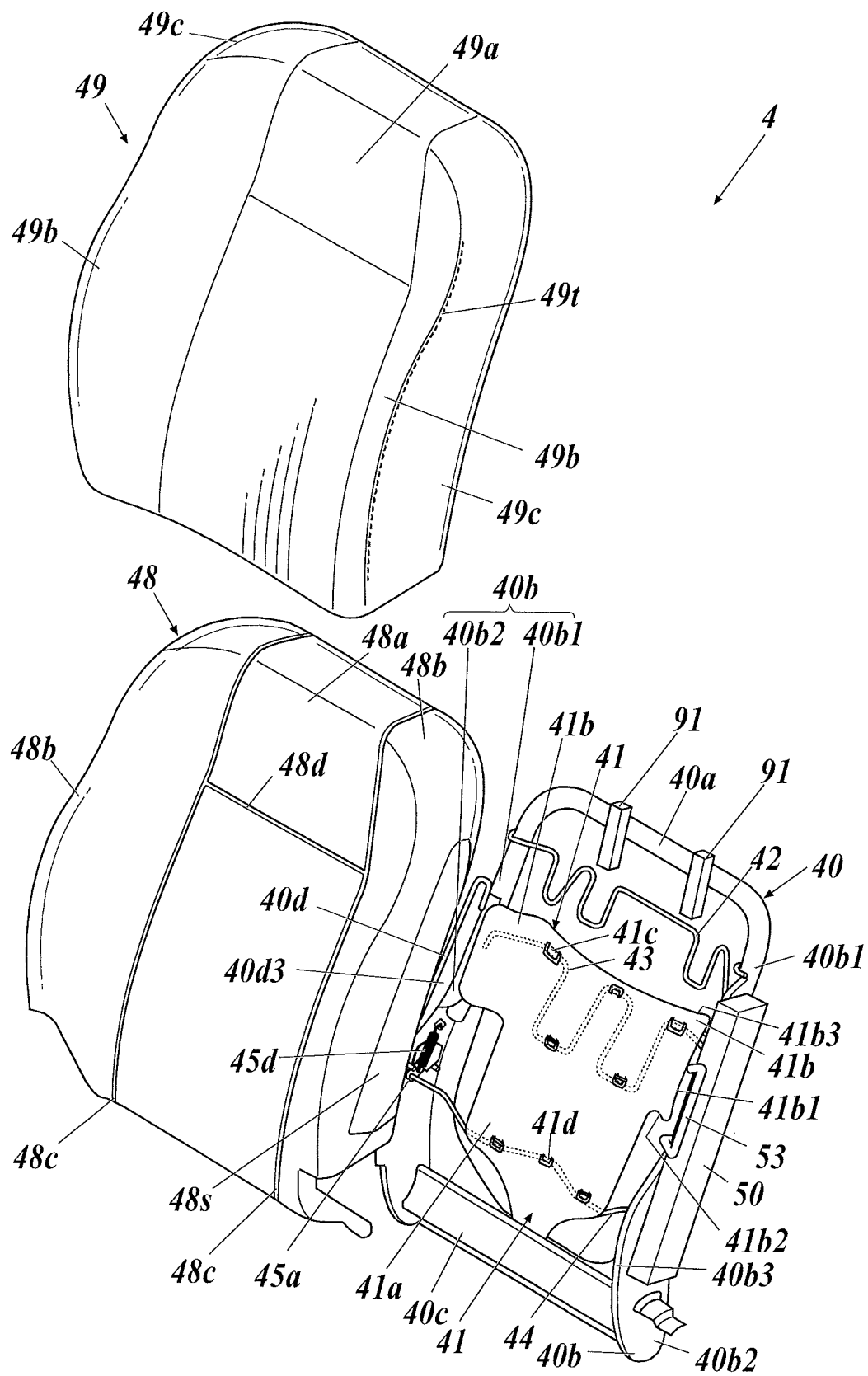
FIG. 19 is an exploded perspective view of a backrest according to a third modification of the second embodiment of the present invention.
Figure 20:
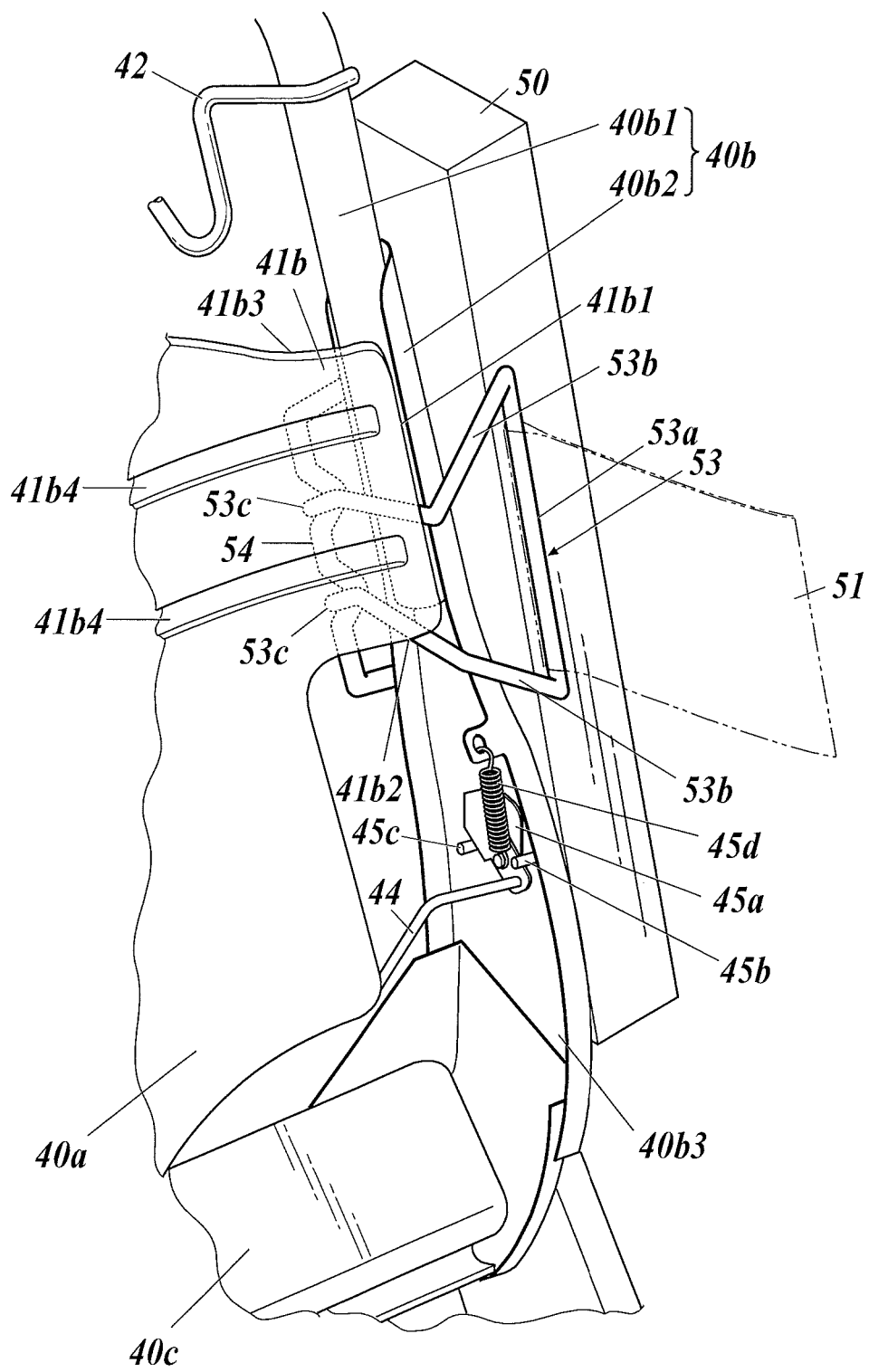
FIG. 20 is a perspective view of a side frame of the backrest according to the third modification of the second embodiment of the present invention.
Figure 21:
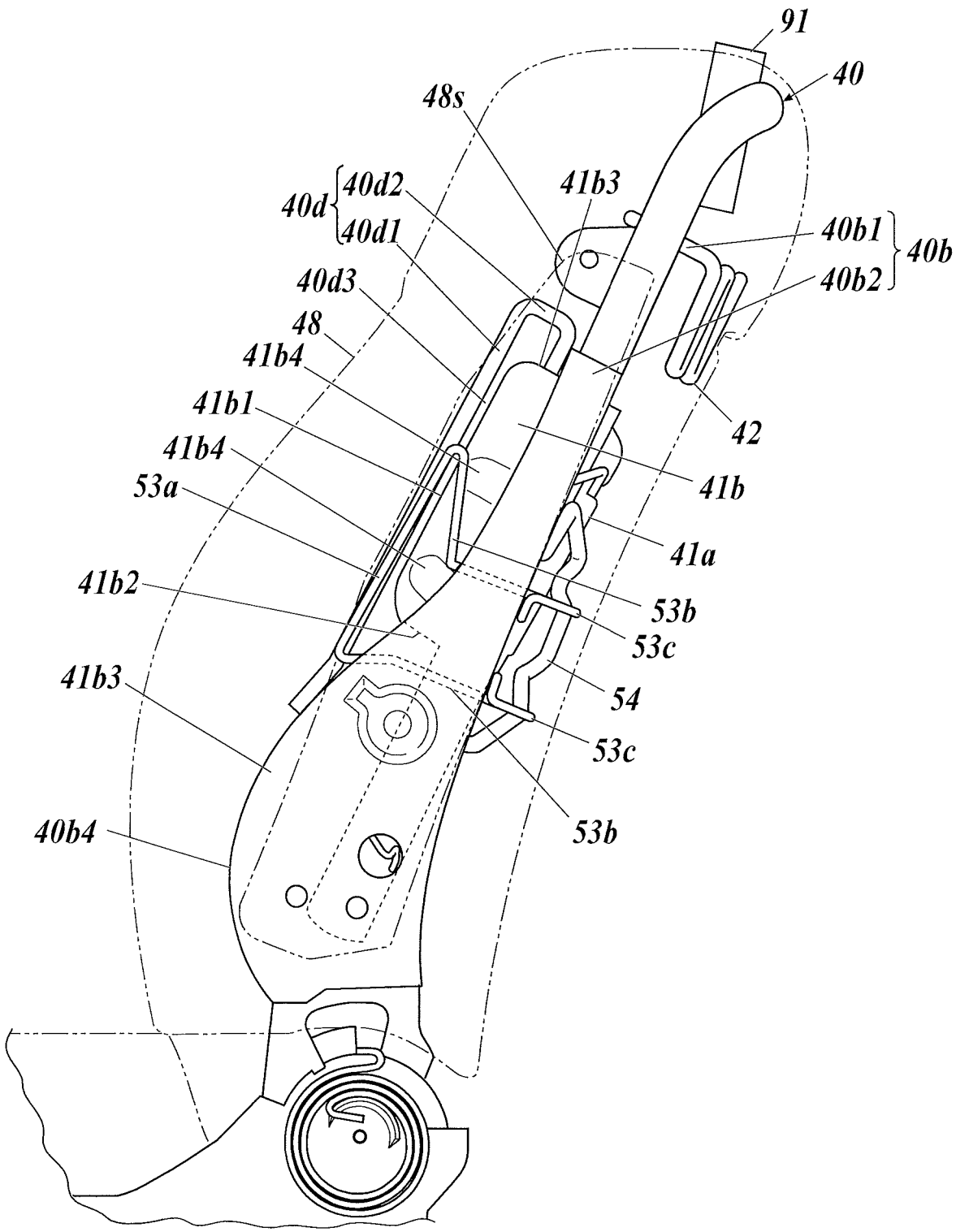
FIG. 21 is a side view of the backrest according to the third modification of the second embodiment of the present invention.
Figure 22:
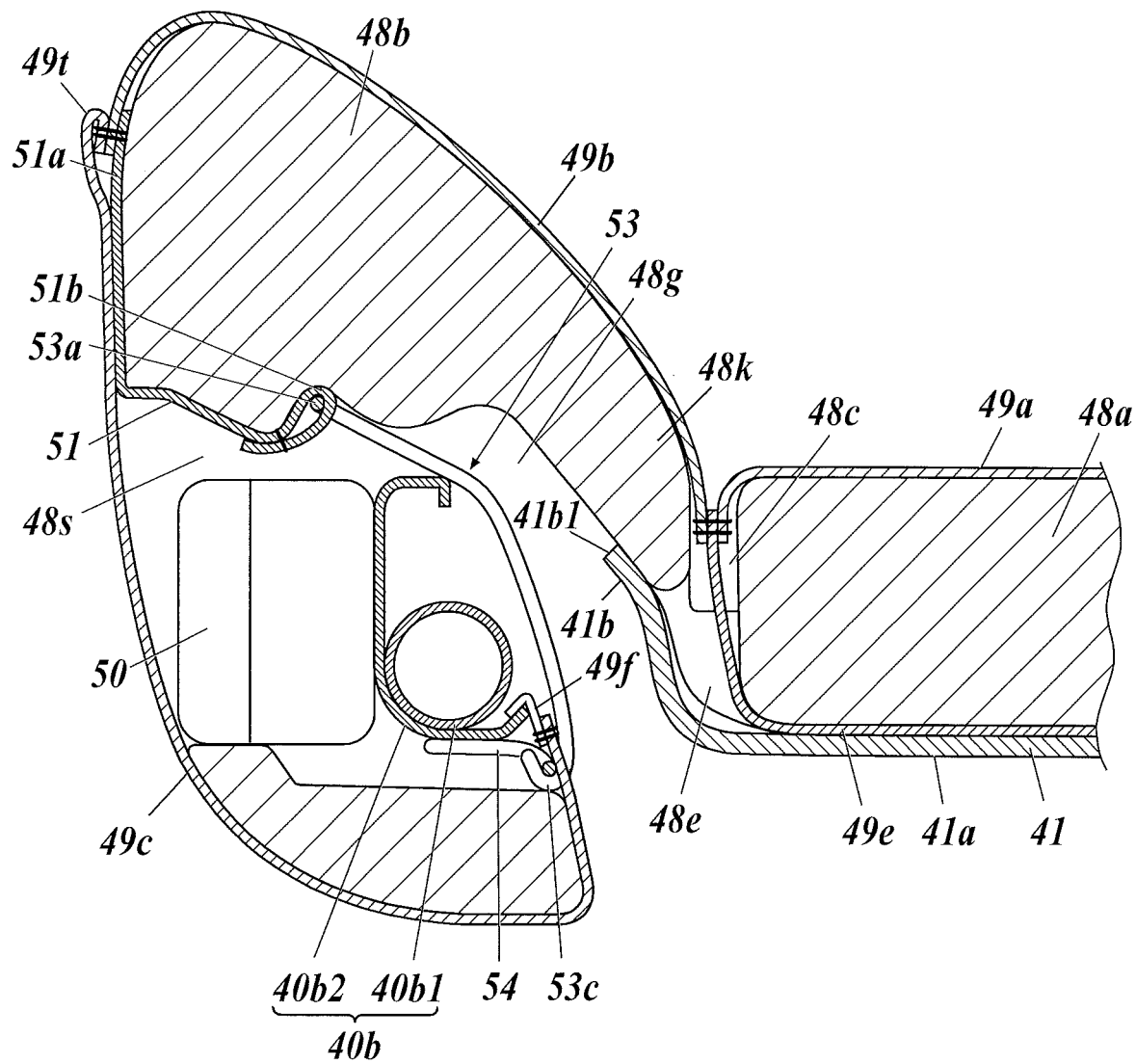
FIG. 22 is a transverse sectional view of the backrest according to the third modification of the second embodiment of the present invention.

In the second embodiment, the upper reinforcing cloth attaching member 52 is attached to the side frame segment 40b above the upper edge 41b3 of the left extending part 41b. In a first modification, the upper reinforcing cloth attaching member 52 is attached to the side frame segment 40b above the lower edge 41b2 of the left extending part 41b and below the upper edge 41b3 of the left extending part 41b while the pressure receiving member 41 is in the natural state (See FIG. 18). In other words, the vertical position of the upper reinforcing cloth attaching member 52 aligns with that of the left extending part 41b. In this case, the beads 41b4 are formed at positions deviate upward or downward from the upper reinforcing cloth attaching member 52. This configuration can prevent contact of the beads 41b4 with the upper reinforcing cloth attaching member 52 at the time of retreat of the left extending part 41b.

[Second Modification of Second Embodiment]

In the second embodiment, one or two reinforcing cloth attaching members 52 are attached to the left side frame segment 40b. In a second modification, three or more reinforcing cloth attaching members 52 are used. Even in that case, any of the reinforcing cloth attaching members 52 is attached to the side frame segment 40b at a position deviating from the trajectory, drawn at a time of a front-back movement of the pressure receiving member 41, of the left extending part 41b.

[Third Modification of Second Embodiment]

In the second embodiment, the reinforcing cloth attaching members 52 are clips made of resin. Each reinforcing cloth attaching member 52 holds the hook 40b5 of the side frame segment 40b with the spiral structure 52a and the engaging portion 52c. In contrast, a reinforcing cloth attaching member 53, used in place of the reinforcing cloth attaching members 52, of a third modification is a listing wire obtained by bending a wire rod, such as hard steel wire, piano wire or stainless steel wire, as shown in FIGS. 19 to 22. The reinforcing cloth attaching member 53 includes a support 53a, a pair of upper and lower arms 53b, and hooks 53c. The support 53a extends vertically in left front of the side frame segment 40b. The upper and lower arms 53b are bent backward at the top end and bottom end of the support 53a and extend on the right side (inside) and in front of the left side frame segment 40b. The hooks 53c are each bent at the rear ends of the arms 53b into a hook. The reinforcing cloth attaching member 53 is attached to the side frame segment 40b, in particular, to the main body part 40b2 of the side frame segment 40b via a latching member 54 made of metal. The latching member 54 is welded to the rear end of the left side frame segment 40b, in particular, to the main body part 40b2 of the side frame segment 40b, and protrudes rightward from the side frame segment 40b. A portion, protruding rightward from the side frame segment 40b, of the latching member 54 is formed into a gate (for example, angular U-shape or a U-shape). The hooks 53c of the reinforcing cloth attaching member 53 are hooked or tangled by the gate-shaped portion of the latching member 54. The rear ends of the arms 53b are thereby attached to the left side frame segment 40b via the latching member 54. Alternatively, the hooks 53c of the reinforcing cloth attaching member 53 may be directly hooked by the right side (inside) of the rear end of the left side frame segment 40b to attach the rear ends of the arms 53b to the left side frame segment 40b.

The reinforcing cloth 51, which is in a tension state, is stretched from the planned rupture portion 49t to a support 53a of the reinforcing cloth attaching member 53 via the periphery of the airbag module 50. The reinforcing cloth 51 has other end 51b folded back and sewed at the support 53a to form the other end 51b into a cylinder. The support 53a is inserted through the cylinder. The other end 51b of the reinforcing cloth 51 is thereby hooked to the support 53a.

The reinforcing cloth attaching member 53 is disposed at a position deviating from the trajectory, drawn at a time of a front-back movement of the pressure receiving member 41, of the left extending part 41b. This can prevent the reinforcing cloth attaching member 53 from reducing the retreat of the left extending part 41b.

In lateral view, the reinforcing cloth attaching member 53 is provided so as to avoid the beads 41b4. In other words, arms 53b are disposed above or below the beads 41b4 in lateral view. This configuration can prevent contact of the beads 41b4 with the reinforcing cloth attaching member 53 at the time of retreat of the left extending part 41b.

In lateral view, the upper arm 53b is disposed above the lower edge 41b2 of the extending part 41b. The lower arm 53b is disposed below the lower edge 41b2 of the extending part 41b. This configuration can further prevent the reinforcing cloth attaching member 53 from reducing the retreat of the left extending part 41b.

The reinforcing cloth attaching member 53 is disposed above a most forward protruding portion 40b4 of a protrusion 40b3. This configuration can further prevent the reinforcing cloth attaching member 53 from reducing the retreat of the left extending part 41b.

[Fourth Modification of Second Embodiment]

The structure of the above mentioned seat 1A may be left-right reversed. In other words, a seat obtained by mirror-reversing the above mentioned seat 1A may be used.

[Additional Statement on Second Embodiment]

As is evident from the above description of the second embodiment and its modifications, the description of the second embodiment and its modifications includes various disclosures on technical ideas in addition to the aspect of the invention described in the following notes.

Note 1.

A seat backrest including:

left and right side frame segments disposed in parallel in the right-left direction;

a pressure receiving member disposed between the side frame segments, the pressure receiving member being movable in a front-back direction;

an airbag module mounted on a side frame segment of the side frame segments;

a cushion pad covering front surfaces of the side frame segments and a front surface of the pressure receiving member;

a skin covering the cushion pad;

a reinforcing cloth attaching member attached to the side frame segment; and a reinforcing cloth stretching from a back of the skin to the reinforcing cloth attaching member via a periphery of the airbag module, wherein the pressure receiving member includes:

a main body part; and right and left extending parts extending rightward and leftward from right and left sides of the main body part, wherein the reinforcing cloth attaching member is provided at a position deviating from a trajectory of each extending part, the trajectory being drawn at a time of front-back moving of the pressure receiving member.

Note 2.

The seat backrest according to note 1, wherein the reinforcing cloth attaching member is disposed anterior to the front edge of an extending part of the extending parts.

Note 3.

The seat backrest according to note 1 or 2, wherein each extending part inclines upward toward the back, and the reinforcing cloth attaching member is disposed above or below a lower edge of the extending part.

Note 4.

The seat backrest according to one of notes 1 to 3, wherein the reinforcing cloth attaching member is disposed either above or below the extending part or both above and below the extending part.

Note 5.

The seat backrest according to one of notes 1 to 3, wherein a bead is formed on each extending part, a vertical position of the reinforcing cloth attaching member aligns with a vertical position of each extending part, and the reinforcing cloth attaching member is disposed above or below the bead.

Note 6.

The seat backrest according to note 1, wherein a bead is formed in each extending part, the reinforcing cloth attaching member is a wire rod including a support and a pair of upper and lower arms, the support extending vertically in front of one of the side frame segments and over which the reinforcing cloth is to be covered, and the pair of upper and lower arms bending backward at a top end and a bottom end of the support, extending in front of and inside of the side frame segment, and having rear ends attached to the side frame segment; and the arms are disposed above or below the bead.

Note 7.

The seat backrest according to one of notes 1 to 6, wherein,

A protrusion protruding forward is formed in the side frame segment, and the reinforcing cloth attaching member is disposed above or below a most forward protruding portion of the protrusion.

Note 8.

The seat backrest according to one of notes 1 to 7, further including a side support member attached to a front end of a side frame segment of the side frame segments, wherein the side support member includes a vertical section and a bent section, the vertical section vertically extending away from a front surface of the side frame segment, and the bent section being bent backward at an end of the vertical section and fixed to a front end of the side support member, and wherein, in lateral view, a front edge of the extending part is disposed in an area between the front surface of the side frame segment and the vertical section.

Note 9.

The seat backrest according to one of notes 1 to 6, wherein,

A protrusion protruding forward is formed in the side frame segment, the reinforcing cloth attaching member is a clip, and the reinforcing cloth attaching member is disposed below a most forward protruding portion of the protrusion.

(a) Advantageous Effects of Present Invention Described in Note 1

The present invention described in Note 1 can prevent contact of the extending parts with the reinforcing cloth attaching members at the time of retreat of the pressure receiving member, and thus can maintain proper retreat of the pressure receiving member. This ensures a desired retreating distance of the pressure receiving member and can maintain proper backward sinking of the upper body of the occupant.

(b) Advantageous Effects of Present Invention Described in Notes 2, 3 and 4

The present invention according to notes 2, 3 and 4 can further prevent contact of each extending part with the reinforcing cloth attaching members. It can maintain further proper retreat of the pressure receiving member. This ensures a desired retreating distance of the pressure receiving member.

(c) Advantageous Effects of Present Invention Described in Note 4

The present invention described in Note 4 increases the degree of freedom in the shape of each extending part. The reinforcing cloth attaching members, which are disposed both above and below the extending part, allow a stable attachment of the reinforcing cloth.

(d) Advantageous Effects of Present Invention Described in Note 5

The present invention described in Note 5 can prevent contact of the beads with the reinforcing cloth attaching member and thus can maintain proper retreat of the pressure receiving member. The beads enhance the rigidity of each extending part.

(e) Advantageous Effects of Present Invention Described in Note 6

The present invention described in Note 6 can prevent contact of the beads with the arms of the reinforcing cloth attaching member and thus can maintain proper retreat of the pressure receiving member. This ensures a desired retreating distance of the pressure receiving member. The beads enhance the rigidity of each extending part.

(f) Advantageous Effects of Present Invention Described in Note 7

The present invention described in Note 7 can prevent contact of the extending part with the reinforcing cloth attaching member and thus can maintain proper retreat of the pressure receiving member. This can increase the degree of freedom in the shape of the extending part.

(g) Advantageous Effects of Present Invention Described in Note 8

The present invention described in Note 8 can prevent contact of the extending part with the side support member and thus can maintain proper retreat of the pressure receiving member. This ensures a desired retreating distance of the pressure receiving member and can maintain proper backward sinking of the upper body of the occupant.

(h) Advantageous Effects of Present Invention Described in Note 9

The present invention described in Note 9 can prevent contact of the extending part with the reinforcing cloth attaching member and thus can maintain proper retreat of the pressure receiving member. This increases the degree of freedom in the shape of the extending part and can reduce the size of the reinforcing cloth attaching member, which is a clip.

Third Embodiment

Figure 23:
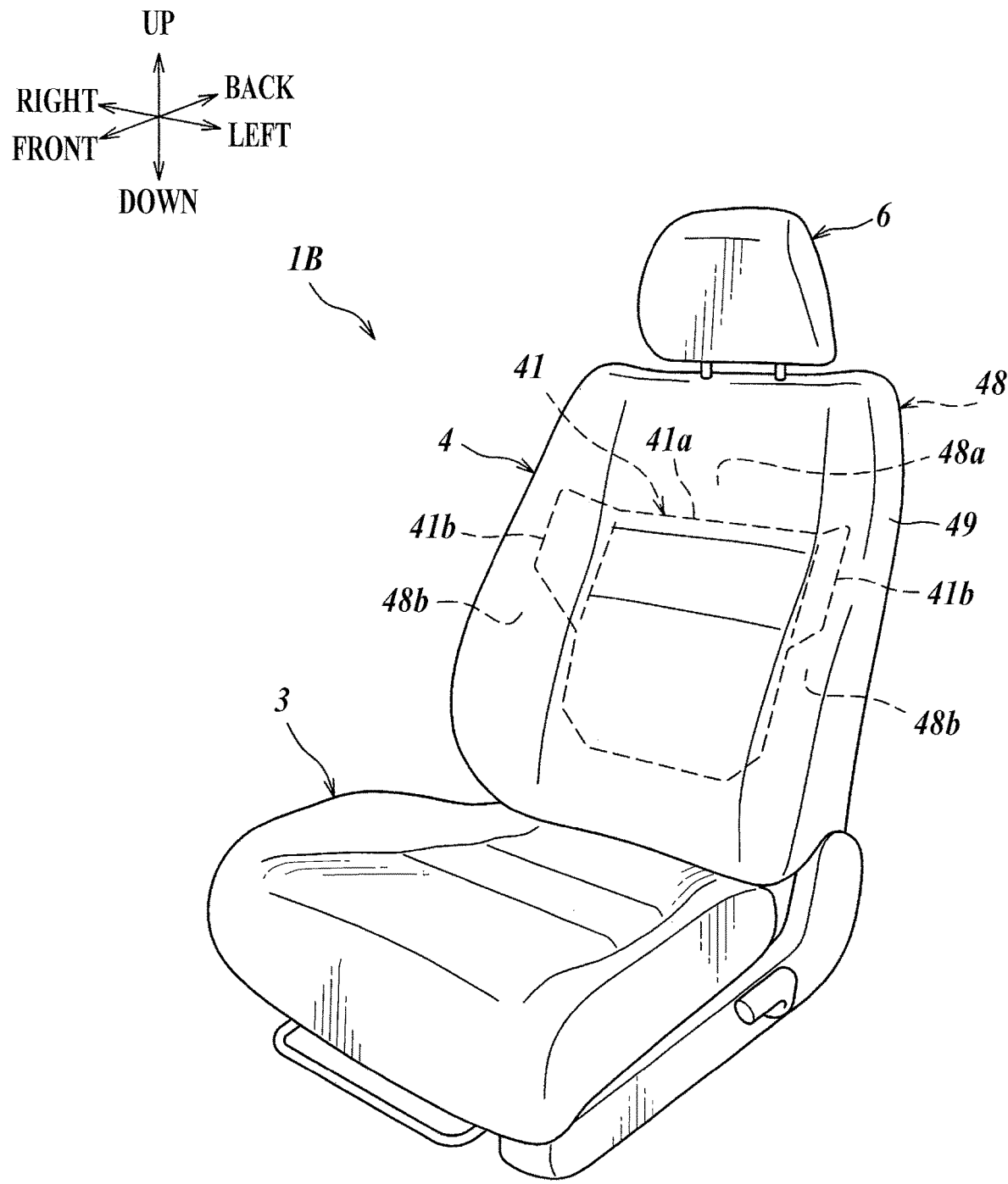
FIG. 23 is a perspective view of a seat according to a third embodiment of the present invention.
Figure 24:
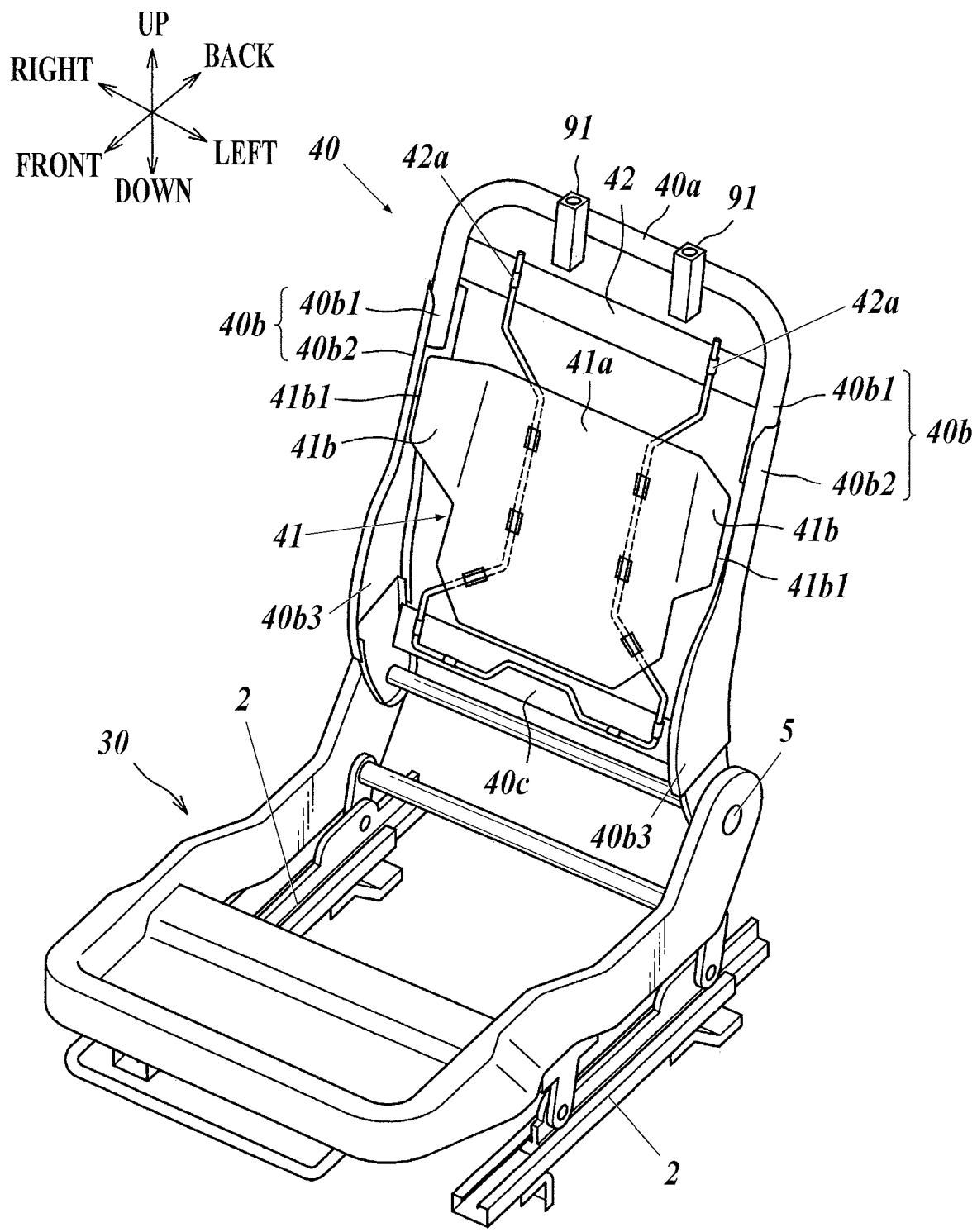
FIG. 24 is a perspective view of a frame in the seat according to the third embodiment of the present invention.

FIG. 23 is a perspective view of a seat 1B according to the third embodiment of the present invention. FIG. 24 is a perspective view of a seat frame of the seat 1B. The same parts between the seat 1B according to the third embodiment and the seat 1 according to the first embodiment are given the same reference numerals. If the same parts are provided in the same manner, the explanation thereof will be omitted if possible. The following description focuses on differences between the seat 1B according to the third embodiment and the seat 1 according to the first embodiment.

The seat 1B is also a vehicle seat, in particular an automotive seat. Similarly to the seat 1 according to the first embodiment, the seat 1B includes slide rails 2, a bottom seat 3, a backrest 4, a recliner mechanism 5, and a headrest 6. The slide rails 2, the bottom seat 3, the recliner mechanism 5, and the headrest 6 of the seat 1B of the third embodiment are provided in the same manner as the slide rails 2, the bottom seat 3, the recliner mechanism 5, and the headrest 6 of the seat 1 according to the first embodiment. The backrest 4 in the seat 1B according to the third embodiment is different from that in the seat 1 according to the first embodiment.

Figure 25:
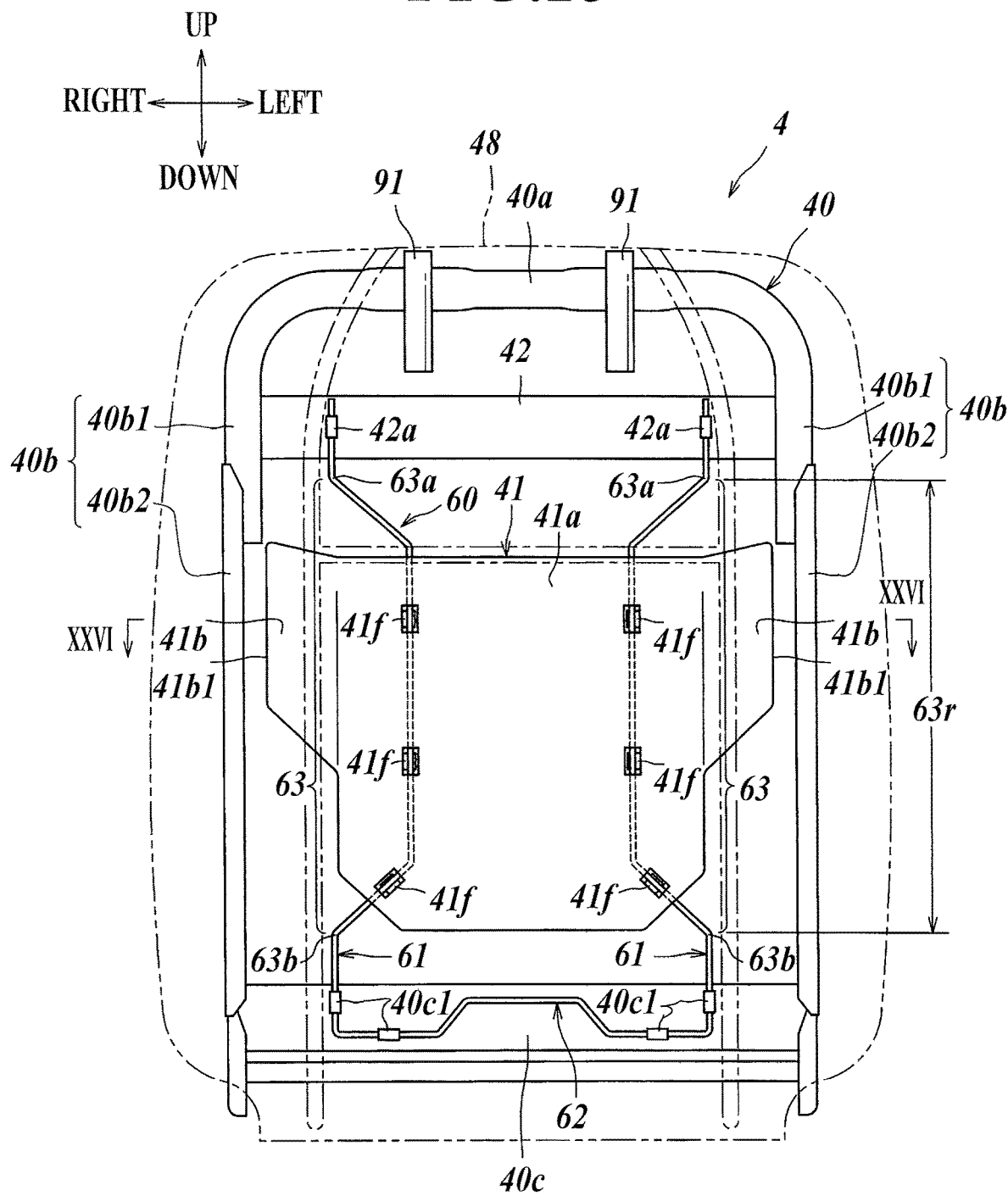
FIG. 25 is a front view of a backrest according to the third embodiment of the present invention and a frame in the backrest.
Figure 26:
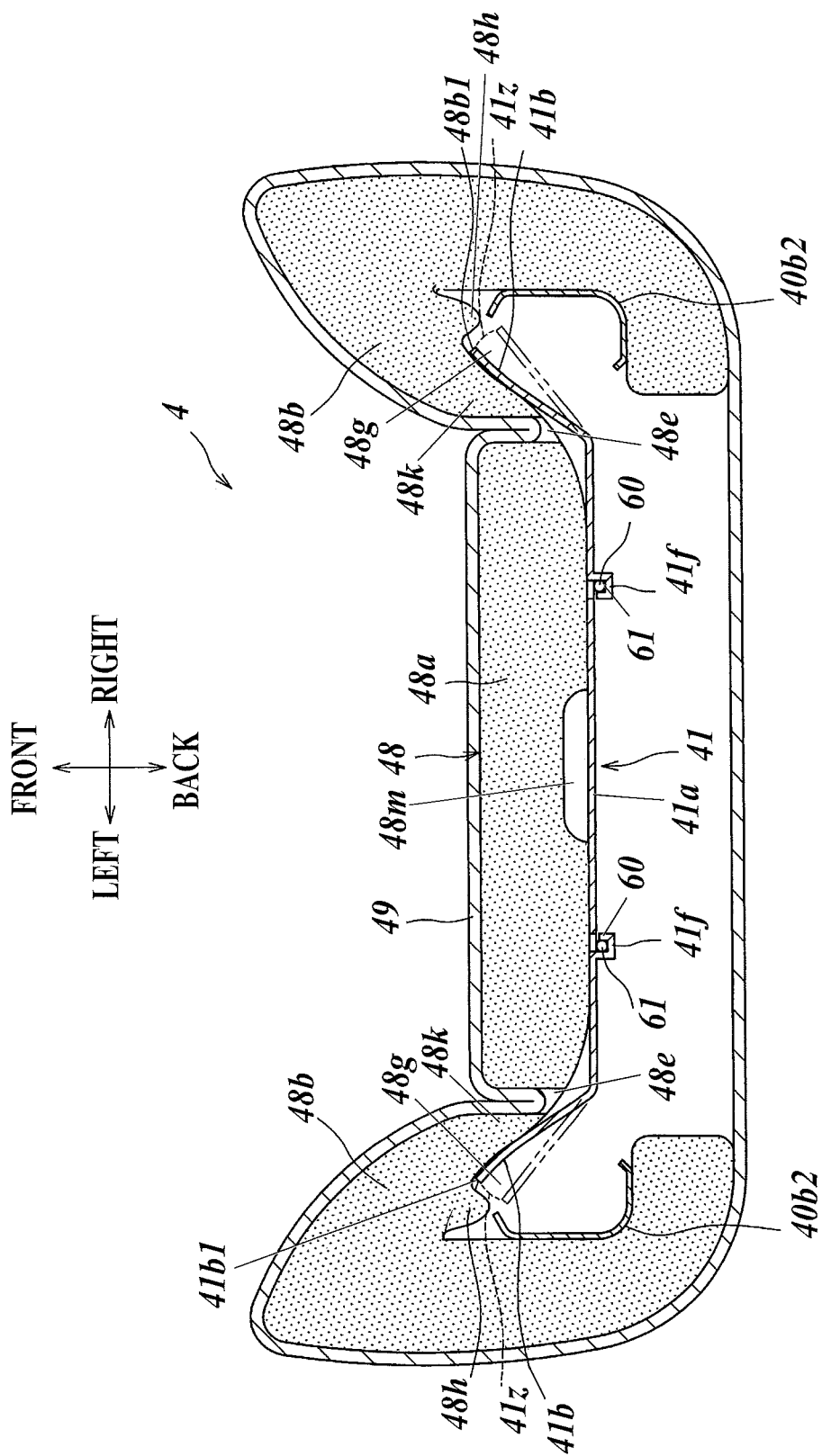
FIG. 26 is a cross sectional view taken along line XXVI-XXVI in FIG. 25.

FIG. 25 is a front view of the backrest 4 of the seat 1B according to the third embodiment. FIG. 25 illustrates a cushion pad 48 of the backrest 4 with a two-dot chain lines to illustrate the inside of the backrest 4. FIG. 26 is a cross sectional view taken along line XXVI-XXVI in FIG. 25, viewed in the direction of arrows.

As shown in FIGS. 23 to 26, the backrest 4, similarly to the first embodiment, includes a backrest frame 40, a pressure receiving member 41, a cross member 42, a cushion pad 48 and a skin 49. The backrest 4 according to the first embodiment includes the upper wire rod 43 and the lower wire rod 44, while the backrest 4 according to the third embodiment includes a coupling wire rod 60. The coupling wire rod 60 will be described in detail later.

The backrest frame 40 according to the third embodiment is provided in the same manner as that according to the first embodiment.

The pressure receiving member 41 according to the third embodiment is provided in the same manner as that according to the first embodiment, except for claws 41f. The claws 41f are provided on the pressure receiving member 41 in place of the claws 41c and 41d in association with the provision of the coupling wire rod 60 inside the backrest 4 in the third embodiment. The positions of the claws 41f differ from those of the claws 41c and 41d. The claws 41f will be described in detail later.

The cross member 42 according to the first embodiment is a meandrous rod member. In contrast, the cross member 42 according to the third embodiment is a metal sheet. The cross member 42 extends in the right-left direction. The cross member 42 has the left end fixed to a left vertical pipe segment 40b1 by welding. The cross member 42 has the right end fixed to a right vertical pipe segment 40b1 by welding. The cross member 42 bridges the right and left vertical pipe segments 40b1.

The coupling wire rod 60 will now be described in detail. The coupling wire rod 60 is bent into a substantially U shape. The coupling wire rod 60 includes right and left vertical wire segments 61 and a horizontal wire segment 62. The vertical wire segments 61 extend vertically. The horizontal wire segment 62 extends in the right-left direction to couple the lower ends of the vertical wire segments 61. Each of the right and left vertical wire segments 61 includes a bent segment 63. The bent segment is convex toward the inside of the backrest frame 40, i.e., the center in the right-left direction of the backrest frame 40.

In front or rear view of the pressure receiving member 41, the coupling wire rod 60 according to this embodiment is put across the backrest frame 40 so as to avoid the front edges (front ends or ends of extending parts) 41b1 of the extending parts 41b. More specifically, the coupling wire rod 60 is coupled to the backrest frame 40 by multiple wire catching parts 42a and 40c1. The wire catching parts 42a are provided on the cross member 42. The wire catching parts 40c1 are provided on a lower frame segment 40c. The wire catching parts 42a are formed by partially cutting, raising and bending the cross member 42. The wire catching parts 40c1 are formed by partially cutting, raising and bending the lower frame segment 40c. The horizontal wire segment 62, which is the lower portion of the coupling wire rod 60, is caught by the wire catching parts 40c1. The right and left vertical wire segments 61 of the coupling wire rod 60 has top ends caught by the wire catching parts 42aa on the cross member 42. The right and left vertical wire segments 61 thereby vertically bridge the cross member 42 and the lower frame segment 40c. The coupling wire rod 60 may be coupled to the backrest frame 40 by welding.

Multiple claws 41f for fixing the pressure receiving member 41 to the coupling wire rod 60 are provided on the main body part 41a of the pressure receiving member 41. The claws 41f are integrated with the pressure receiving member 41. Multiple (for example, three) claws 41f are disposed vertically on the left part of the main body part 41a. Remaining multiple (for example, three) claws 41f are disposed vertically on the right part of on the right side of the main body part 41a. As shown in FIG. 26, each claw 41f protrudes backward from the rear surface of the main body part 41a and is formed into a substantially U or J shape in top or bottom view. More specifically, each claw 41f protrudes backward from the rear surface of the main body part 41a, is bent rightward or leftward, extends from the bend along the rear surface of the main body part 41a, is bent frontward, and extends from the deformation toward the rear surface of the pressure receiving member 41. Once the coupling wire rod 60, in particular, a bent segment 63 of each vertical wire segment 61 is hooked to the claws 41f, the claws 41f hold the vertical wire segments 61, while catching the vertical wire segments 61 between the claws 41f and the rear surface of the main body part 41a. The portions at which the coupling wire rod 60 is hooked to the claws 41f are the coupling portions between the coupling wire rod 60 and the pressure receiving member 41. In this embodiment, the claws 41f are formed on the main body part 41a. This indicates that the coupling portions of the coupling wire rod 60 and the pressure receiving member 41 lie on the main body part 41a, not on the right and left extending parts 41b.

As shown in FIG. 25, the bent portions 63 of the coupling wires 60 are bent away from the extending parts 41b. The vertical positions of the extending parts 41b are within a range 63r. The range 63r extends from the upper end 63a to the lower end 63b of each bent segment 63. This indicates that, at the height of the extending parts 41b, the coupling wire rod 60 (vertical wire segments 61) extends not through the extending parts 41b but through the main body part 41a. The coupling wire rod 60 is disposed such that, in front or rear view, it deviates rightward and leftward from the front edges 41b1 of the extending parts 41b and, in front view, the front edges 41b1 of the extending parts 41b do not overlap with the coupling wire rod 60.

Similarly to the first embodiment, each extending part 41b can resiliently bend and deform in the front-back direction along the connecting line between the extending part 41b and the main body part 41a so that the extending part 41b can follow the elastic deformation of the bank part 48b when an occupant leans against the backrest 4. Each extending part 41b is formed such that the moving trajectory 41z of the front edge 41b1 drawn at a time of the deformation of the extending part 41b lies inside of the front part of the main body part 40b2 of the side frame segment with respect to the right-left direction.

At rear-end collision by another vehicle (with the above-mentioned seat 1B mounted), the upper body of an occupant is pressed against the cushion pad 48 to significantly deform the near-center portion of the cushion pad 48. If the impulsive force is so large that a backward load exceeding a predetermined value is applied to the pressure receiving member 41 by the upper body of the occupant via the cushion pad 48, the vertical wire segments 61 of the coupling wire rod 60 mainly bend or deform. In response to the bend or deformation, the pressure receiving member 41 retreats relative to the main body parts 40b2 of the left and right side frame segments and the upper body of the occupant deeply sinks into the backrest 4. As a result, the head of the occupant rapidly approaches the headrest 6 and is supported thereby, thus protecting the head and the neck region of the occupant from the impact of the rear-end collision by the vehicle.

Advantageous effects of the seat 1B with such a configuration will now be described.

As shown in FIG. 25, the pressure receiving member 41 of the seat 1B has the main body part 41a and the right and left extending parts 41b. This configuration allows the seat 1B to support a wide range of the upper body of the occupant with the central main body part 41a and the right and left extending parts 41b. This configuration also leads to a stable support of the upper body of the occupant. The coupling wire rod 60 is disposed such that it does not overlap with the front edges 41b1 of the extending parts 41b in front view. This configuration can prevent the interference between the front edges 41b1 of the extending parts 41b and the coupling wire rod 60 at the time of an anteroposterior movement of the front edges 41b1 due to deformation of the extending parts 41b, as shown in FIG. 26.

In the third embodiment, the coupling wire rod 60 lies vertically as a bridge, as shown in FIG. 25. The configuration of bridging the coupling wire vertically can achieve a disposition that avoids the overlap of the front edges 41b1 of the extending parts 41b with the coupling wire rod 60 more efficiently than a configuration of bridging the coupling wire in the right-left direction.

In the third embodiment, the vertical positions of the extending parts 41b are within the range 63r, which extends from the upper end 63a to the lower end 63b of the bent segment 63. This indicates that the coupling wire rod 60 at the height of the extending parts 41b are entirely away from the front edges 41b1 inward in the right-left direction. This configuration can prevent the interference between the front edges 41b1 and the coupling wire rod 60 efficiently.

In the third embodiment, the coupling portions between the coupling wire rod 60 and the pressure receiving member 41 (claws 41f) are on the main body part 41a. This indicates that the coupling wire rod 60 is disposed such that it is caught by the claws 41f, which are disposed away from the front edges 41b1. This disposition can also prevent the interference between the front edges 41b1 and the coupling wire rod 60 effectively. No allocation of the coupling wire rod 60 in the vicinity of the extending parts 41b can prevent the coupling wire rod 60 from reducing the deformation of the extending parts 41b.

In the third embodiment, the moving trajectory 41z of the front edge 41b1 drawn at a time of the deformation of the extending part 41b lies inside of the front part of the main body part 40b2 of the side frame segment with respect to the right-left direction. This can prevent the interference between the front edges 41b1 and the main body parts 40b2 of the side frame segment at the time of an anteroposterior movement of the front edges 41b1.

The third embodiment of the present invention has been described above. The embodiments applicable to the present invention should not be limited to those described above and may be modified as appropriate within the scope of the present invention. The following description focuses on several modifications of the third embodiment. These modifications are the same as the third embodiment except for some changes. The following modifications may be combined according to demand.

[First Modification of Third Embodiment]

Figure 27:
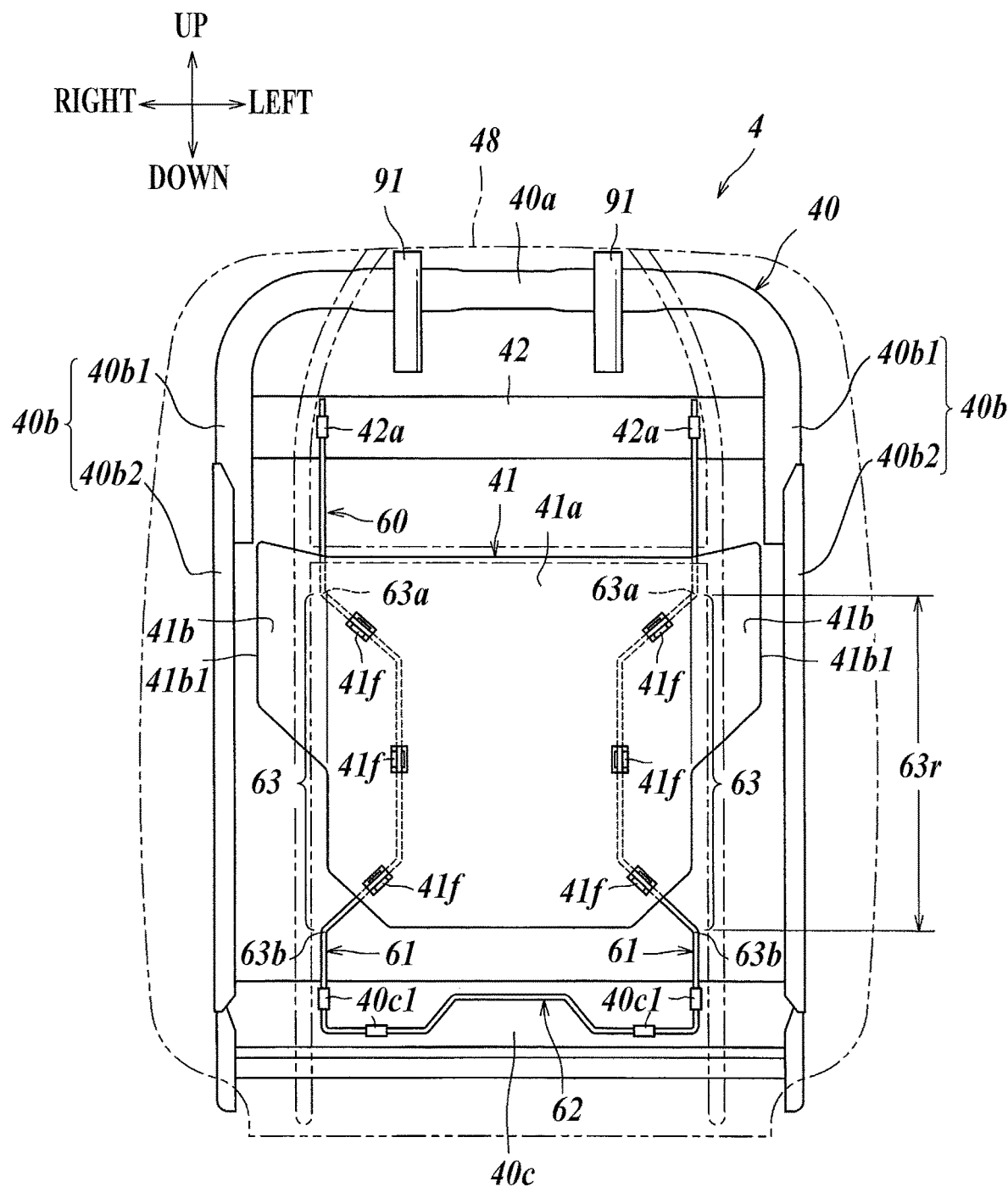
FIG. 27 is a front view of a seat back frame according to a first modification of the third embodiment of the present invention.

In the third embodiment, the vertical positions of the extending parts 41b are entirely within the range 63r, which extends from the upper end 63a to the lower end 63b of the bent segment 63 of the coupling wire rod 60, as shown FIG. 25, but the present invention should not be limited to this configuration. For example, as shown in FIG. 27, the extending parts 41b may be formed such that the vertical positions of the extending parts 41b are partially within the range 63r, which extends from the upper end 63a to the lower end 63b of the bent segment 63. Even in this configuration, a portion of the coupling wire rod 60 at the height of the extending parts 41b is partially away from the left and right front edges 41b1 inward in the right-left direction. This configuration can prevent the interference between the front edges 41b1 and the coupling wire rod 60.

[Second Modification of Third Embodiment]

In the third embodiment, the coupling portions (claws 41f) of the coupling wire rod 60 and the pressure receiving member 41 are on main body part 41a, as shown in FIG. 25, but the present invention should not be limited to this configuration. For example, the claws 41f may be on the extending parts 41b. The coupling between the coupling wire rod 60 and the pressure receiving member 41 should not be limited to the use of the claws 41f. For example, pairs of through-holes are disposed in a row in the right-left direction or in the up-down direction on the pressure receiving member 41 and the coupling wire rod 60 is fixed with ties extending through the through-holes.

[Third Modification of Third Embodiment]

In the third embodiment, the coupling wire rod 60 (vertical wire segments 61) vertically bridges the cross member 42 and the lower frame segment 40c, but the present invention should not be limited to this configuration. For example, with reference to FIG. 25, the coupling wire may bridge the main body parts 40b2 of the left and right side frame segments in the right-left direction. The coupling wire may diagonally bridge either of the main body parts 40b2 of the side frame segments and the cross member 42 or the lower frame segment 40c.

[Fourth Modification of Third Embodiment]

In the third embodiment, the extending parts 41b are formed only at positions corresponding to the breast height of the occupant, but the present invention should not be limited to this configuration. For example, the extending parts 41b may be formed only at positions corresponding to the waist height of the occupant. Extending parts other than the extending parts 41b formed at the breast-height positions of the occupant may be formed at the waist-height positions of the occupant. If both the breast-height extending parts and the waist-height extending parts are provided, they may be formed independently or coupled with each other.

[Modification 5 of Third Embodiment]

In the third embodiment, the moving trajectory 41z of the front edge 41b1 drawn at a time of the deformation of the extending part 41b lies inside of the front part of the main body part 40b2 of the side frame segment with respect to the right-left direction, as shown in FIG. 26. This configuration prevents the interference between the front edges 41b1 and the main body parts 40b2 of the side frame segments, but the present invention should not be limited to this configuration. For example, the extending parts 41b may be formed such that the front edges 41b1 come into contact with the main body parts 40b2 of the side frame segments at the time of deformation of a predetermined amount. Such a configuration can prevent excess deformation of the extending parts 41b.

[Sixth Modification of Third Embodiment]

The coupling wire rod 60 according to the third embodiment may be adopted for the seat 1A according to the second embodiment. The coupling wire rod 60 may be adopted in place of the upper and lower wire rods 43 and 44 according to the second embodiment.

[Additional Statement on Third Embodiment]

As is evident from the above description of the third embodiment and its modifications, the description of the third embodiment and its modifications include various disclosures of technical ideas in addition to the aspect of the invention shown in the following notes.

Note 1.

A vehicle seat having a bottom seat and a backrest, including:

a backrest frame constituting part of the backrest;

a coupling wire rod put across the backrest frame; and a plate-like pressure receiving member coupled to the backrest frame via the coupling wire rod and supporting load from an occupant, wherein the pressure receiving member includes a main body part and extending parts, the main body part facing a rear surface of an upper body of the occupant and the extending parts extending from right and left edges of the main body part outward in the right-left direction and being resiliently deformable in the front-back direction, and wherein the extending parts and the coupling wire rod are disposed such that front edges of the extending parts do not overlap with the coupling wire rod in front view.

Note 2.

The vehicle seat according to note 1, wherein the coupling wire rod lies vertically.

Note 3.

The vehicle seat according to note 2, wherein the coupling wire rod includes bent segments, each segment is convex inward in the right-left direction and wherein a vertical position of each extending part is at least partially within a range between an upper end and a lower end of the bent segment.

Note 4.

The vehicle seat according to note 3, wherein the vertical position of each extending part is within a range between the upper end and the lower end of the bent segment.

Note 5.

The vehicle seat according to one of notes 1 to 4, wherein coupling portions between the coupling wire rod and the pressure receiving member are on the main body part.

Note 6.

The vehicle seat according to one of notes 1 to 5, wherein the backrest frame includes right and left side frame segments constituting right and left frames of the backrest, and wherein each extending part is formed such that a moving trajectory of a front edge of the extending part drawn at a time of deformation of the extending part lies inside of the side frame segment with respect to a right-left direction.

(a) Advantageous Effects of Present Invention Described in Note 1

The central main body part and the right and left extending parts can support a wide range of the upper body of the occupant. This configuration can stabilize the support of the upper body of the occupant. The coupling wire rod does not overlap with the front edges of the extending parts in front view. Such a configuration can prevent the interference between the front edges of the extending parts and the coupling wire rod at the time of an anteroposterior movement of the front edges due to deformation of the extending parts.

(b) Advantageous Effects of Present Invention Described in Note 2

The present invention described in Note 2 can achieve a disposition that avoids the overlap of the front edges of the extending parts with the coupling wire rod in front view more efficiently than a configuration of bridging the coupling wire rod in the right-left direction. Such a configuration can prevent the interference between the front edges of the extending parts and the coupling wire rod.

(c) Advantageous Effects of Present Invention Described in Note 3

A portion of the coupling wire rod at the height of the extending parts is at least partially away from the left and right front edges inward in the right-left direction. This configuration can prevent the interference between the front edges and the coupling wire rod efficiently.

(d) Advantageous Effects of Present Invention Described in Note 4

A portion of the coupling wire rod at the height of the extending parts is entirely away from the front edges of the extending parts inward in the right-left direction. This configuration can prevent the interference between the front edges and the coupling wire rod more efficiently.

(e) Advantageous Effects of Present Invention Described in Note 5

Coupling points are disposed remote from the front edges of the extending parts, thus further preventing the interference between the front edges of the extending parts and the coupling wire rod efficiently. This, in turn, indicates that no disposition of the coupling portions in the vicinity of the extending parts can prevent the coupling wire rod from reducing the deformation of the extending parts.

(f) Advantageous Effects of Present Invention Described in Note 6

The present invention described in Note 6 can prevent the interference between the front edges of the extending parts and the side frame segments even at the time of an anteroposterior movement of the front edges due to deformation of the extending parts.

Fourth Embodiment

Figure 28:
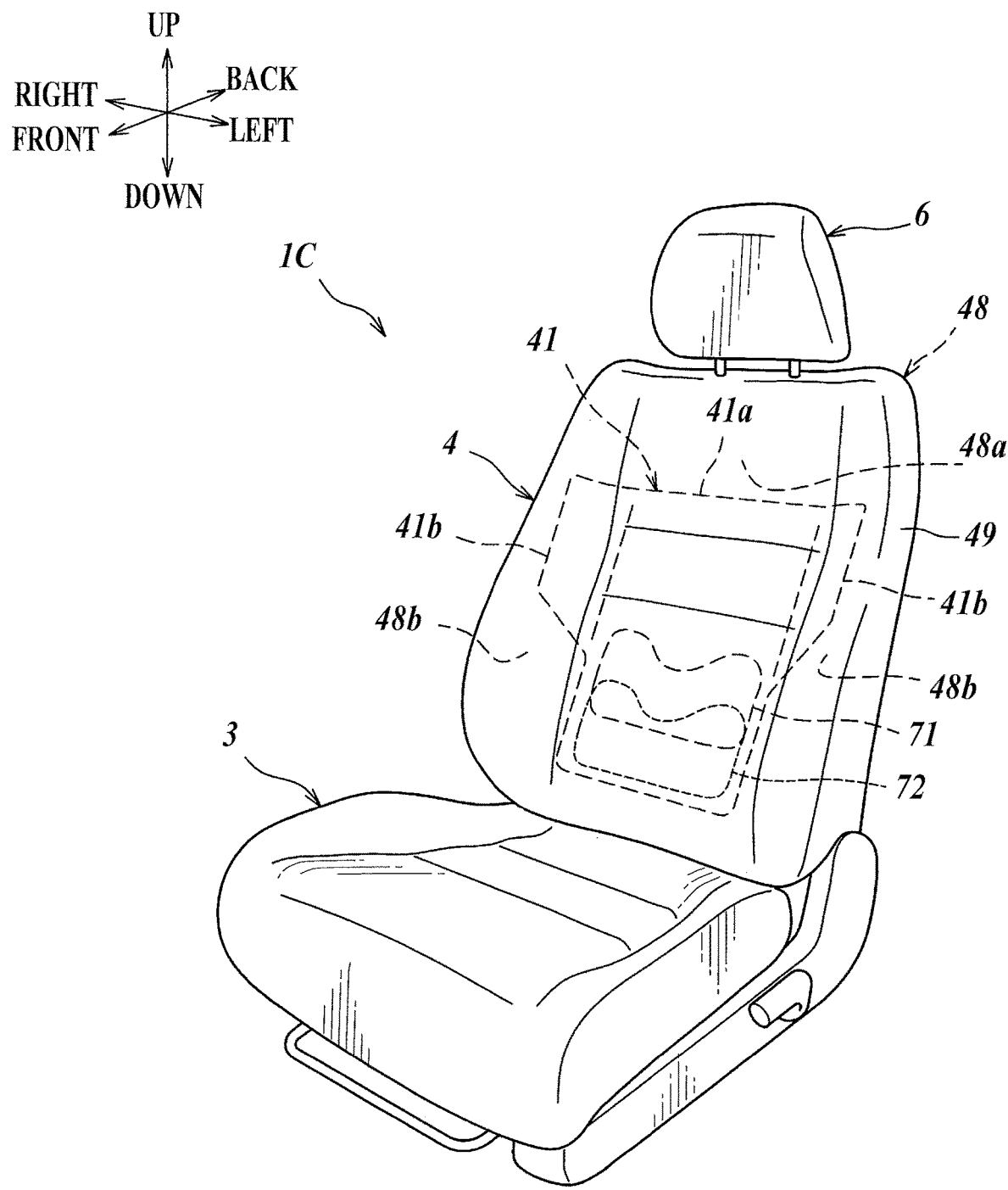
FIG. 28 is a perspective view of a seat according to a fourth embodiment of the present invention.
Figure 29:
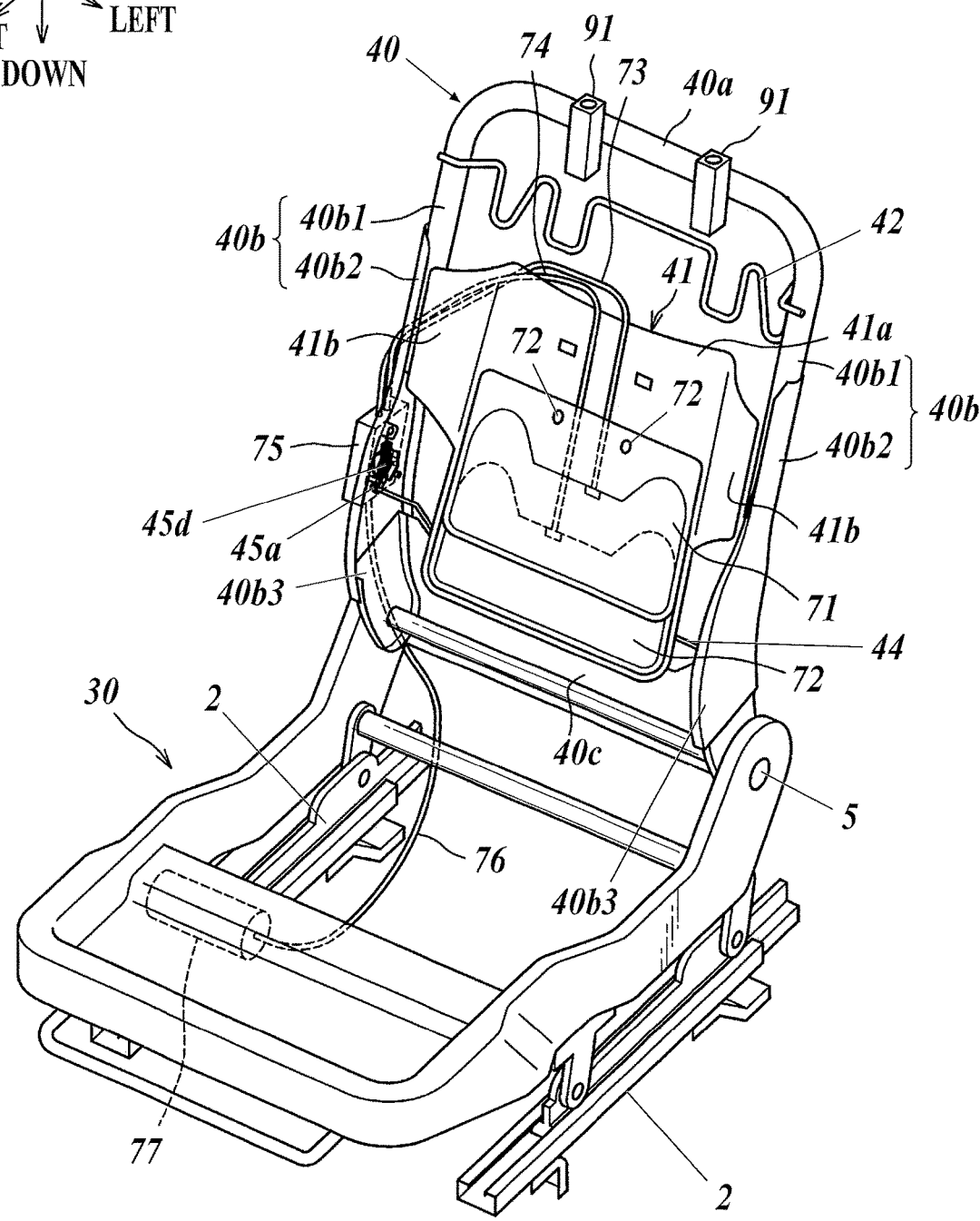
FIG. 29 is a perspective view of a frame in the seat according to the fourth embodiment of the present invention.

FIG. 28 is a perspective view of a seat 1C according to the fourth embodiment of the present invention. FIG. 29 is a perspective view of a seat frame of the seat 1C. The same parts between the seat 1C according to the fourth embodiment and the seat 1 according to the first embodiment are given the same reference numerals. If the same parts are provided in the same manner, the explanation thereof will be omitted if possible. The following description focuses on differences between the seat 1C according to the fourth embodiment and the seat 1 according to the first embodiment.

The seat 1C is also a vehicle seat, in particular an automotive seat. Similarly to the seat 1 according to the first embodiment, the seat 1C includes slide rails 2, a bottom seat 3, a backrest 4, a recliner mechanism 5 and a headrest 6. The slide rails 2, the bottom seat 3, the recliner mechanism 5 and the headrest 6 of the seat 1C according to the fourth embodiment are provided in the same manner as those of the seat 1 according to the first embodiment. The backrest 4 of the seat 1C according to the fourth embodiment is different from that of the seat 1 according to the first embodiment.

Figure 30:
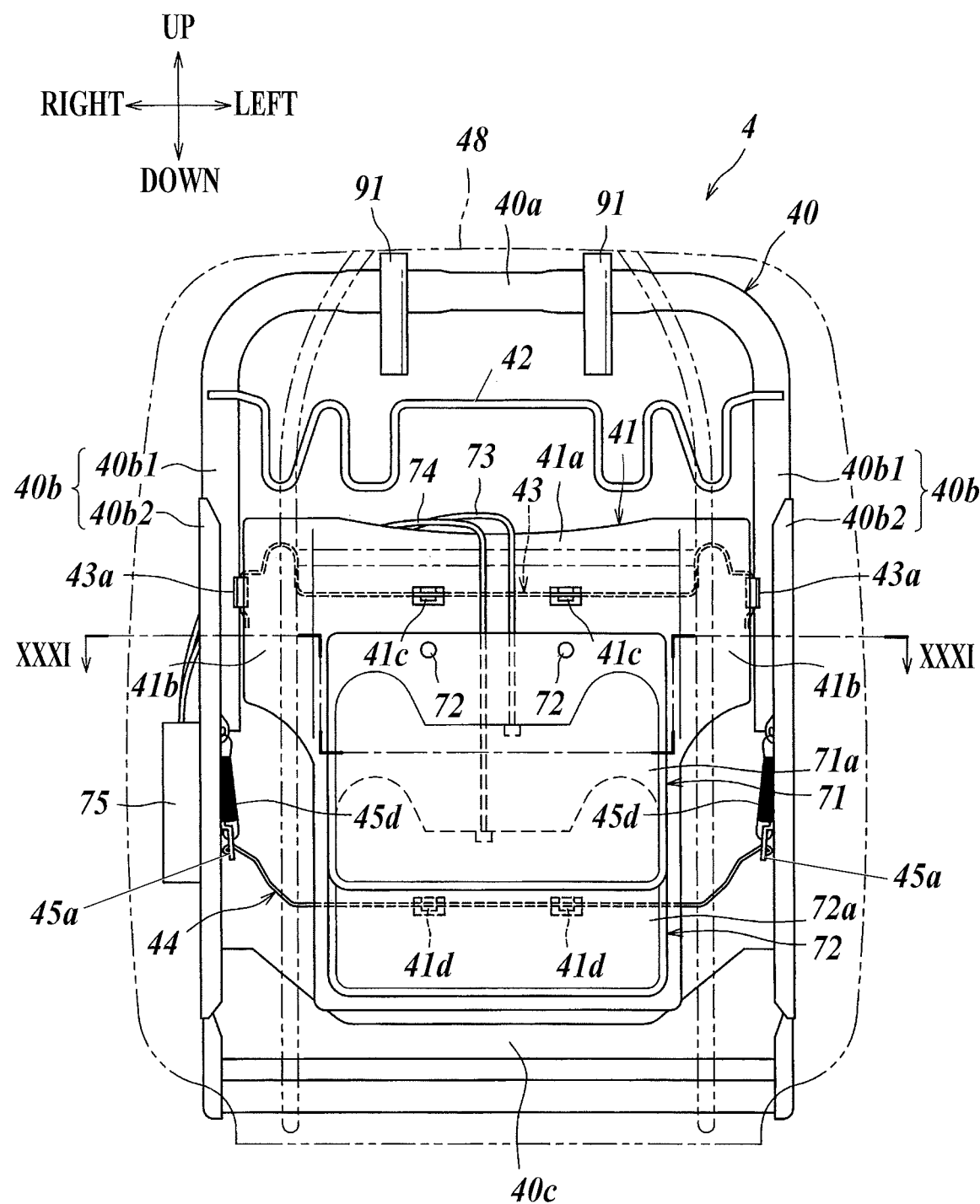
FIG. 30 is a front view of aback rest and a frame according to the fourth embodiment of the present invention.
Figure 31:
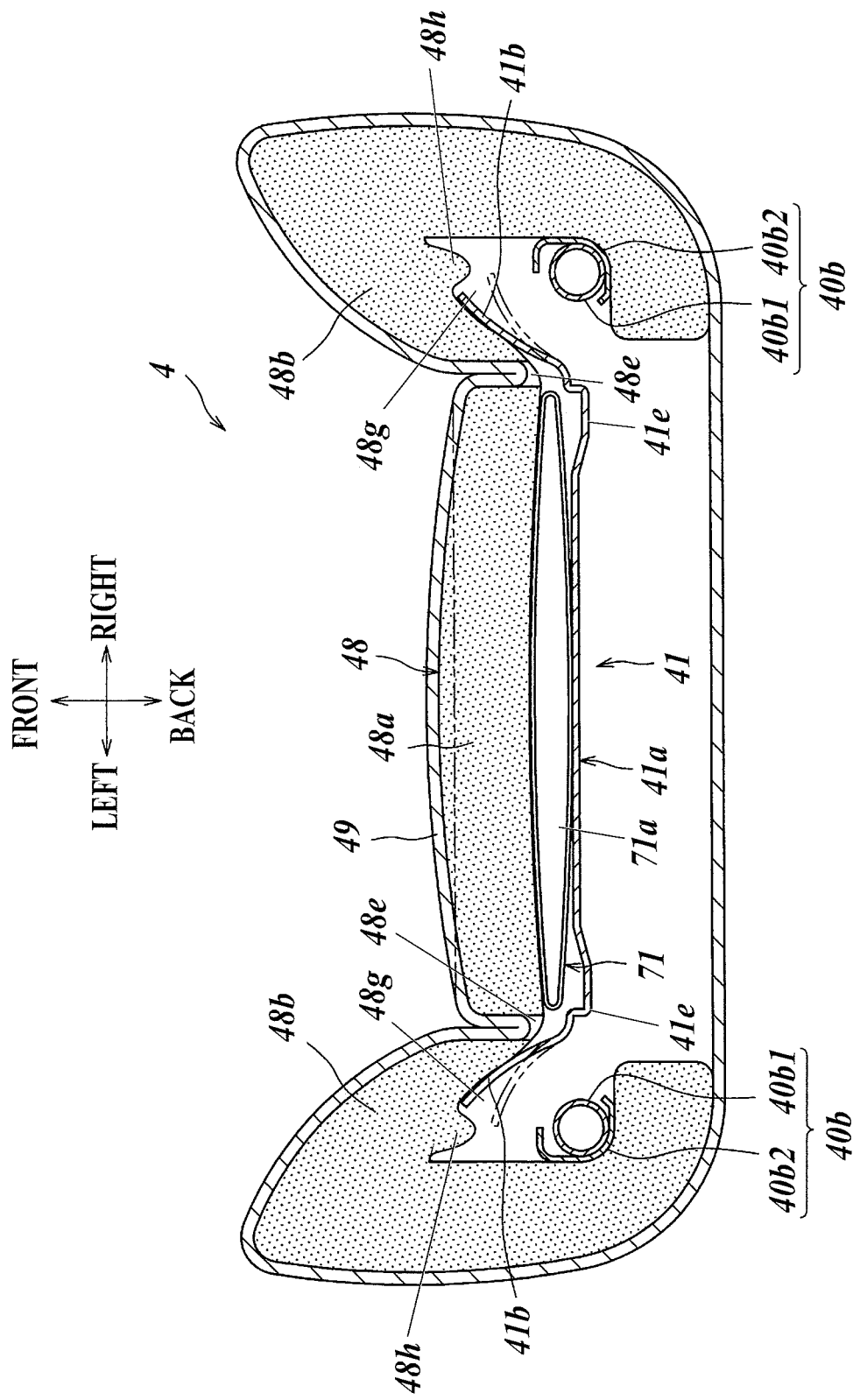
FIG. 31 is a cross sectional view taken along line XXXI-XXXI in FIG. 30.

FIG. 30 is a front view of the backrest 4 of the seat C according to the fourth embodiment. FIG. 30 illustrates the cushion pad 48 of the backrest 4 with a two-dot chain lines to show the internal structure of the backrest 4. FIG. 31 is a cross sectional view taken along line XXXI-XXXI in FIG. 30, viewed in the direction of arrows.

Similarly to the first embodiment, the backrest 4 includes a backrest frame 40, a pressure receiving member 41, a cross member 42, an upper wire rod 43, a lower wire rod 44, swing members 45a, tension springs 45d, stoppers, a cushion pad 48, and a skin 49, as shown in FIGS. 28 to 31. The backrest frame 40, the pressure receiving member 41, the cross member 42, the upper wire rod 43, the lower wire rod 44, swing members 45a, tension springs 45d, the stoppers, the cushion pad 48 and the skin 49 according to the fourth embodiment are provided in a similar manner to the backrest frame 40, the pressure receiving member 41, the cross member 42, the upper wire rod 43, the lower wire rod 44, swing members 45a, tension springs 45d, stoppers 45b and 45c, the cushion pad 48 and the skin 49 according to the first embodiment.

The backrest 4 according to the fourth embodiment includes two main body airbags (pressure receiving airbags) 71 and 72 functioning as support position adjusters. The main body airbags 71 and 72 are disposed on the pressure receiving member 41. As shown in FIG. 31, the main body airbags 71 and 72 inflate and deform the cushion pad 48 such that it protrudes forward (details are given later). The inflated main body airbags 71 and 72 deflate and deform the protruding cushion pad 48 such that it gets dented. This enables adjustment of a support position of an occupant seated on the seat 1C in accordance with the amount of protrusion of the main body airbags 71 and 72.

The main body airbag 71 is formed by bonding together two sheet members made of resin by welding. The main body airbag 71 includes an air chamber 71a containing gas, such as air. The main body airbag 72 is also formed in a similar manner to the main body airbag 71 and includes an air chamber 72a.

The air chamber 71a is formed by bonding together two sheet members into a substantially U shape. In front view, the air chamber 71a has an upper edge which is concave toward the horizontal center of the upper edge. This is also applied to the air chamber 72a.

The main body airbag 71 overlaps with the main body airbag 72 such that the main body airbag 71 is in front of the main body airbag 72 and the main body airbag 72 is in rear of the main body airbag 71. The main body airbags 71 and 72 are attached to the front surface of the main body part 41a below claws 41c with two pin-shaped clips 70 at the upper edges of the airbags 71 and 72, while they are overlapped with each other.

The main body airbag 72 in back is vertically longer than the main body airbag 71. The air chamber 72a deviates downward from the air chamber 71a such that the lower end portion of the air chamber 71a overlaps with the upper end portion of the air chamber 72a in the front-back direction while the main body airbags 71 and 72 are attached to the main body part 41a.

The upper end portion of the air chamber 71a of the main body airbag 71, placed in front, is at the same height as the right and left extending parts 41b. In other words, the right and left extending parts 41b according to this embodiment, which extend diagonally forward to the outward in the right-left direction, are formed such that the lower edges of the extending parts 41b are disposed within a vertical range of the air chamber 71a of the main body airbag 71. This allows the upper portion of the air chamber 71a of the main body airbag 71 to be disposed between the right and left extending parts 41b, in particular, at the time of inflation of the air chamber 71a. This configuration enables the right and left extending parts 41b to prevent a right-left movement of the main body airbag 71.

One end of a hose 73 for feeding gas to the air chamber 71a is coupled to the upper end portion of the air chamber 71a of the main body airbag 71. One end of a hose 74 for feeding gas to the air chamber 72a is coupled to the upper end portion of the air chamber 72a of the main body airbag 72.

As shown in FIG. 29, the hose 73 is routed behind the pressure receiving member 41 and the right side frame 40b. Other end of the hose 73 is coupled to a control unit 75. This is also applied to the hose 74.

The control unit 75 is fixed to the outer surface of the lateral side of the right side frame 40b. The control unit 75 is connected to a pump 87, which is fixed to a bottom seat frame 30, via a hose 76.

The pump 87 is an apparatus for feeding gas to the main body airbags 71 and 72. The control unit 75 is an apparatus to adjust the amount of inflation of the main body airbags 71 and 72 (air chambers 71a and 72a). The control unit 75 includes a valve unit with a variable opening (not shown), a relief valve (not shown), and a controller board (not shown) for controlling the degree of opening of the valve unit. The valve unit is closed during a normal operation.

An operator manipulates a controller (not shown) to open the valve unit of the control unit 75. The pump 87 feeds gas to the main body airbags 71 and 72. The main body airbags 71 and 72 are then inflated, as shown in FIG. 31. The inflation of the main body airbags 71 and 72 deforms a back receiving part 48*a* of the cushion pad 48 such that it protrudes forward.

Pressure is applied from the occupant to the main body airbags 71 and 72 via the back receiving part 48*a* while the valve unit of the control unit 75 remains opened after the manipulation of the controller by the occupant. The main body airbags 71 and 72 are deflated to deform the back receiving part 48*a* of the cushion pad 48 such that an inflated back receiving part 48*a* gets dented. The main body airbags 71 and 72 may be deflated through the discharge of gas from the main body airbags 71 and 72 through the pump 87.

Once the operator manipulates the controller to close the valve unit of the control unit 75, the state of the inflated main body airbags 71 and 72 is kept.

As shown above, the state of the inflated main body airbags 71 and 72 (extent of deformation of the back receiving part 48*a* of the cushion pad 48) is adjusted through the manipulation of the controller by the occupant who opens or closes the valve of the control unit 75 or starts or stops the pump 87. This enables the adjustment of the anteroposterior position of supporting the occupant. The two main body airbags 71 and 72 may be configured such that the state of the inflation can be separately or dependently adjusted.

At rear-end collision by another vehicle (with the above-mentioned the seat 1C mounted), the upper body of an occupant is pressed against the cushion pad 48 to significantly deform the near-center portion of the cushion pad 48. If the impulsive force is so large that a backward load exceeding a predetermined value is applied to the pressure receiving member 41 by the upper body of the occupant via the cushion pad 48, the upper and lower wire rods 43 and 44 bend or the lower wire rod 44 moves backward due to the movement of each swing member 45*a*. This causes the pressure receiving member 41 to retreat relative to the left and right side frame segments 40*b* and the upper body of the occupant to deeply sink into the backrest 4. As a result, the head of the occupant rapidly approaches the headrest 6 and is supported thereby, thus protecting the head and the neck region of the occupant from the impact of the rear-end collision by the vehicle.

Advantageous effects of the seat 1C with such a configuration will now be described.

The pressure receiving member 41 of the seat 1C, which includes the main body part 41*a* and the right and left extending parts 41*b*, can support a wide range of the upper body of the occupant with the central main body part 41*a* and the right and left extending parts 41*b* via the cushion pad 48. This configuration can stabilize the support of the upper body of the occupant.

The right and left extending parts 41*b* according to this embodiment, which extend diagonally forward toward the outside in the right-left direction, can prevent a right-left movement (displacement) of the main body airbag 71, which is disposed in front of the main body part 41*a*. This configuration can stabilize the support of the upper body of the occupant.

In this embodiment, the claws 41*c* are disposed within the vertical range of the extending parts 41*b*. This allows the pressure receiving member 41 to be coupled to the backrest frame 40 via the upper wire rod 43 at the height of the extending parts 41*b*. This enables the extending parts 41*b* and the main body part 41*a* at the height of the extending parts 41*b* to receive load from the occupant efficiently, leading to a more stable support of the upper body of the occupant.

The fourth embodiment of the present invention has been described above. The embodiments applicable to the present invention should not be limited to those described above and may be modified as appropriate within the scope of the present invention. The following description focuses on several modifications of the fourth embodiment. These modifications are the same as the fourth embodiment except for some changes. The following modifications may be combined according to demand.

[First Modification of Fourth Embodiment]

Figure 32:
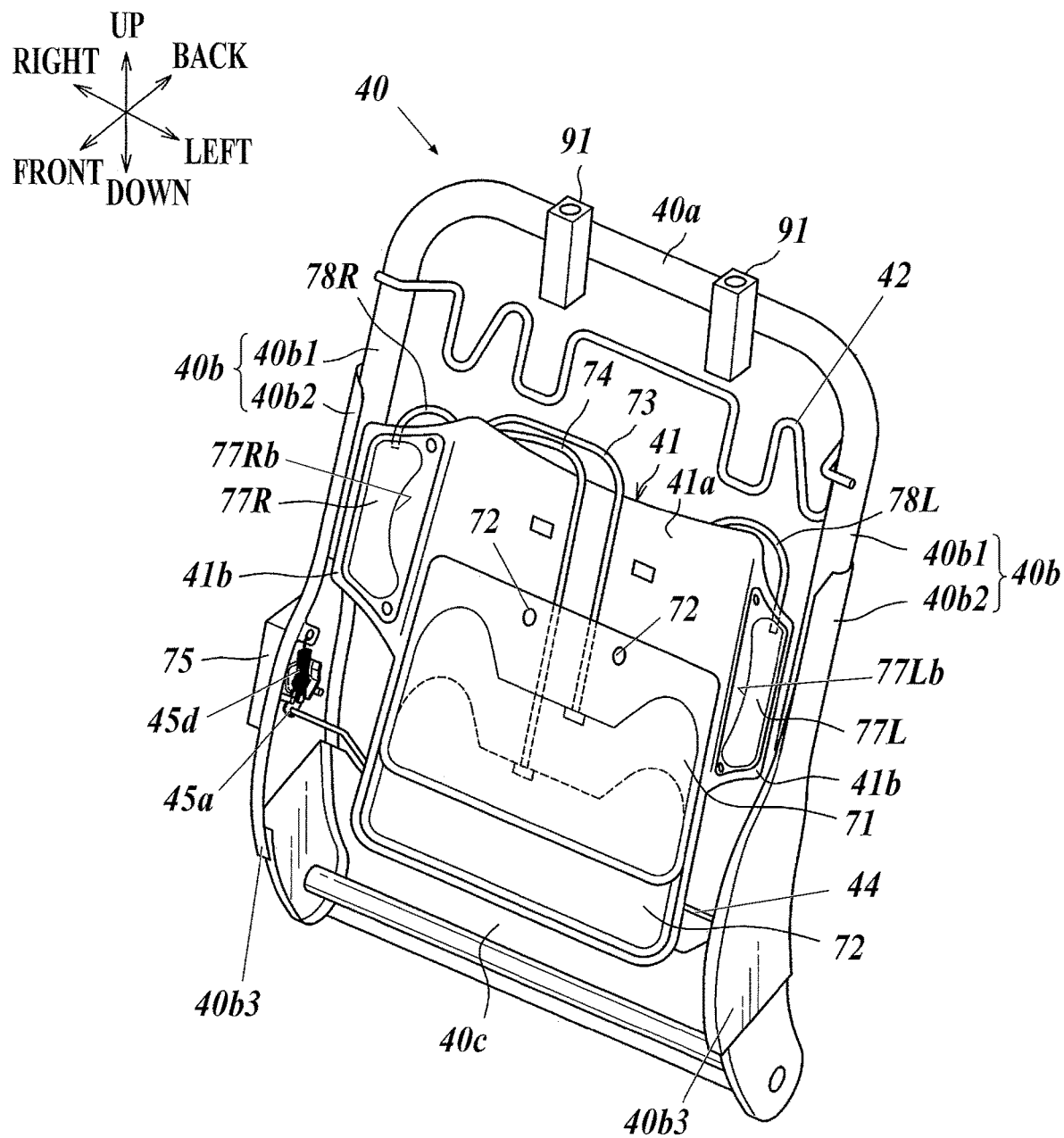
FIG. 32 is a perspective view of a frame of a backrest according to a first modification of the fourth embodiment of the present invention.

FIG. 32 is a perspective view of a backrest frame 40 of a backrest 4 according to a first modification of the fourth embodiment. As shown in FIG. 32, the backrest 4 includes the main body airbags 71 and 72 and right and left extending part airbags (support airbags) 77R and 77L as support position adjusters.

Figure 33:
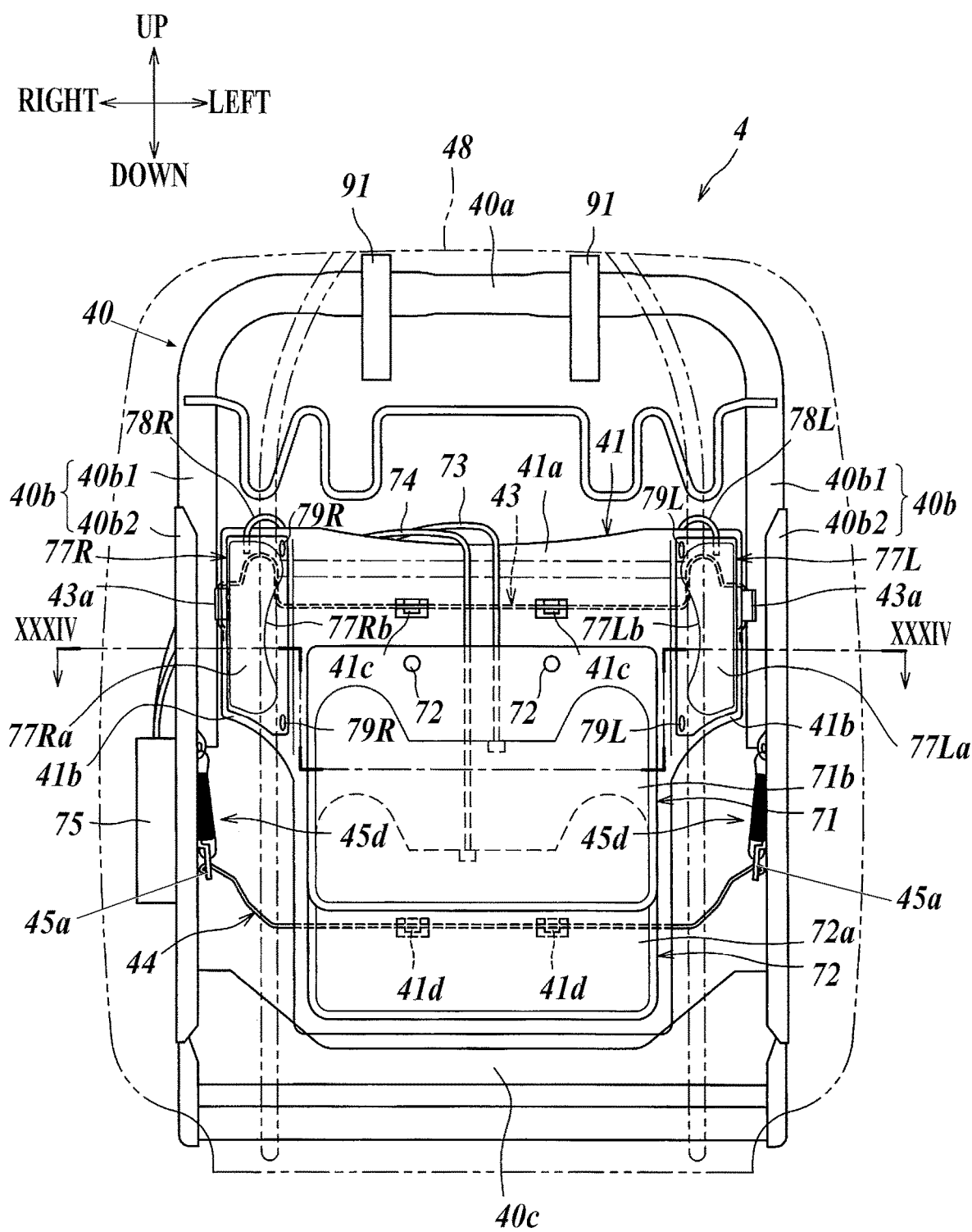
FIG. 33 is a front view of the backrest according to the first modification of the fourth embodiment of the present invention and the frame in the backrest.
Figure 34:
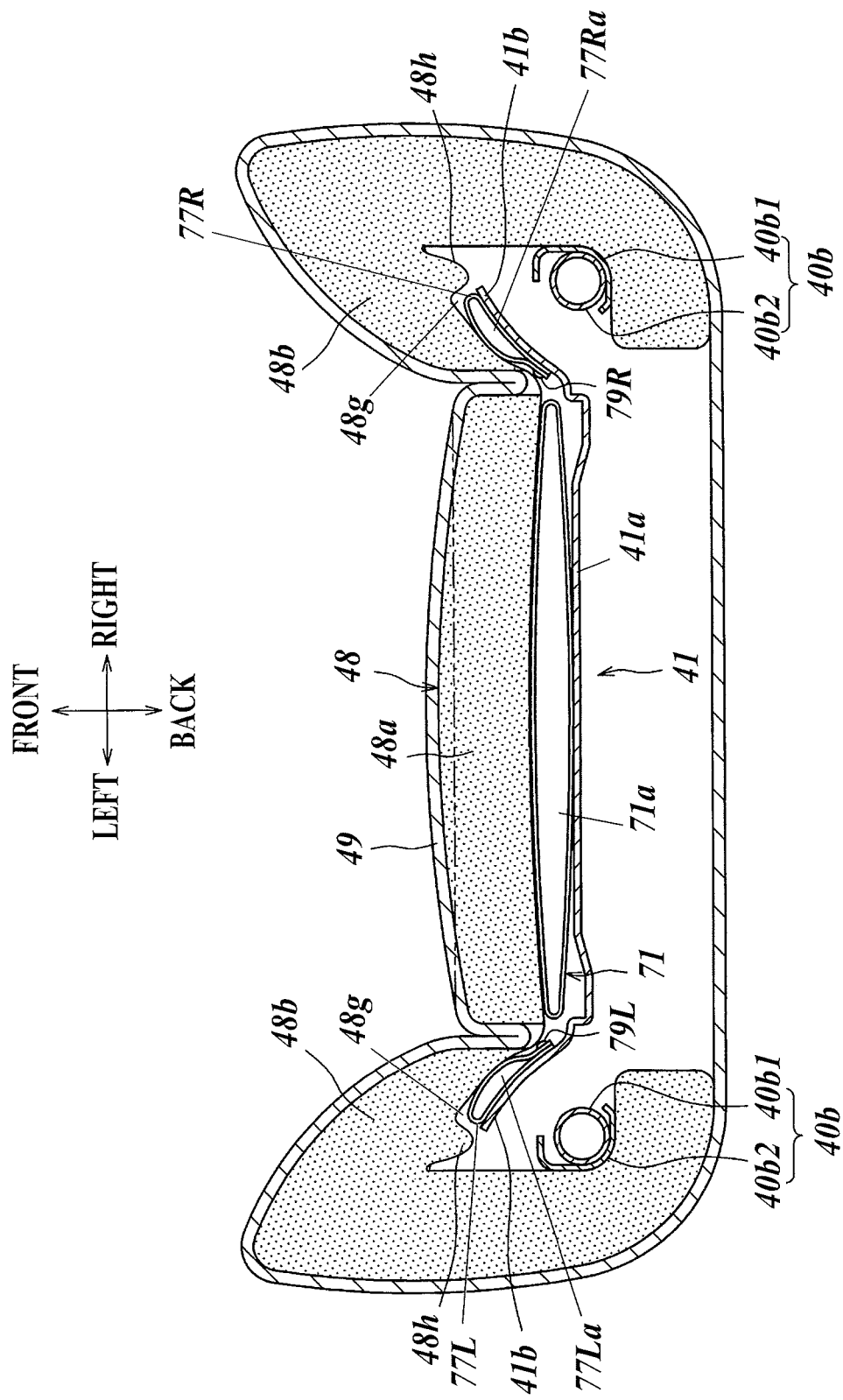
FIG. 34 is a cross sectional view taken along line XXXIV-XXXIV shown in FIG. 33.

The left extending part airbag 77L inflates and deflates to deform the left bank part 48*b* of the cushion pad 48 (see FIG. 34). Similarly to the main body airbags 71 and 72, the left extending part airbag 77L is formed by bonding together two sheet members. As shown in FIG. 33, the left extending part airbag 77L includes a left air chamber 77La containing gas, such as air. This is also applied to the right extending part airbag 77R. The right extending part airbag 77R deforms the right bank part 48*b* of the cushion pad 48 and includes a right air chamber 77Ra.

In front view, the left air chamber 77La has a contour 77Lb on the right edge thereof (horizontally inside). The contour 77Lb is curved into an arch (substantially U-shape). The arch is dented toward the left (horizontally outside) at the center in the vertical direction. In other words, the left air chamber 77La is formed by bonding together two sheet members. The two sheet members have a contour 77Lb on the right side thereof (horizontally inside). The contour 77Lb is curved into an arch (substantially U-shape). The arch is dented toward the left side (horizontally outside) at the center in the vertical direction. The right extending part airbag 77R is provided symmetrically with the left extending part airbag 77L.

The left extending part airbag 77L is attached to the front surface of the left extending part 41*b* at the top end and the bottom end of the horizontally inside edge of the left extending part airbag 77L with pin-shaped clips 79L. The right extending part airbag 77R is attached to the front surface of right extending part 41*b* in a similar manner with clips 79R.

In front view, the extending part airbags 77L and 77R and the main body airbags 71 and 72 are disposed apart from each other.

The air chambers 77La and 77Ra of the extending part airbags 77L and 77R have the upper ends connected to one ends of hoses 78L and 78R. The hoses 78L and 78R extend from the extending part airbags 77L and 77R to a control unit 75 through the rear surface of the right side frame 40*b*. The other ends of the hoses 78L and 78R are jointed to each other and connected to the control unit 75.

An operator manipulates a controller to open a valve unit of the control unit 75. A pump, for example, the pump 87, feeds gas to the extending part airbags 77L and 77R. The extending part airbags 77L and 77R inflate, as shown in FIG.

34. The inflation of the extending part airbags 77L and 77R deforms the bank parts 48b of right and left the cushion pad 48 such that the bank parts 48b protrude.

Pressure is applied to the extending part airbags 77L and 77R from the occupant via the bank parts 48b while the valve unit of the control unit 75 remains opened after the manipulation of the controller by the occupant. The extending part airbags 77L and 77R deflate to deform the bank parts 48b of the cushion pad 48 such that the inflated bank parts 48b get dented. The extending part airbags 77L and 77R may deflate through the discharge of gas from the extending part airbags 77L and 77R by the pump.

Once the operator manipulates the controller to close the valve unit of the control unit 75, the state of inflation of the extending part airbags 77L and 77R is kept.

As shown above, the state of inflation of the extending part airbags 77L and 77R (extent of deformation of the bank parts 48b of the cushion pad 48) is adjusted through the manipulation of the controller by the occupant who opens or closes the valve of the control unit 75 or starts or stops the pump 87. This enables the adjustment of the support position of the rear-half of the sides of the breast-height part of the occupant.

The seat according to the first modification of the fourth embodiment can support a wide range of the upper body of the occupant with the main body part 41a and the extending parts 41b. This configuration can stabilize the support of the upper body of the occupant.

In the first modification, the upper body of the occupant is supported such that it is laterally surrounded by the extending part airbags 77L and 77R attached to the left and right extending parts 41b. This configuration can further stabilize the support of the upper body of the occupant.

In the first modification, in particular, the extending part airbags 77L and 77R have concave contours 77Lb and 77Rb on their inner faces in the right-left direction. This configuration allows the upper body of the occupant to fit well between the left and right extending part airbags 77L and 77R, enabling a more stable support of the upper body of the occupant.

In the first modification, the inside ends of the extending part airbags 77L and 77R in the right-left direction are fixed to the extending parts 41b with clips 79L and 79R, respectively. Once gas is fed to the left and right extending part airbags 77L and 77R, the left and right extending part airbags 77L and 77R inflate such that the airbags 77L and 77R press the bank parts 48b of the cushion pad 48 inward in the right-left direction. This configuration allows the upper body of the occupant to fit better between the left and right extending part airbags 77L and 77R (bank parts 48b), enabling a more stable support of the upper body of the occupant.

In the first modification, the main body airbags 71 and 72 are disposed away from the extending part airbags 77L and 77R such that they do not come into contact with each other. This configuration can prevent the interference between the main body airbags 71 and 72 and the extending part airbags 77L and 77R at the time of inflation of the air chambers 71a, 72a, 77La and 77Ra.

[Second Modification of Fourth Embodiment]

In the fourth embodiment, the extending parts 41b are partially disposed within the vertical range of the main body airbag 71 (air chamber 71a), but the present invention should not be limited to this configuration. For example, with reference to FIG. 30, the entire extending parts 41b may be disposed within the vertical range of the main body airbag 71 or 72. This disposition allows the extending parts 41b to effectively prevent the lateral movement of the main body airbag 71 or 72. For example, if the lateral movement of the main body airbags 71 and 72 is adequately controlled by the cushion pad 48, the extending parts 41b may be outside of the vertical range of the main body airbags 71 and 72.

[Third Modification of Fourth Embodiment]

In the fourth embodiment, the extending parts 41b are formed only at positions corresponding to the breast height of the occupant, but the present invention should not be limited to this configuration. For example, the extending parts 41b may be formed only at positions corresponding to the waist height of the occupant. Extending parts other than the extending parts 41b formed at the breast-height positions of the occupant may be formed at the waist-height positions of the occupant. If both the breast-height extending parts and the waist-height extending parts are provided, they may be formed independently or coupled with each other.

[Fourth Modification of Fourth Embodiment]

In the fourth embodiment, the two main body airbags 71 and 72 are disposed on the main body part 41a, but the present invention should not be limited to this configuration. Either the main body airbag 71 or 72 may be disposed on the main body part 41a, or one or more main body parts may be provided on the main body part 41a in addition to the main body airbags 71 and 72. The air chambers 77La and 78La of the extending part airbags 77L and 77R have the concave contours 77Lb and 77Rb, but the present invention should not be limited to this configuration. For example, the air chambers 77La and 78La of the extending part airbags 77L and 77R may have no concave contour 77Lb and 77Rb as shown in FIG. 33. For example, each of the contours 77Lb and 77Rb may be straight or curved into a convex shape protruding inward in the right-left direction.

[Modification 5 of Fourth Embodiment]

In the fourth embodiment, the main body airbags 71 and 72 or the extending part airbags 77L and 77R are the exemplary support position adjusters, but the present invention should not be limited to this configuration. The support position adjuster may be an apparatus primarily equipped with a plate-like member (support board) and a cable. The plate-like member is resiliently bendable and deformable and disposed on the pressure receiving member 41 between the pressure receiving member 41 and the cushion pad 48. The cable can vary the extent of deformation (curvature) of the support board by pulling the cable or releasing a pulled cable. Such an adjuster can vary the state of inflation of the cushion pad 48 according to the extent of curvature of the support board, thereby adjusting the supporting position of the occupant.

[Sixth Modification of Fourth Embodiment]

In the fourth embodiment, the coupling portions between the pressure receiving member 41 and the upper wire rod 43 (claws 41c) are within the vertical range of the extending parts 41b, but the present invention should not be limited to this configuration. For example, with reference to FIG. 30, the claws 41c may be outside of the vertical range of the extending parts 41b.

The coupling between the pressure receiving member 41 and the upper wire rod 43 should not be limited to the use of the claws 41c. For example, pairs of through-holes are disposed in a row in the right-left direction or in the up-down direction on the pressure receiving member 41 and the coupling wire rod is fixed with ties extending through the through-holes. This is also applied to the coupling between the pressure receiving member 41 and the lower wire rod 44.

[Seventh Modification of Fourth Embodiment]

The main body airbags 71 and 72 and the related members adopted for the fourth embodiment may be also applied to the seats 1A and 1B according to the second and third embodiments.

[Additional Statement on Fourth Embodiment]

As is evident from the above description of the fourth embodiment and its modifications, the description of the fourth embodiment and its modifications include various disclosures of technical ideas in addition to the aspect of the invention shown in the following notes.

Note 1.

A vehicle seat including a bottom seat and a backrest, wherein the backrest includes a backrest frame constituting part of the backrest, a cushion pad covering the backrest frame, and a plate-like pressure receiving member disposed inside the backrest frame to support load from an occupant, wherein the backrest includes a support position adjuster provided on the pressure receiving member and configured to adjust a supporting position of the occupant by deforming the cushion pad, and wherein the pressure receiving member includes a main body part facing a rear surface of the upper body of the occupant and extending parts extending from right and left edges of the main body part outward in the right-left direction.

Note 2.

The vehicle seat according to note 1, wherein the support position adjuster includes a main body airbag that is attached to a front surface of the main body part and inflates and deflates to deform the cushion pad, and wherein the extending parts extend from the right and left edges of the main body part diagonally forward and are disposed at least partially within a vertical range of the main body airbag.

Note 3.

The vehicle seat according to note 2, wherein the support position adjuster includes an extending part airbag that is mounted on each extending part and inflates and deflates to deform the cushion pad.

Note 4.

The vehicle seat according to note 3, wherein the main body airbag and each extending part airbag are disposed apart from each other such that the main body airbag and each extending part airbag do not come into contact with each other.

Note 5.

The vehicle seat according to note 3 or 4, wherein each extending part airbag has a recess on an inner face thereof in the right-left direction.

Note 6.

The vehicle seat according to one of notes 1 to 5, wherein the backrest includes a coupling wire rod put across the backrest frame and coupling the pressure receiving member to the backrest frame, and wherein a coupling portion between the pressure receiving member and the coupling wire rod is within a vertical range of the extending parts.

(a) Advantageous Effects of Present Invention Described in Note 1

The central main body part and the right and left extending parts can support a wide range of the upper body of the occupant via the cushion pad. This configuration can stabilize the support of the upper body of the occupant.

(b) Advantageous Effects of Present Invention Described in Note 2

The right and left extending parts can surround at least part of the main body airbag, thereby preventing the lateral movement of the main body airbag. This configuration can stabilize the support of the upper body of the occupant.

(c) Advantageous Effects of Present Invention Described in Note 3

The support position adjuster may include extending part airbags attached to the extending parts and inflating and deflating to deform the cushion pad.

(d) Advantageous Effects of Present Invention Described in Note 4

The upper body of the occupant is supported by the extending part airbags attached to the right and left extending parts such that the upper body is laterally surrounded by the extending part airbags. This configuration can further stabilize the support of the upper body of the occupant.

(e) Advantageous Effects of Present Invention Described in Note 5

The present invention described in Note 5 allows the upper body of an occupant to fit well between the right and left extending part airbags. This configuration can further stabilize the support of the upper body of the occupant.

(f) Advantageous Effects of Present Invention Described in Note 6

The pressure receiving member is coupled to the backrest frame via the coupling wire rod at the height of the extending parts. This enables the extending parts and the main body part at the height of the extending parts to receive the occupant load efficiently. This configuration can further stabilize the support of the upper body of the occupant.

Fifth Embodiment

Figure 35:
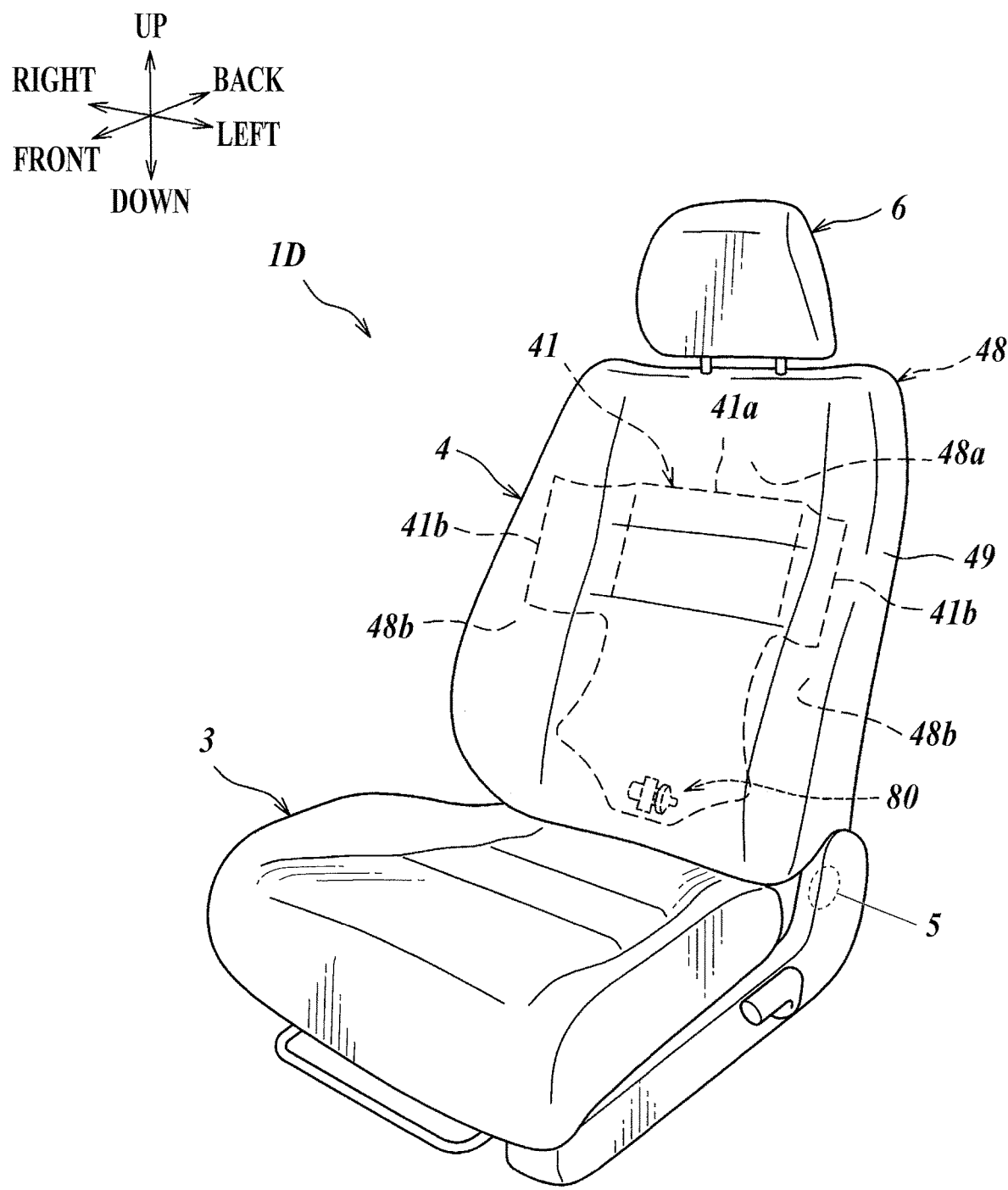
FIG. 35 is a perspective view of a seat according to a fifth embodiment of the present invention.
Figure 36:
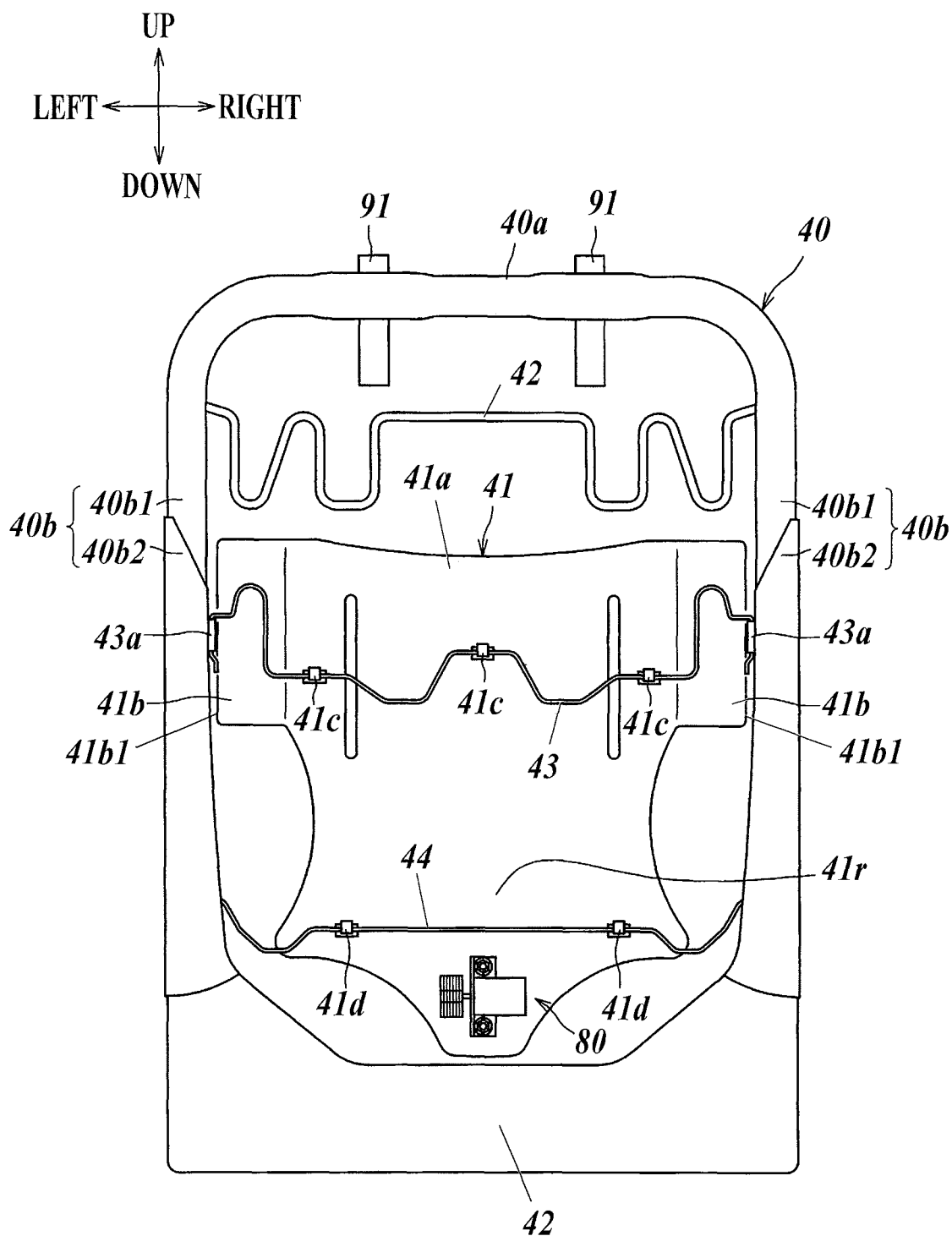
FIG. 36 is a rear view of a frame in a backrest according to the fifth embodiment of the present invention.
Figure 37:
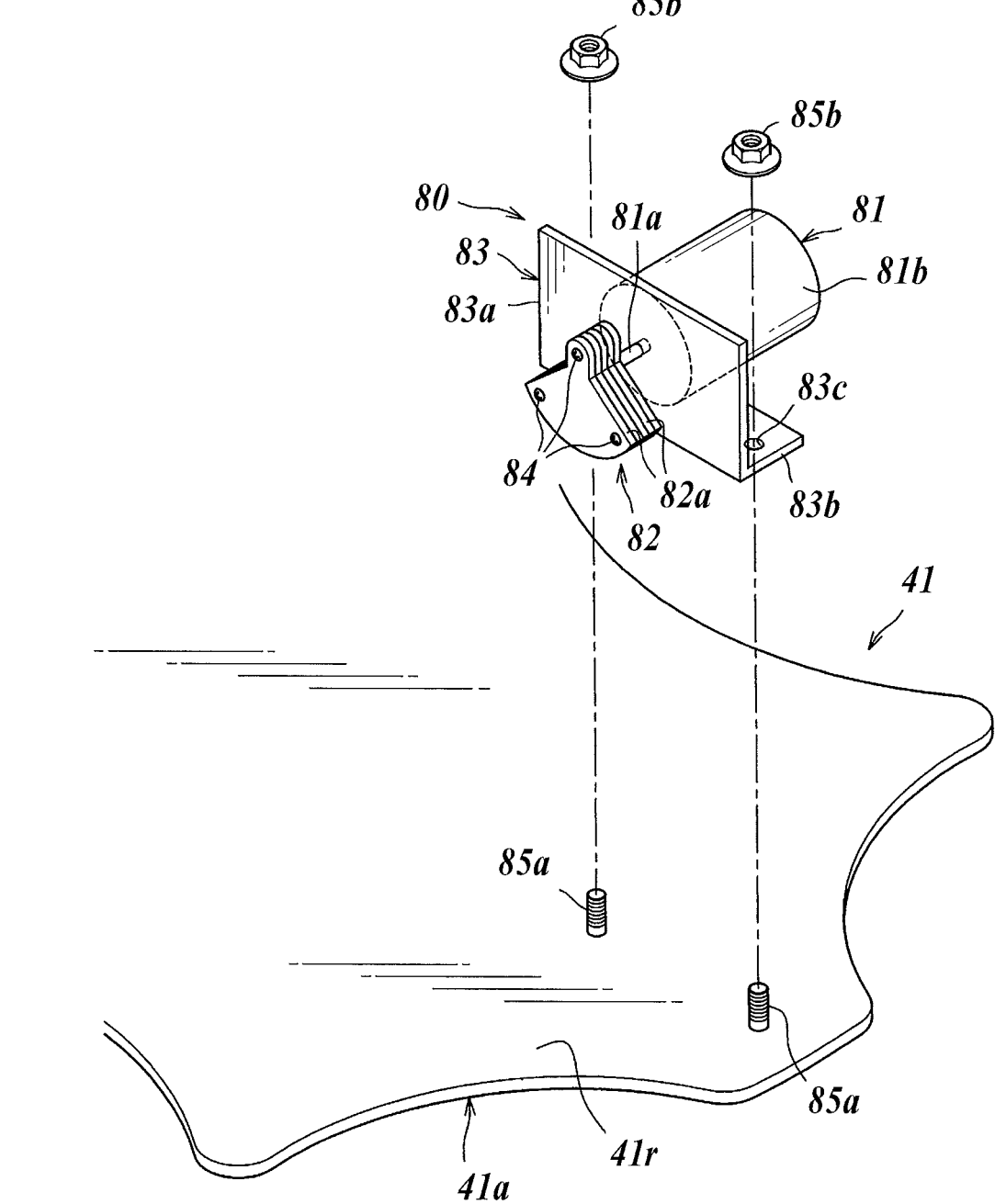
FIG. 37 is a rear perspective view of the lower portion of a main body part of a pressure receiving member disposed within the frame of the backrest according to the fifth embodiment of the present invention and a vibration generator.

FIG. 35 is a perspective view of a seat 1D according to the fifth embodiment of the present invention. FIG. 36 is a rear view of the backrest frame 40 of the seat 1D according to the fifth embodiment of the present invention. FIG. 37 is a perspective view of the rear surface of the pressure receiving member 41 of the seat 1D according to the fifth embodiment of the present invention. The same parts between the seat 1D according to the fifth embodiment and the seat 1 according to the first embodiment are given the same reference numerals. If the same parts are provided in the same manner, the explanation thereof will be omitted if possible. The following description focuses on differences between the seat 1D according to the fifth embodiment and the seat 1 according to the first embodiment.

Differences between the seat 1D according to the fifth embodiment and the seat 1 according to the first embodiment lie in the backrest 4. More specifically, as shown in FIGS. 35 to 37, the seat 1D according to the fifth embodiment is provided with a vibration generator 80 for vibrating an occupant seated on the seat 1D in the backrest 4. In contrast, the seat 1 according to the first embodiment is not provided with the vibration generator 80. The backrest 4 of the seat 1D according to the fifth embodiment is provided in the same manner as the backrest 4 of the seat 1 according to the first embodiment, except for the vibration generator 80, which is provided on the pressure receiving member 41.

The seat 1D according to the fifth embodiment includes slide rails, a bottom seat 3, a recliner mechanism 5, and a headrest 6, which are provided in the same manner as the slide rails 2, the bottom seat 3, the recliner mechanism 5, and the headrest 6 of the seat 1 according to the first embodiment (See FIG. 35).

The vibration generator 80 and relevant items will now be described.

The vibration generator 80 generates continuous or intermittent vibrations to provide an occupant with massage effect and/or awakening effect. The vibration generator 80 primarily includes a motor 81, an eccentric weight 82, and a mounting bracket 83. The motor 81 is driven to rotate the eccentric weight 82 and generate vibrations.

The eccentric weight 82 is a substantially fan-shaped weight. The eccentric weight 82 is fixed to a rotary shaft 81a of the motor 81 at a position deviating from the center of gravity of the eccentric weight 82, more specifically, near the pivot (center angle) of the fan. The eccentric weight 82 primarily includes multiple plate-like weight units 82a. The weight units 82a according to this embodiment are stackable in the axial direction (right-left direction) of the motor 81. The weight units 82a are fixable by screws 84 and separable from each other. This configuration can readily adjust the mass of the eccentric weight 82 by varying the number of weight units 82a. This can also readily vary the magnitude of vibration generated by the vibration generator 80 in accordance with the size of the seat equipped with the vibration generator 80.

The mounting bracket 83 is an L-shaped member made of metal or resin. The mounting bracket 83 includes a fixing portion 83a and a mounting portion 83b. The fixing portion 83a and the mounting portion 83b are each plate-like. The fixing portion 83a is perpendicular to the mounting portion 83b to form an L-shaped mounting bracket 83. The rotary shaft 81a of the motor 81 extends through the fixing portion 83a. The motor 81, in particular, a main body part 81b is fixed to the fixing portion 83a by a screw. The fixing portion 83a is disposed between the main body part 81b of the motor 81 and the eccentric weight 82. The mounting portion 83b extends from the corner between the fixing portion 83a and the mounting portion 83b on the side of the main body part 81b generally in parallel with the axial direction of the motor 81. A through-hole 83c is provided at each end of the longitudinal direction of the mounting portion 83b (only one through-hole is shown). In orthogonal view to the mounting portion 83b, the main body part 81b of the motor 81 is disposed between the through-holes 83c.

The vibration generator 80 is fixed to the pressure receiving member 41 by bolt and nut coupling. The vibration generator 80 is fixed to the pressure receiving member 41 below the lower wire rod 44 of the pressure receiving member 41, more specifically, in the lower portion of a rear surface 41r of the main body part 41a. This indicates that the vibration generator 80 is disposed not at the front edges 41b1 of the extending parts 41b.

A pair of bolts 85a protrudes from the pressure receiving member 41, in particular, from the rear surface of the main body part 81b. More specifically, the pair of the bolts 85a is provided on the pressure receiving member 41 by insert molding or by being inserted into the through-holes on the pressure receiving member 41 from the front. The bolts 85a are inserted into the through-holes 83c of the mounting bracket 83. The mounting portion 83b of the mounting bracket 83 is disposed between each nut 85b and the pressure receiving member 41. The nuts 85b are fastened to the bolts 85a. The mounting bracket 83 is thereby fixed to the pressure receiving member 41. The fixing portion 63b is perpendicular to the rear surface 41b of the pressure receiving member 41, while the mounting bracket 83 is fixed to the pressure receiving member 41. The mounting portion 83b extends from the front end of the fixing portion 83a over the rear surface 41b of the pressure receiving member 41. The mounting portion 83b has a greater vertical length.

The vibration generator 80 is activated to generate vibrations. When the motor 81 rotates the eccentric weight 82, vibrations are generated since the rotary shaft 81a deviates from the center of gravity of the eccentric weight 82. When the vibration generator 80 starts to vibrate, the pressure receiving member 41, which is suspended from the backrest frame 40 by wire rods 43 and 44, also vibrates. The vibrations of the pressure receiving member 41 are transmitted from the pressure receiving member 41 to an occupant leaning back the cushion pad 48 via the cushion pad 48 to provide the occupant with massage effect, awakening effect or both.

At a rear-end collision by another vehicle, the upper body of the occupant is pressed against the cushion pad 48 to significantly deform the near-center portion of the cushion pad 48. If the impulsive force is so large that a backward load exceeding a predetermined value is applied to the pressure receiving member 41 by the upper body of the occupant via the cushion pad 48, the pressure receiving member 41 moves backward relative to the left and right side frame segments 40b and the upper body of the occupant deeply sinks into the backrest 4. As a result, the head of the occupant rapidly approaches the headrest 6 and is supported thereby, thus protecting the head and the neck region of the occupant from the impact of the collision of the rear surface of the vehicle.

Advantageous effects of the seat with such a configuration will now be described.

The pressure receiving member 41 of the seat includes the main body part 41a and the right and left extending parts 41b. Thus, the central main body part 41a and the right and left extending parts 41b can support a wide range of the upper body of the occupant. This configuration can stabilize the support of the upper body of the occupant. The vibration generator 80 is disposed at a position avoiding the positions of the front edges (front ends or the ends of the extending parts) 41b1, which most largely move due to the deformation of the extending parts 41b. This disposition can prevent the vibration generator 80 from reducing the deformation of the extending parts 41b. The disposition of the vibration generator 80 at a position avoiding the positions of the front edges 41b1 of the extending parts 41b, which most largely displace, can prevent the attenuation of the vibrations generated by the vibration generator 80, thus efficiently transmitting vibrations to the occupant.

In this embodiment, the vibration generator 80 is mounted on the main body part 41a and thus disposed away from the extending parts 41b. This disposition can prevent the vibration generator 80 from reducing the deformation of the extending parts 41b. The attachment of the vibration generator 80 to the main body part 41a, which is less likely to deform than the extending parts 41b, can effectively prevent the attenuation of the vibrations generated by the vibration generator 80, thus efficiently transmitting vibrations to the occupant.

In this embodiment, the vibration generator 80 is mounted in the lower portion of the main body part 41a, which is close to the contact portion between the backrest 4 and the upper body of the occupant during a normal seating. This disposition can transmit the vibrations generated by the vibration generator 80 more efficiently to the occupant. The vibration generator 80 mounted in the lower portion of the main body part 41a can significantly vibrate the pressure receiving member 41 with the vibrations generated by the vibration generator 80 and thus can transmit large vibrations to the occupant. This enhances massage effect, awakening effect or both.

In this embodiment, the vibration generator 80 is mounted on the rear surface 41*r* of the main body part 41*a*. This mounted structure prevents the occupant from feeling a sense of discomfort caused by the vibration generator 80.

The vibration generator 80 mounted on the rear surface of the main body part 41*a* as in this embodiment makes the vibration generator 80 less offending in the backrest 4 than the mounting of the vibration generator on the front surface of the main body part 41*a*. This configuration enables mount of a relatively large vibration generator capable of generating large vibrations, if necessary, for example, for a large seat.

The fifth embodiment of the present invention has been described above. The embodiments applicable to the present invention should not be limited to those described above and may be modified as appropriate within the scope of the present invention. The following description focuses on several modifications of the fifth embodiment. These modifications are the same as the fifth embodiment except for some changes. The following modifications may be combined according to demand.

[First Modification of Fifth Embodiment]

Figure 38:
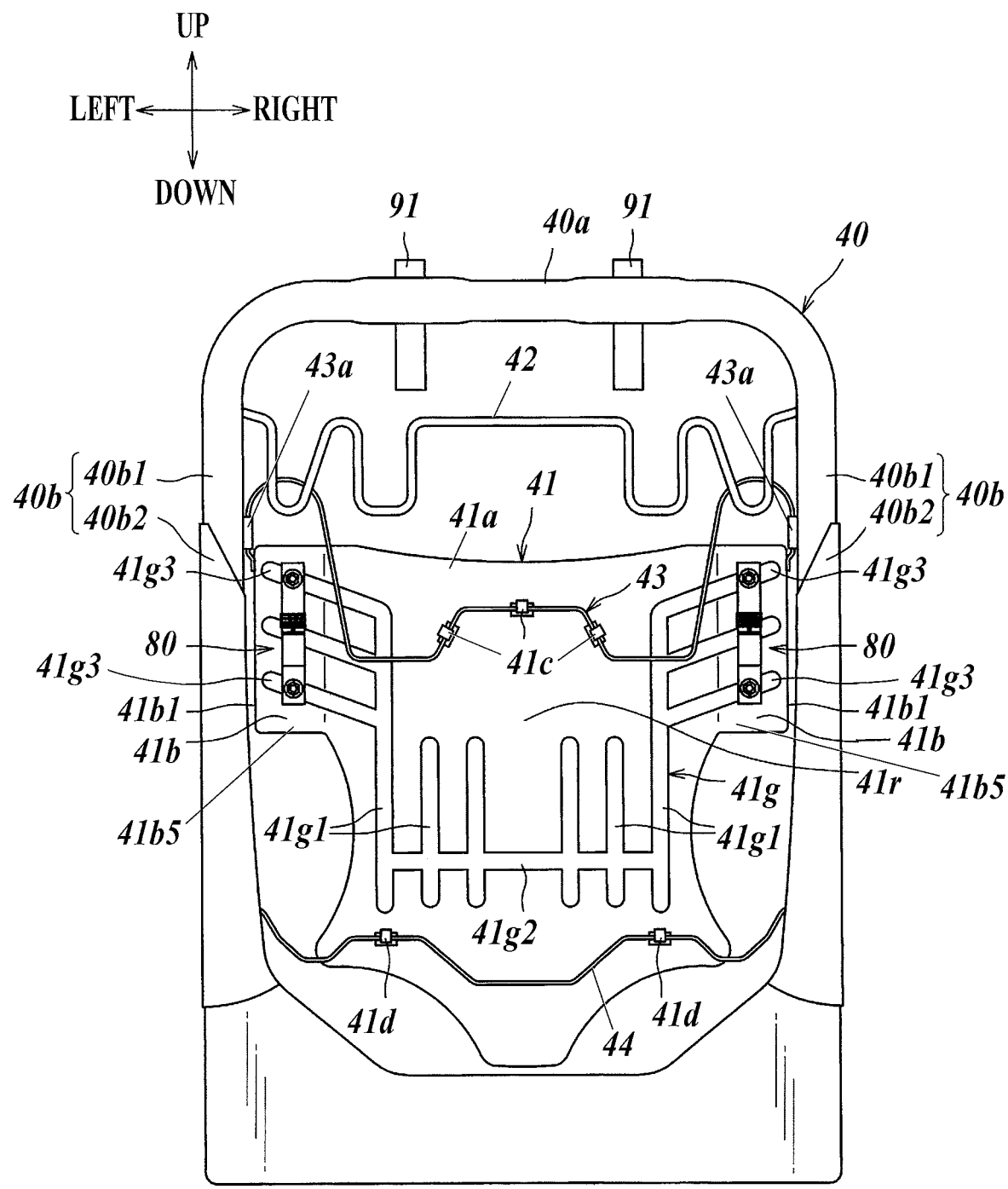
FIG. 38 is a rear view of a frame in a backrest according to a first modification of the fifth embodiment of the present invention.

In the above description, the vibration generator 80 is disposed on the main body part 41*a*, as shown in FIG. 36. In contrast, in the first modification, two vibration generators 80 are disposed, one on the right extending part 41*b* and the other on the left extending part 41*b*, as shown in FIG. 38. FIG. 38 is a rear view of a frame 40 of a backrest 4 according to the first modification of the fifth embodiment.

The pressure receiving member 41 primarily includes a main body part 41*a* and right and left extending parts 41*b*. Each extending part 41*b* resiliently bends and deforms in the front-back direction along the connecting line between the extending part 41*b* and the main body part 41*a*. In this embodiment, a bead 41*g* is formed on the pressure receiving member 41. The bead 41*g* is concave in front view and convex in rear view. The bead 41*g* includes multiple vertical beads 41*g*1, a lower bead 41*g*2, and multiple upper beads 41*g*3. The multiple vertical beads 41*g*1 extend vertically. The lower bead 41*g*2 extends in the right-left direction to couple the lower portions of the vertical beads 41*g*1. The multiple upper beads 41*g*3 extend from the upper portions of the rightmost and leftmost vertical beads 41*g*1 diagonally upward to the outside in the right-left direction.

The vertical beads 41*g*1 and the lower bead 41*g*2 are formed on the main body part 41*a*. In contrast, the upper beads 41*g*3 continuously extend from the right and left upper portions of the main body part 41*a* to the front edges of the extending parts 41*b*. Three upper beads 41*g*3 are formed on the right and left sides of the pressure receiving member 41 and disposed vertically side by side. The upper beads 41*g*3 are exemplary reinforcing members. The portion of the extending parts 41*b* provided with the upper beads 41*g*3 has higher rigidity than other portion of the extending part 41*b* without the upper beads 41*g*3.

Figure 39:
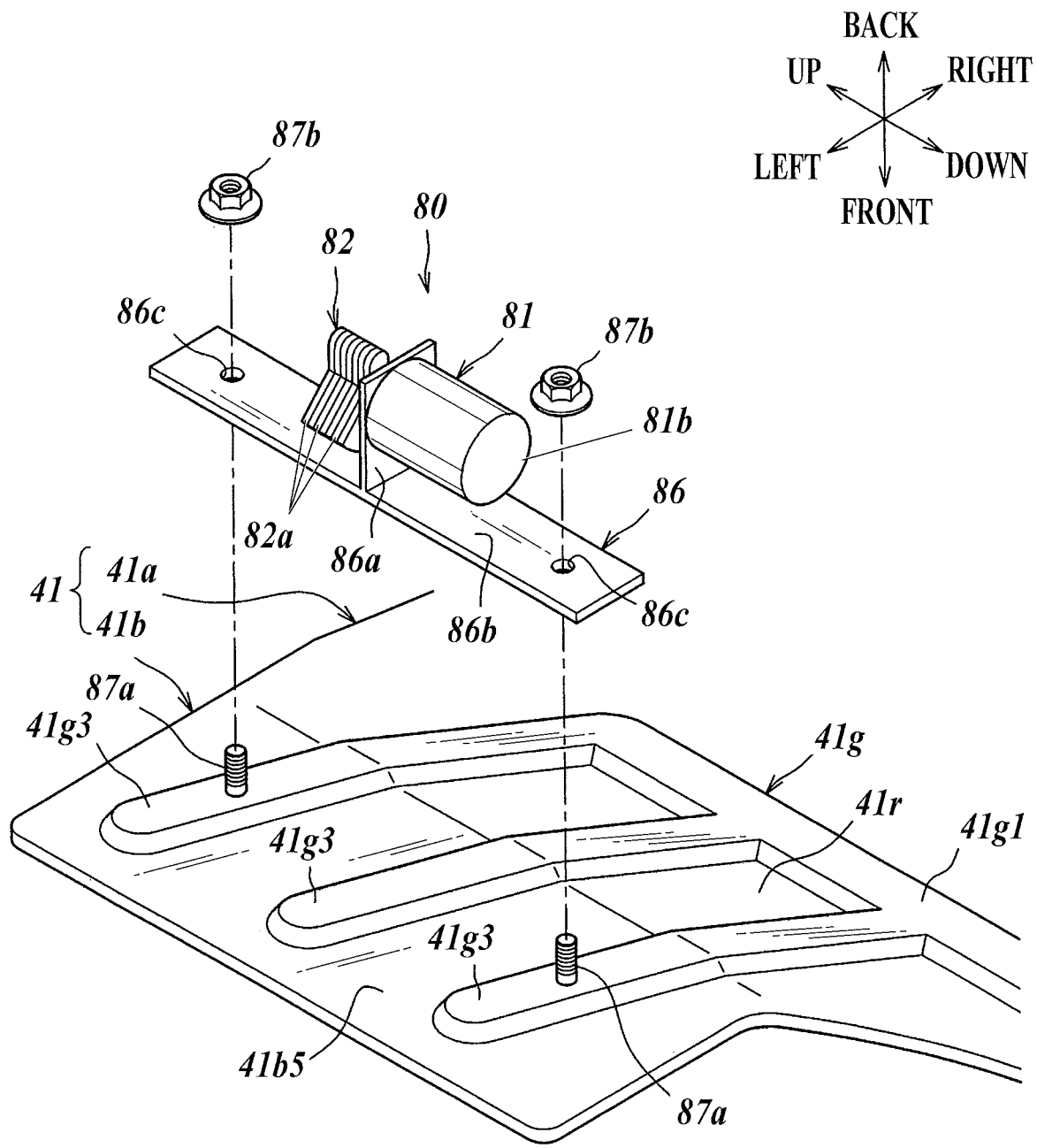
FIG. 39 is a rear perspective view of an extending part of a pressure receiving member disposed within the frame of the backrest according to the first modification of the fifth embodiment of the present invention and a vibration generator.

FIG. 39 is a perspective view of the rear surface of the left extending part 41*b* of the pressure receiving member 41. As shown in FIG. 39, the left vibration generator 80 primarily includes a motor 81, an eccentric weight 82, and a mounting bracket 86. The mounting bracket 86 is a T-shaped member. The mounting bracket 86 includes a fixing portion 86*a* and amounting portion 86*b*. The mounting portion 86*b* has a strip shape. The fixing portion 86*a* is erected at the center of the mounting portion 86*b*. The motor 81 has a rotary shaft passing through the fixing portion 86*a* and has a main body part 81*b* fixed to the fixing portion 86*a*. The eccentric weight 82 is fixed to the rotary shaft of the motor 81 on the opposite side of the main body part 81*b* with respect to the fixing portion 86*a*. The center of gravity of the eccentric weight 82 deviates from the rotary shaft of the motor 81. A through-hole 86*c* is provided at each end of the longitudinal direction of the mounting portion 86*b*.

The vibration generator 80 is fixed to the pressure receiving member 41 at the upper beads 41*g*3. Each vibration generator 80 is mounted at the center (with respect to the right-left direction) of the rear surface 41*b*5 of the corresponding extending part 41*b* of the pressure receiving member 41. This indicates that each vibration generator 80 is disposed away from the front edge 41*b*1 of the extending part 41*b*, similarly to the first embodiment.

The vibration generators 80 are fixed to the extending parts 41*b* by bolt and nut coupling. Two bolts 87*a* are provided on the top and bottom upper beads 41*g*3 on each extending part 41*b*. The bolts 87*a* extend through the through-holes 86*c* in the mounting portion 86*b*. The mounting portion 86*b* is disposed between each nut 87*b* and each extending part 41*b*. Each nut 87*b* is fastened to the corresponding bolt 87*a*. The vibration generator 80 is thereby fixed to the pressure receiving member 41 at the upper beads 41*g*3. The fixing portion 86*a* is erected on the rear surface 41*b*5 of the extending part 41*b*, while the mounting bracket 86 is fixed to the extending part 41*b*. The mounting portion 86*b* extends from the front end of the fixing portion 83*a* over the rear surface 41*b*5 of each extending part 41*b* in the axial direction (vertical direction) of the motor 81. The mounting portion 86*b* has a greater vertical length.

The right vibration generator 80 has the same configuration as that of the left vibration generator 80. The right vibration generator 80 is fixed to the right extending part 41*b*, similarly to the left vibration generator 80, which is fixed to the left extending part 41*b*.

Similarly to the first modification of the fifth embodiment, the main body part 41*a* and the right and left extending parts 41*b* of the first modification can support a wide range of the upper body of the occupant. This configuration can stabilize the support of the upper body of the occupant. The vibration generators 80, disposed at position avoiding the positions of the front edges 41*b*1 of the extending parts 41*b*, can maintain a proper deformation of the extending parts 41*b* and efficiently transmit the vibrations to the occupant.

In the first modification, each vibration generator 80, mounted on the center (with respect to the right-left direction) of the extending part 41*b*, can maintain a proper deformation of the extending parts 41*b*. Each vibration generator 80 mounted at the center (with respect to the right-left direction) of the extending part 41*b* can maintain a proper deformation of the extending parts 41*b* more effectively than each vibration generator 80 mounted near the connecting portion between the extending part 41*b* and the main body part 41*a*, at which the extending part 41*b* bends.

In the first modification, the pressure receiving member 41, having the beads 41*g*, have enhanced rigidity, thus further stabilizing the support of the upper body of the occupant. The vibration generators 80, mounted on the extending parts 41*b* having an increased rigidity due to the upper beads 41*g*3, stabilize the mount of the vibration generators 80 on the extending parts 41*b*. This configuration can enhance the rigidity of the mounted vibration generators 80 and thus can transmit vibrations to the occupant efficiently.

In the first modification, the vibration generators 80 are mounted on the right and left extending parts 41*b*. Thus, the extending parts 41*b* can stabilize the support of the upper body of the occupant while transmitting the vibrations generated by the vibration generators 80 to the occupant from the right and left of the rear surface of the upper body. This configuration can enhance massage effect and/or awakening effect.

In the first modification, the vibration generators 80, mounted on the rear surfaces 41*b*5 of the extending parts 41*b*, can prevent the occupant from feeling a sense of discomfort caused by the vibration generators 80.

[Second Modification of Fifth Embodiment]

In the fifth embodiment, the vibration generator 80 is mounted in the lower portion of the main body part 41*a*, but the present invention should not be limited to this configuration. For example, the vibration generator 80 may be mounted in the upper portion or at the vertical center of the main body part 41*a* of the pressure receiving member 41. Since the lower portion of the main body part 41*a* is a position at which the upper body of the occupant comes into contact with the backrest 4 during normal sitting of an occupant, the vibrations generated by the vibration generator 80 is efficiently transmitted to the occupant. Thus, the vibration generator 80 is preferably mounted below the vertical center of the main body part 41*a*.

[Third Modification of Fifth Embodiment]

In the fifth embodiment, the vibration generator 80 is mounted only on the main body part 41*a*. In the first modification, the vibration generators 80 are mounted only on the extending parts 41*b*, but the present invention should not be limited to this configuration. One or more vibration generators 80 may be mounted on the main body part 41*a*, one or more vibration generators 80 may be mounted on the left extending part 41*b*, and one or more vibration generators 80 may be mounted on the right extending part 41*b*.

[Fourth Modification of Fifth Embodiment]

In the first modification, two vibration generators 80 are mounted, one on the right extending part 41*b* and the other on the left extending part 41*b*, but the present invention should not be limited to this configuration. One or more vibration generators 80 may be mounted on either right or left extending part 41*b* and no vibration generator may be mounted on the other extending part 41*b*.

[Fifth Modification of Fifth Embodiment]

In the first modification, vibration generators 80 are each mounted on the extending part 41*b* at the upper beads 41*g*3, but the present invention should not be limited to this configuration. For example, even if the vibration generator 80 is mounted on the main body part 41*a*, the vibration generator 80 may be fixed to the main body part 41*a* at a bead formed on the main body part 41*a*.

[Sixth Modification of Fifth Embodiment]

In the first and fifth modifications, exemplary reinforcing members for reinforcing the pressure receiving member 41 are beads (for example, the upper beads 41*g*3 for the extending part 41*b*), but the present invention should not be limited to this configuration. For example, a part of the pressure receiving member 41 may have a greater thickness for higher rigidity than the other part to use the thicker portion as a reinforced portion.

[Seventh Modification of Fifth Embodiment]

In the fifth embodiment, the upper wire rod 43 and the lower wire rod 44 are put across the backrest frame 40 as coupling wire rods in the right-left direction, but the present invention should not be limited to this configuration. For example, the coupling wire rods may be put vertically or diagonally across the backrest frame 40.

[Eighth Modification of Fifth Embodiment]

The configuration of the vibration generator 80 shown in the fifth embodiment and the first modification thereof is an exemplary one, but the present invention should not be limited to this configuration. For example, the eccentric weight 82 in the fifth embodiment and the first modification thereof is composed of several pieces so as to adjust the number of weight units 82*a*, but the present invention should not be limited to this configuration. The eccentric weight 82 may be composed of a single piece. A bracket for mounting the vibration generator 80 on the pressure receiving member 41 is not limited to the mounting brackets 83 and 86 shown in the fifth embodiment and the first modification thereof, but may have any configuration suitable for a mounting portion on the pressure receiving member 41.

[Ninth Modification of Fifth Embodiment]

In the fifth embodiment, the extending parts 41*b* are formed only at positions corresponding to the breast height of the occupant, but the present invention should not be limited to this configuration. For example, the extending parts 41*b* may be formed only at positions corresponding to the waist height of the occupant. Extending parts other than the extending parts 41*b* formed at the breast-height positions of the occupant may be formed at the waist-height positions of the occupant. If both the breast-height extending parts and the waist-height extending parts are provided, they may be formed independently or coupled with each other.

[Tenth Modification of Fifth Embodiment]

The vibration generator 80 of the fifth embodiment may be applied to the seats LA, 1B, and 1C according to the second, third and fourth embodiments, respectively. This is also applied to the vibration generators 80 of the first modification of the fifth embodiment.

[Additional Statement on Fifth Embodiment]

As is evident from the above description of the fifth embodiment and its modifications, the description of the fifth embodiment and its modifications include various disclosures of technical ideas in addition to the aspect of the invention shown in the following notes.

Note 1.

A vehicle seat having a bottom seat and a backrest, the vehicle seat including:

a backrest frame constituting part of the backrest;

a coupling wire rod put across the backrest frame;

a plate-like pressure receiving member coupled to the backrest frame via the coupling wire rod and receiving load from an occupant; and a vibration generator mounted on the pressure receiving member and providing the occupant with vibrations, wherein the pressure receiving member includes a main body part facing a rear surface of the upper body of the occupant and extending parts extending from right and left edges of the main body part outward in the right-left direction and being resiliently deformable in the front-back direction, and wherein the vibration generator is disposed at a position avoiding positions of the front edges of the extending parts.

Note 2.

The vehicle seat according to note 1, wherein the vibration generator is mounted on the main body part.

Note 3.

The vehicle seat according to note 2, wherein the vibration generator is mounted on a rear surface of the main body part.

Note 4.

The vehicle seat according to note 2 or 3, wherein the vibration generator is disposed below a vertical center of the main body part.

Note 5.

The vehicle seat according to note 4, wherein the vibration generator is mounted on a lower end portion of the main body part.

Note 6.

The vehicle seat according to note 1, wherein the vibration generator is mounted on an extending part of the extending parts.

Note 7.

The vehicle seat according to note 6, wherein the extending part has a reinforced portion having greater rigidity than the other portion of the extending part, and wherein the vibration generator is fixed at the reinforced portion.

Note 8.

The vehicle seat according to note 6 or 7, wherein the vibration generator is mounted on a rear surface of the extending part.

(a) Advantageous Effects of Present Invention Described in Note 1

The central main body part and the right and left extending parts can support a wide range of the upper body of the occupant. This configuration can stabilize the support of the upper body of the occupant. The vibration generator mounted at a position avoiding the positions of the front edges of the extending parts, which most largely move due to the deformation of the extending parts, can prevent the vibration generator from reducing the deformation of the extending parts and the attenuation of the vibrations generated by the vibration generator, thereby efficiently transmitting vibrations to the occupant.

(b) Advantageous Effects of Present Invention Described in Note 2

The present invention described in Note 2 can maintain proper deformation of the extending parts and efficiently transmit vibrations generated by the vibration generator to the occupant.

(c) Advantageous Effects of Present Invention Described in Note 3

The present invention described in Note 3 can prevent the occupant from feeling a sense of discomfort caused by the vibration generator. This allows a relatively large vibration generator capable of generating large vibrations to be mounted.

(d) Advantageous Effects of Present Invention Described in Note 4

The vibration generator mounted below the vertical center of the main body part, which is a main contact portion between the upper body of the occupant and the backrest during a normal seating, can transmit the vibrations generated by the vibration generator more efficiently to the occupant.

(e) Advantageous Effects of Present Invention Described in Note 5

The vibrations generated by the vibration generator can significantly vibrate the pressure receiving member and thus can transmit greater vibrations to the occupant. This can enhance massage effect and/or awakening effect.

(f) Advantageous Effects of Present Invention Described in Note 6

The present invention described in Note 6 can stabilize the support of the upper body of the occupant while transmitting the vibrations generated by the vibration generator to the occupant from the right and left of the rear surface of the upper body. This can enhance massage effect and/or awakening effect.

(g) Advantageous Effects of Present Invention Described in Note 7

The extending part having the reinforced portion can further stabilize the support the upper body of the occupant and the mount of the vibration generator on the extending part. This configuration enhances the mounting rigidity of the vibration generator and can transmit the vibrations generated by the vibration generator to the occupant more efficiently.

(h) Advantageous Effects of Present Invention Described in Note 8

The vibration generator can prevent the occupant from feeling a sense of discomfort.

Sixth Embodiment

Figure 40:
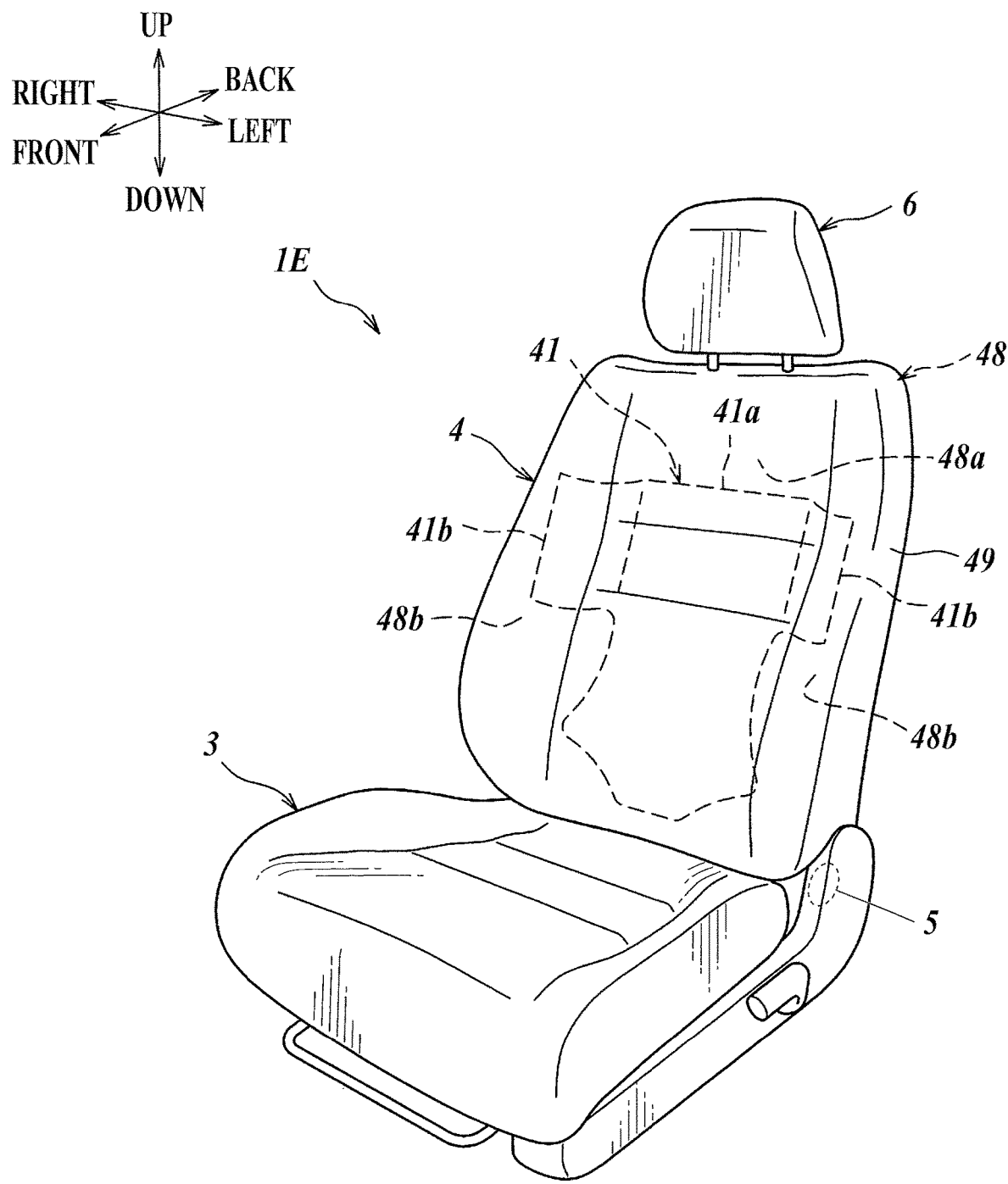
FIG. 40 is a perspective view of a seat according to a sixth embodiment of the present invention.
Figure 41:
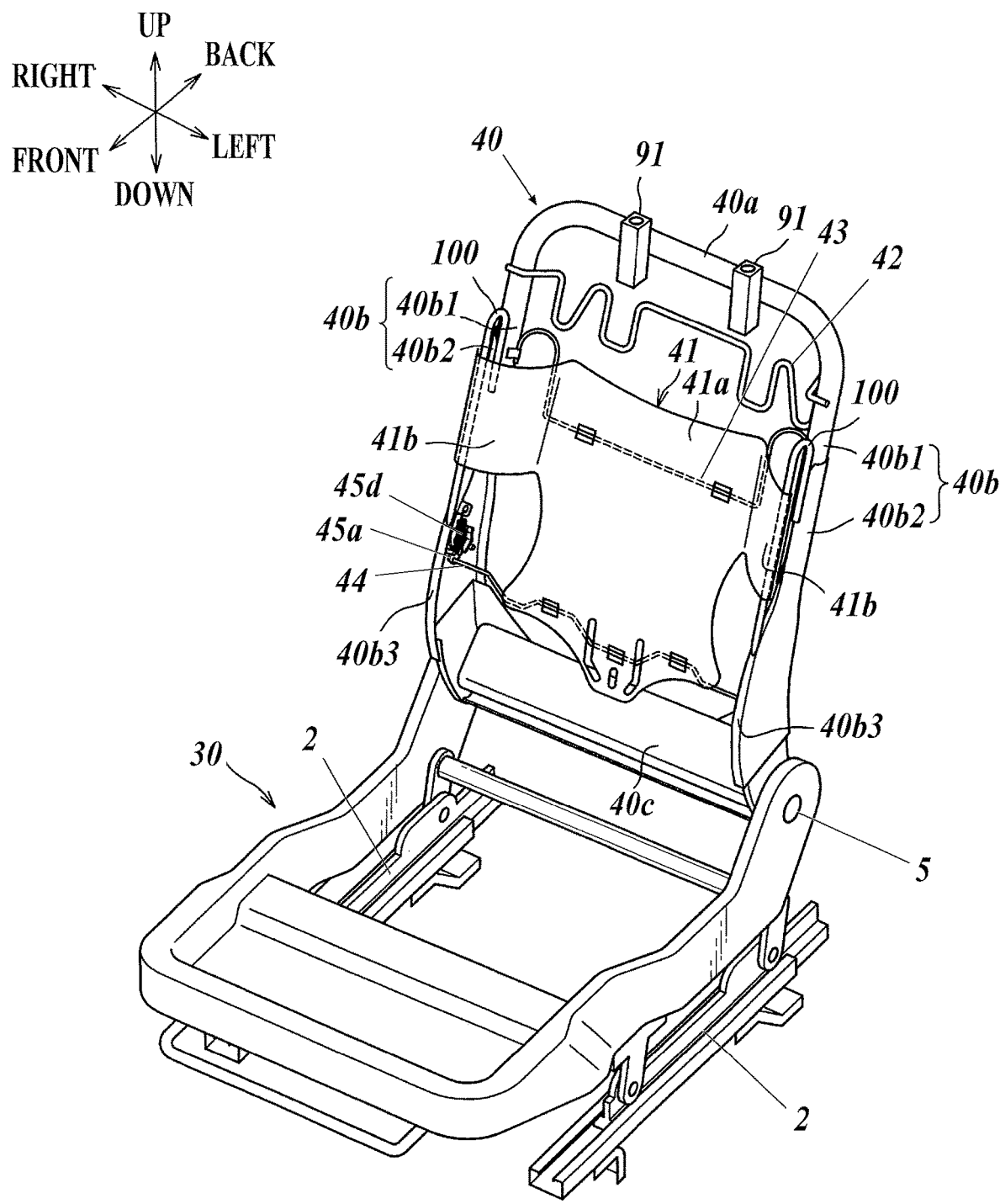
FIG. 41 is a perspective view of a seat frame in the seat according to the sixth embodiment of the present invention.
Figure 42:
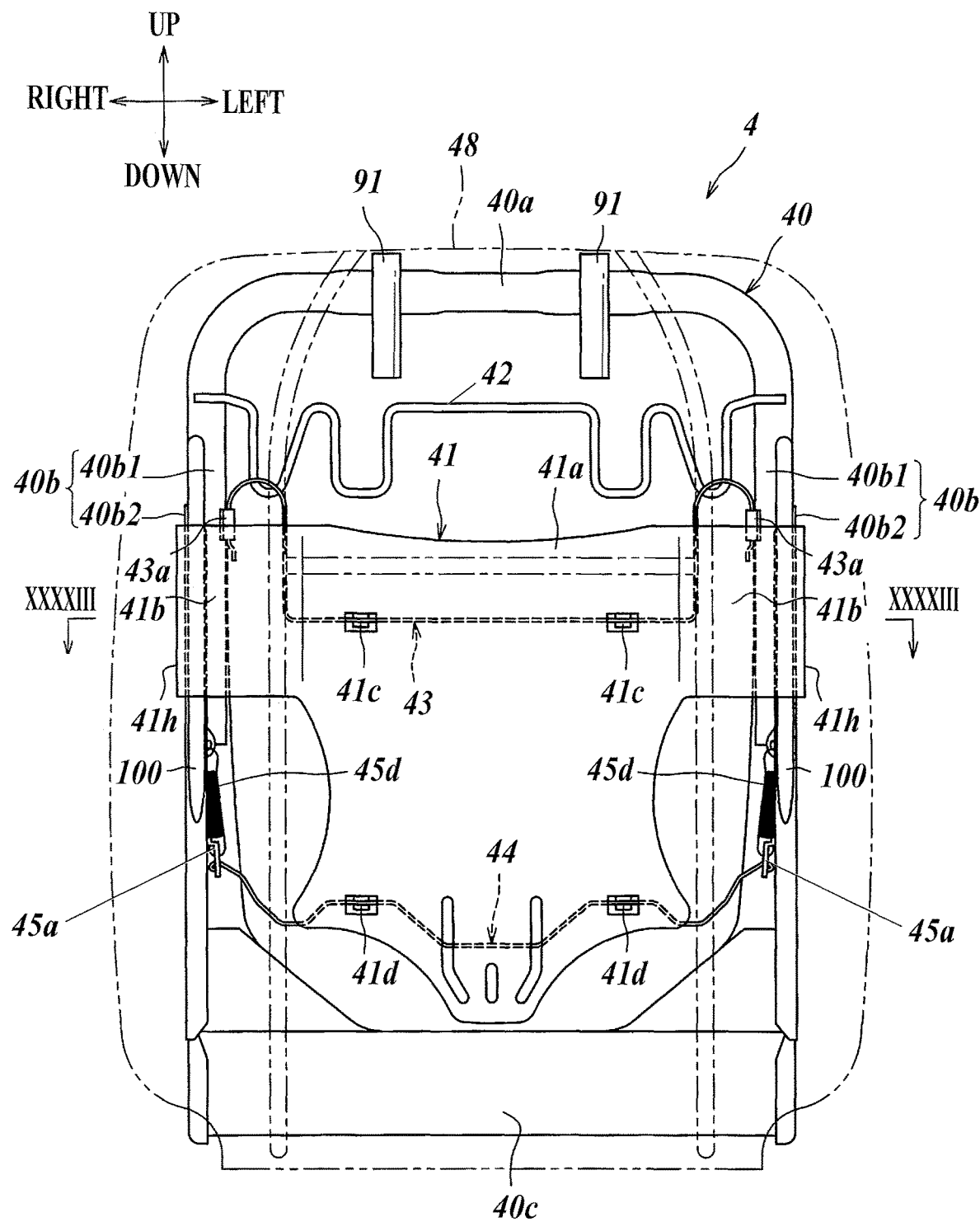
FIG. 42 is a front view of a backrest according to the sixth embodiment of the present invention and a frame in the backrest.
Figure 43:
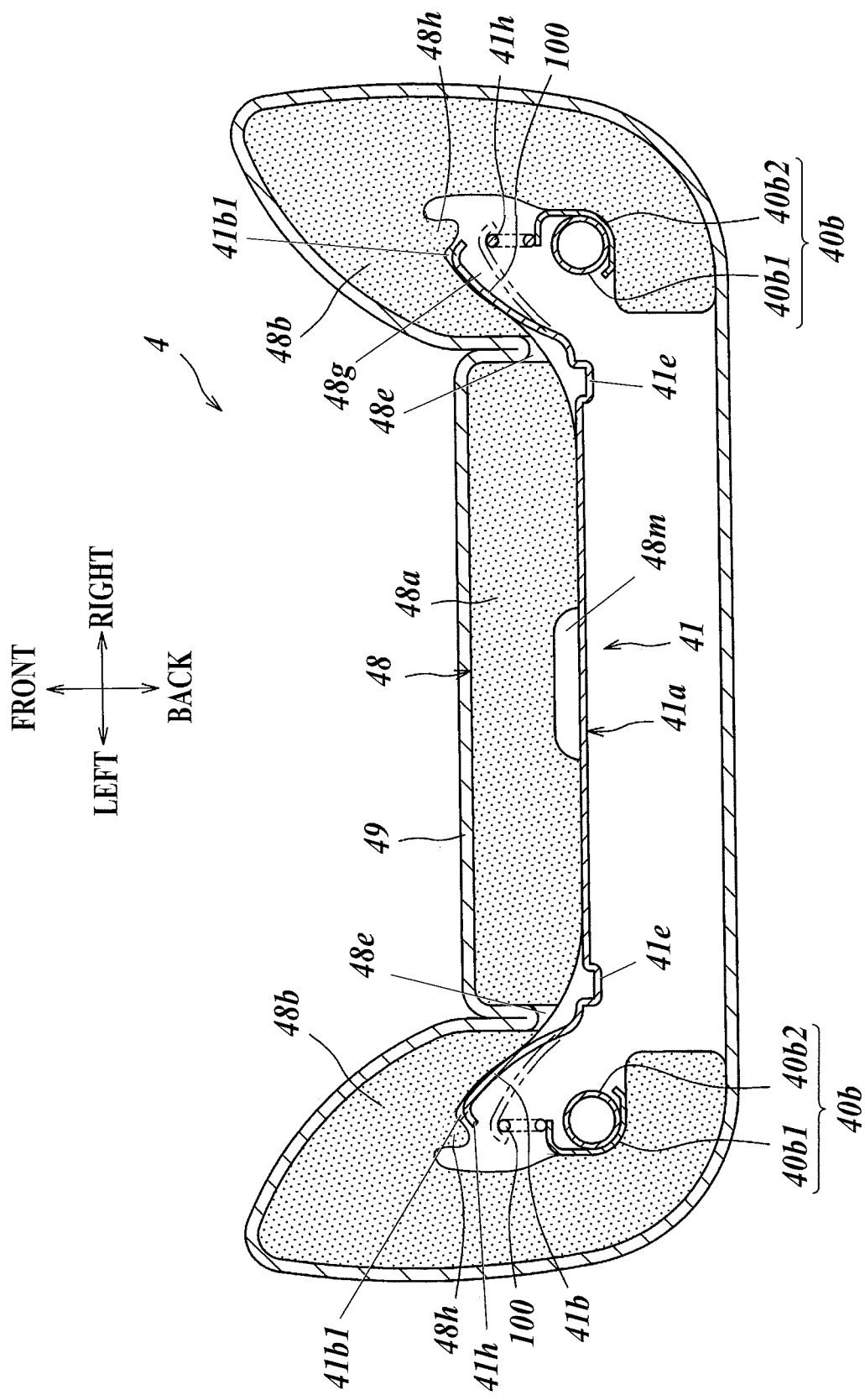
FIG. 43 is a cross sectional view taken along line XXXXIII-XXXXIII in FIG. 42.

FIG. 40 is a perspective view of a seat 1E according to a sixth embodiment of the present invention. FIG. 41 is a perspective view of a seat frame of the seat 1E. FIG. 42 is a front view of the backrest 4 of the seat 1E. FIG. 42 illustrates a cushion pad 48 of the backrest 4 with a two-dot chain lines to show the inside of the backrest 4. FIG. 43 is a cross sectional view taken along line XXXXIV-XXXXIV in FIG. 42, viewed in the direction of arrows. The same parts between the seat 1E according to the sixth embodiment and the seat 1 according to the first embodiment are given the same reference numerals. If the same parts are provided in the same manner, the explanation thereof will be omitted if possible. The following description focuses on differences between the seat 1E according to the sixth embodiment and the seat 1 according to the first embodiment.

Differences between the seat 1E according to the sixth embodiment and the seat 1 according to the first embodiment lie in the backrest 4. More specifically, the backrest 4 of the seat 1E according to the sixth embodiment includes a pair of the right and left deformation controlling means for controlling the extent of deformation of the extending parts 41b. As shown in FIGS. 40 to 43, the deformation controlling means includes supporting wire rods (side support members) 100. The extending part 41b provided in the backrest 4 according to the sixth embodiment have a greater horizontal length than the extending part 41b provided in the backrest 4 according to the first embodiment. A hook-like engaging portion 41h is formed at each front edge of the extending part 41b of the seat 1E according to the sixth embodiment. The hook-like engaging portion 41h bends diagonally backward to the outside in the right-left direction. The backrest 4 of the seat 1E according to the sixth embodiment is provided in the same manner as that of the seat 1 according to the first embodiment except for the components described above.

The seat 1E according to the sixth embodiment includes slide rails, a bottom seat 3, a recliner mechanism 5, and a headrest 6. These are provided in the same manner as the slide rails 2, the bottom seat 3, the recliner mechanism 5, and the headrest 6 of the seat 1 according to the first embodiment.

The pair of the right and left supporting wire rods 100, the extending parts 41b and the engaging portions 41h will now be described.

The left side frame segment 40b includes the left supporting wire rod 100. The right side frame 40b includes the right supporting wire rod 100. The supporting wire rods (side support members) 100 are provided inside the backrest 4. The supporting wire rods 100 are formed by bending a metal rod into a substantially U shape. The supporting wire rods 100 are contact members (stoppers).

The left supporting wire rod 100 is attached to the left side frame segment 40*b* by welding such that it connects the top end of the main body part 40*b*2 of the left side frame segment and a protrusion 40*b*3 thereof. The right supporting wire rod 100 is also attached to the right side frame 40*b* in a similar manner.

As shown in FIGS. 42 and 43, the extending parts 41*b* primarily support the rear-half of the sides of the breast-height part of the occupant's upper body via the bank parts 48*b*. The extending parts 41*b* are integrated with the main body part 41*a*. The extending parts 41*b* extend from the right and left upper edges of the main body part 41*a*. More specifically, the extending parts 41*b* extend from the portions of the main body part 41*a* at the breast height of the occupant diagonally forward to the outward in the right-left direction to the front of the supporting wire rods 100 of the side frame segments 40*b* and the side frame segments 40*b*. Each extending part 41*b* is apart frontward from the supporting wire rod 100 with a certain gap between the extending part 41*b* and the supporting wire rod 100. The extending parts 41*b* extending to the front of the side frame segments 40*b* prevent the overlap of the front edges 41*b*1 of the extending parts 41*b* with the upper wire rod 43 in front view, as shown in FIG. 42.

The advantageous effects of the seat 1E with such a configuration will now be described.

When an occupant leans against the backrest 4 during a normal seating, load is applied from the upper body of the occupant to the pressure receiving member 41 via the cushion pad 48. The pressure receiving member 41, which includes the main body part 41*a* and the right and left extending parts 41*b*, can support a wide range of the upper body of the occupant with the central main body part 41*a* and the right and left extending parts 41*b*. This configuration can stabilize the support of the upper body of the occupant.

When the occupant leans against the backrest 4, the bank parts 48*b* of the cushion pad 48 deform and the extending parts 41*b* also resiliently bend backward accordingly. As the bank parts 48*b* have a greater extent of deformation, the extending parts 41*b* further bend backward. As shown with the chain lines in FIG. 43, at a predetermined amount of bending of the extending parts 41*b*, the front edges of the extending parts 41*b* come into contact with the supporting wire rods 100. This contact precludes further bending of the extending parts 41*b*. The supporting wire rods 100, which can control the extent of deformation of the extending parts 41*b*, can prevent excess deformation of the extending parts 41*b*. This configuration can also stabilize the support of the upper body of the occupant.

In this embodiment, when the front edges of the extending parts 41*b* come into contact with the supporting wire rods 100, the engaging portions 41*h* are engaged with the supporting wire rods 100. An embodiment having the engaging portions 41*h* as in this embodiment can control the positions of the front edges of the extending parts 41*b* more strictly than an embodiment without the engaging portions 41*h*. This configuration can prevent excess deformation of the extending parts 41*b* and stabilize the support of the upper body of the occupant.

In this embodiment, the contact between the front edges of the extending parts 41*b* and the supporting wire rods 100 controls the extent of deformation of the extending parts 41*b*. This, in turn, indicates that the deformation of the extending parts 41*b* is allowable until the front edges of the extending parts 41*b* comes into contact with the supporting wire rods 100. This configuration ensures a necessary extent of deformation for the extending parts 41*b*.

In this embodiment, the claws 41*c* at which the pressure receiving member 41 is coupled to the upper wire rod 43 are within the vertical range of the extending parts 41*b*. This disposition allows the pressure receiving member 41 to be coupled to the backrest frame 40 at the height of the extending parts 41*b* via the upper wire rod 43. This coupling stabilizes the posture of the pressure receiving member 41 (the extending parts 41*b*) and allows the supporting wire rods 100 to prevent excess deformation of the extending parts 41*b*. This configuration can further stabilize the support of the upper body of the occupant.

This embodiment includes the supporting wire rods 100, which are attached to the side frame segments 40*b* as contact members. If no supporting wire rod 100 is provided on the side frame segments 40*b*, the portions that come into contact with the front edges of the extending parts 41*b* should be provided on the side frame segments 40*b* themselves to use the side frame segment 40*b* as contact members. In contrast, the supporting wire rods 100 provided on the side frame segments 40*b* as in this embodiment eliminate the necessity for forming contact portions on the side frame segments 40*b*. This helps prevent the increase in size of the frame segments 40*b*. The elimination of the necessity for forming contact portions on the side frame segments 40*b* indicates the elimination of the necessity for producing the side frame segments 40*b* dedicated to the seat 1E according to this embodiment. This can enhance the versatility of the side frame segments 40*b* since the side frame segments 40*b* can be used for seats other than the seat 1E.

The front edges 41*b*1 of the extending parts 41*b* do not overlap with the upper wire rod 43 in front view. This configuration can prevent the interference between the front edges 41*b*1 and the upper wire rod 43 even if the deformation of the extending parts 41*b* causes the front edges 41*b*1 to move in the front-back direction.

At a rear-end collision by another vehicle, the upper body of the occupant is pressed against the cushion pad 48 to significantly deform the near-center portion of the cushion pad 48. If the impulsive force is so large that a backward load exceeding a predetermined value is applied to the pressure receiving member 41 by the upper body of the occupant via the cushion pad 48, the pressure receiving member 41 moves backward relative to the left and right side frame segments 40*b*. In this case, the front edges of the extending parts 41*b* come into contact with the supporting wire rods 100 to cause the engaging portions 41*h* to catch the supporting wire rods 100. In case of a large backward load applied, the engaging portions 41*h* can deform and release the supporting wire rods 100, thus enabling a backward movement of the pressure receiving member 41.

The backward movement of the pressure receiving member 41 causes the upper body of the occupant to deeply sink into the backrest 4. As a result, the head of the occupant rapidly approaches the headrest 6 and is supported thereby, thus protecting the head and the neck region of the occupant from the impact of the collision of the rear surface of the vehicle.

The sixth embodiment of the present invention has been described. The embodiments applicable to the present invention should not be limited to those described above and may be modified as appropriate within the scope of the present invention. The following description focuses on several modifications of the sixth embodiment. These modifications are the same as the sixth embodiment except for some changes. The following modifications may be combined according to demand.

[First Modification of Sixth Embodiment]

Figure 44:
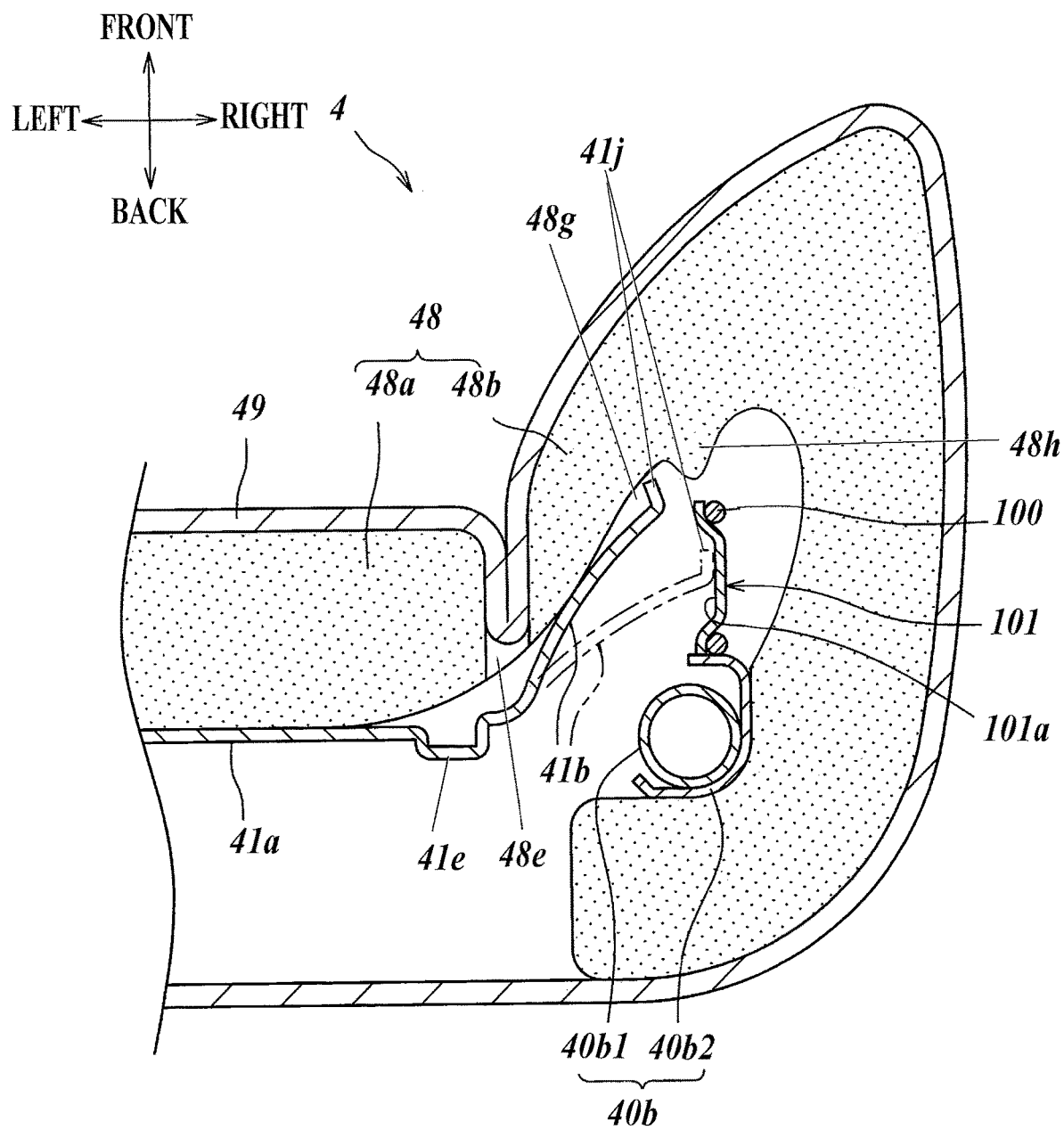
FIG. 44 is an enlarged sectional view of a backrest according to a first modification of the sixth embodiment of the present invention.

FIG. 44 is a cross-sectional view of a backrest 4 according to a first modification of the sixth embodiment. Since the backrest 4 is formed substantially symmetrically, FIG. 44 is an enlarged view of only the right side frame segment 40b and its surroundings.

As shown in FIG. 44, the pressure receiving member 41 primarily includes a main body part 41a and right and left extending parts 41b. In the first modification, each extending part 41b can resiliently bend and deform in the front-back direction along the connecting line between the extending part 41b and the main body part 41a. Each extending part 41b has a front edge bent frontward. The bent front edge has a contact piece 41j.

The backrest 4 includes a deformation controlling means for controlling the extent of deformation of the extending parts 41b. As shown in FIG. 44, the deformation controlling means includes right and left pan frames 101. The right and left pan frames are plates facing each other in the right-left direction. Each pan frame 101 bridges the supporting wire rods 100 of each side frame segment 40b in the front-back direction and fixed to the supporting wire rods 100 by welding. The pan frames 101 are disposed outside the pressure receiving member 41 in the right-left direction. As shown with the chain lines in FIG. 44, each pan frame 101 is disposed such that the front edge of the extending part 41b (contact piece 41j) comes into contact with an inner surface 101a of the pan frame 101 at a predetermined extent of deformation of the extending part 41b. Each pan frame 101 is disposed such that the front edge of the extending part 41b slides on the inner surface 101a while in contact therewith until the front edge of the extending part 41b (contact piece 41j) can no longer move on the inner surface 101a. The pan frames 101 are contact members (stoppers).

Similarly to the sixth embodiment, the main body part 41a and the right and left extending parts 41b can support a wide range of the upper body of the occupant. This configuration can stabilize the support of the upper body of the occupant. The contact between the front edge of each extending part 41b bending backward and the inner surface 101a of the pan frame 101 can prevent excess deformation of the extending part 41b. This can also stabilize the support of the upper body of the occupant.

In the first modification of the sixth embodiment, the plate-like pan frames 101 are used as contact members. This indicates the front edges of the extending parts 41b come into contact with surfaces (the inner surfaces 101a). Such a contact through surfaces can maintain the contact between the front edges and the pan frames 101 and ensure the prevention of excess deformation of the extending parts 41b. This configuration can further stabilize the support of the upper body of the occupant.

In the first modification of the sixth embodiment, the sliding contact between the front edges of the extending parts 41b and the inner surfaces 101a allows deformation of the extending parts 41b until the front edges of the extending parts 41b can no longer move on the inner surfaces 101a. This ensures a necessary extent of deformation for the extending parts 41b.

Figure 45:
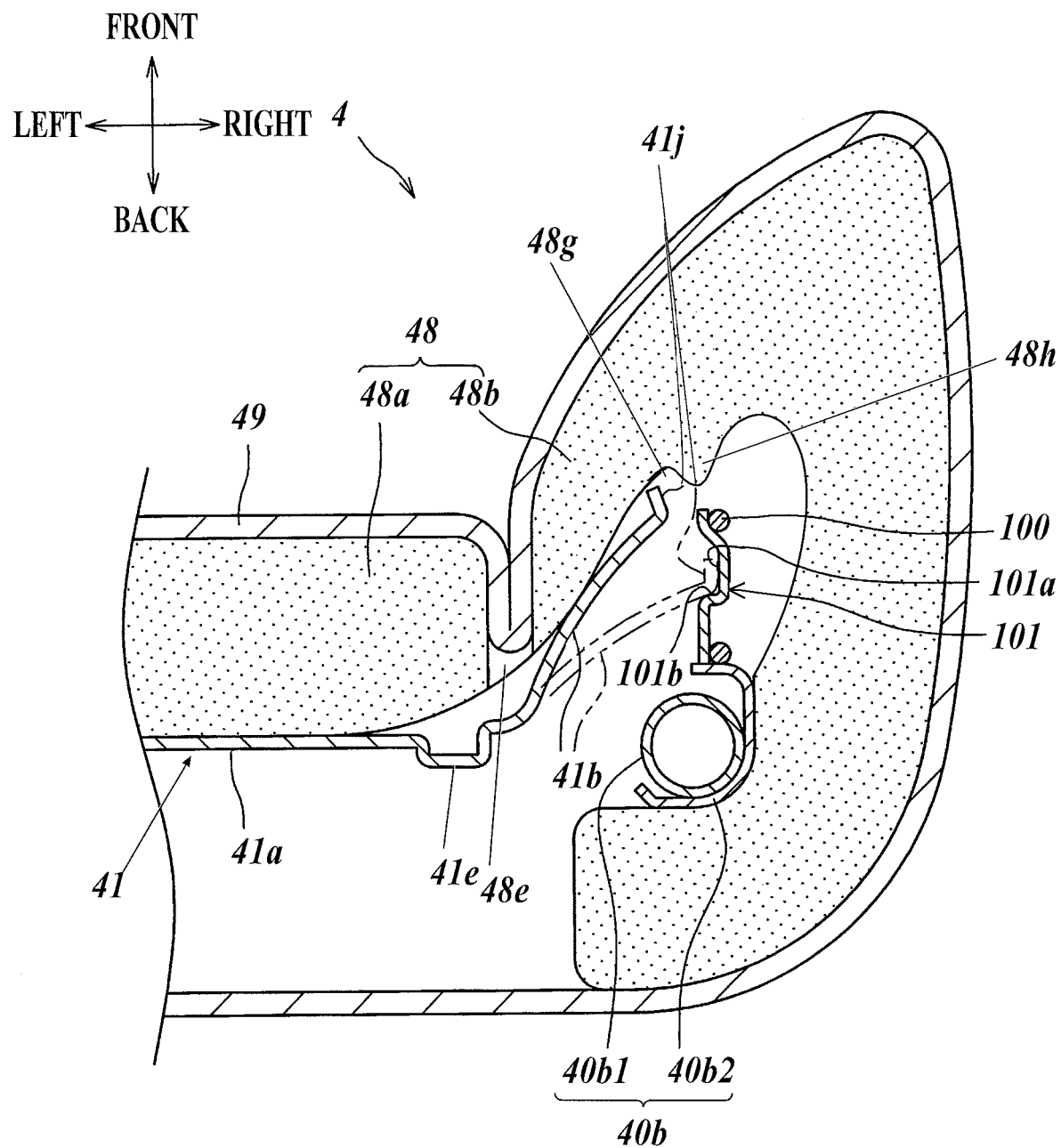
FIG. 45 is an enlarged sectional view of a backrest for describing a change from the backrest shown in FIG. 44.

FIG. 45 illustrates a modification of each pan frame 101. The pan frame 101 may have a controlling portion 101b. The controlling portion 101b is formed into a step. The step is formed by creating a recess on the inner surface 101a of the pan frame 101. The inner surface, facing the front, of the recess is the controlling portion 101b. At the time of a backward bend of the extending parts 41b, the front edge of each extending part 41b (contact piece 41j) that slides backward on the inner surface 101a of the pan frame 101 comes into contact with the controlling portion 101b. The contact between the front edge of each extending part 41b (contact piece 41j) and the controlling portion 101b can prevent excess deformation of the extending part 41b, thus further stabilizing the support of the upper body of the occupant.

[Second Modification of Sixth Embodiment]

Figure 46:
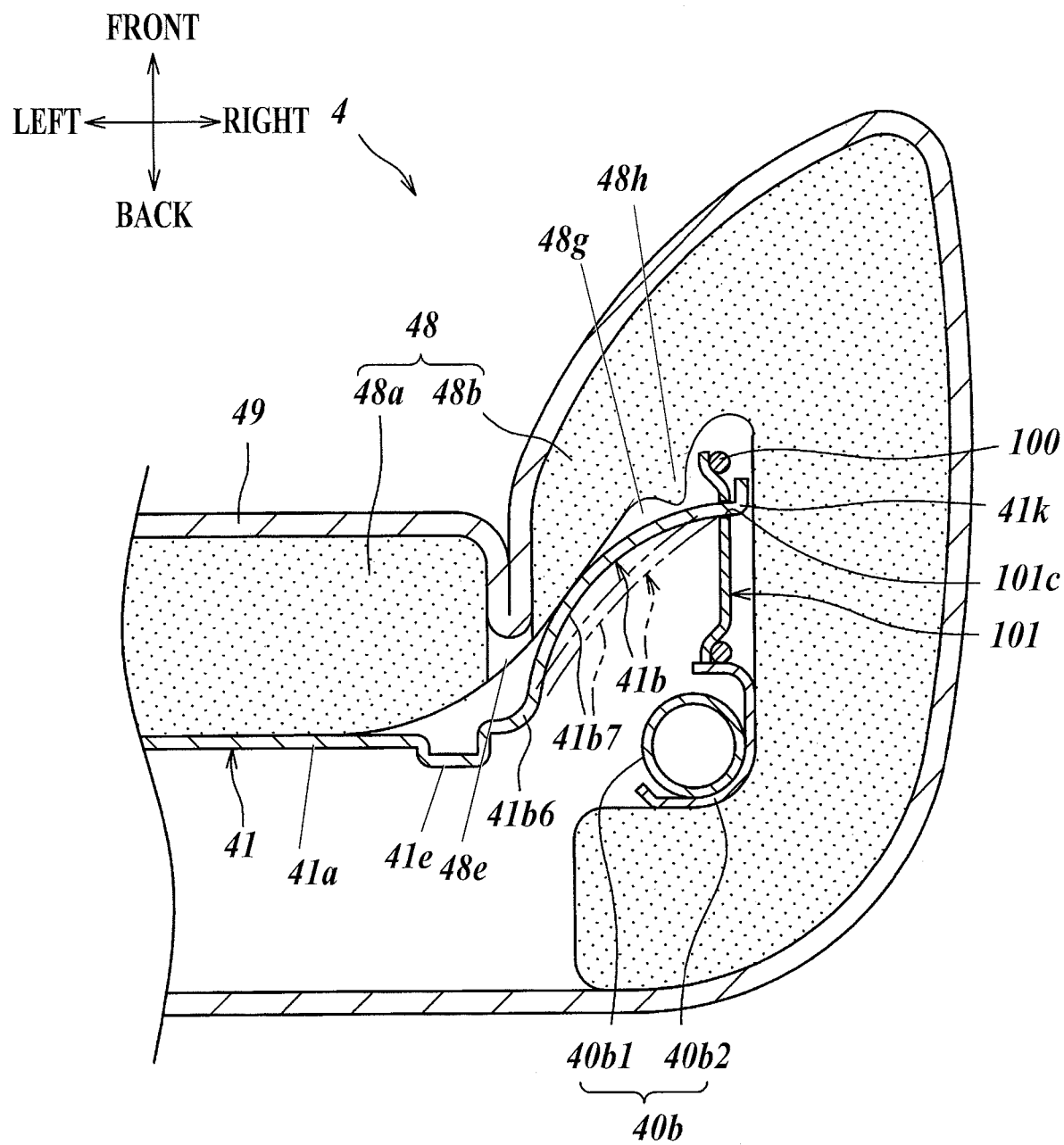
FIG. 46 is an enlarged sectional view of a backrest according to a second modification of the sixth embodiment of the present invention.

FIG. 46 is a cross sectional view of a backrest 4 according to a second modification of the sixth embodiment. Since the backrest 4 is formed substantially symmetrically, FIG. 46 is an enlarged view of only the right side frame segment 40b and its surroundings.

The backrest 4 includes a deformation controlling means for controlling the extent of deformation of the extending parts 41b. As shown in FIG. 46, the deformation controlling means includes right and left pan frames 101. The right and left pan frames 101 are plates facing each other in the right-left direction. Similarly to the first modification, each pan frame 101 bridges the supporting wire rods 100 of each side frame segment 40b in the front-back direction and fixed to the supporting wire rods 100. A through-hole 101c is formed on each pan frame 101 at the front end thereof. The through-hole 101c has the shape of a long slit in the vertical direction.

The pressure receiving member 41 primarily includes a main body part 41a and right and left extending parts 41b. Each extending part 41b is curved into an arc in the horizontal cross sectional view. Each extending part 41b in the first modification is curved with a curvature greater than that of the extending part 41b in the sixth embodiment or its first modification.

Each extending part 41b has a front edge bent frontward. The bent front edge has a locking piece 41k. The front edge of the extending part 41b passes through the through-hole 101c in the pan frame 101 to control the anteroposterior positions of the front edge and a base edge 41b6 of the extending part 41b. This configuration allows a central portion 41b7 of the extending part 41b to resiliently bend substantially in the front-back direction, as shown with the chain lines in FIG. 46.

The controlled anteroposterior positions of the front edges of the extending parts 41b control the extent of deformation. The deformation controlling means is achieved by the front edge of each extending part 41b inserted into the through-hole 101c formed in the pan frame 101.

The second modification having such a configuration can also support a wide range of the upper body of the occupant with the main body part 41a and the extending parts 41b and thus stabilize the support of the upper body of the occupant. The front edge of each extending part 41b inserted into the through-hole 101c in the pan frame 101 can prevent excess deformation of the support. This configuration stabilizes the support of the upper body of the occupant.

In the second modification, the front edge of each extending part 41b inserted into the through-hole 101c prevents the front-back movement of the front edge of the extending part 41b. This configuration can further prevent excess deformation of the extending part 41b and stabilizes the support of the upper body of the occupant.

[Third Modification of Sixth Embodiment]

Figure 47:
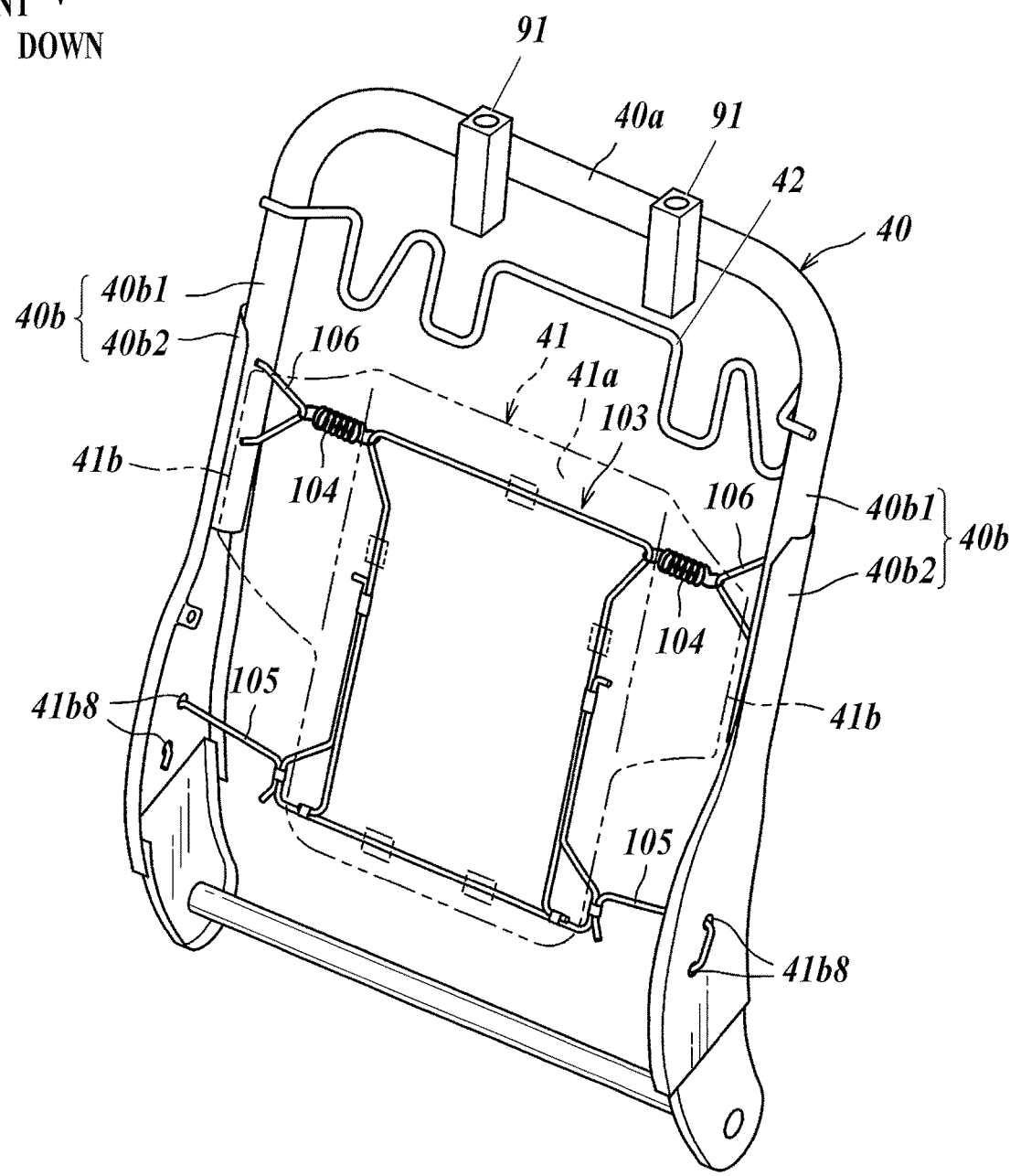
FIG. 47 is a perspective view of a frame of a backrest according to a third modification of the sixth embodiment of the present invention.
Figure 48:
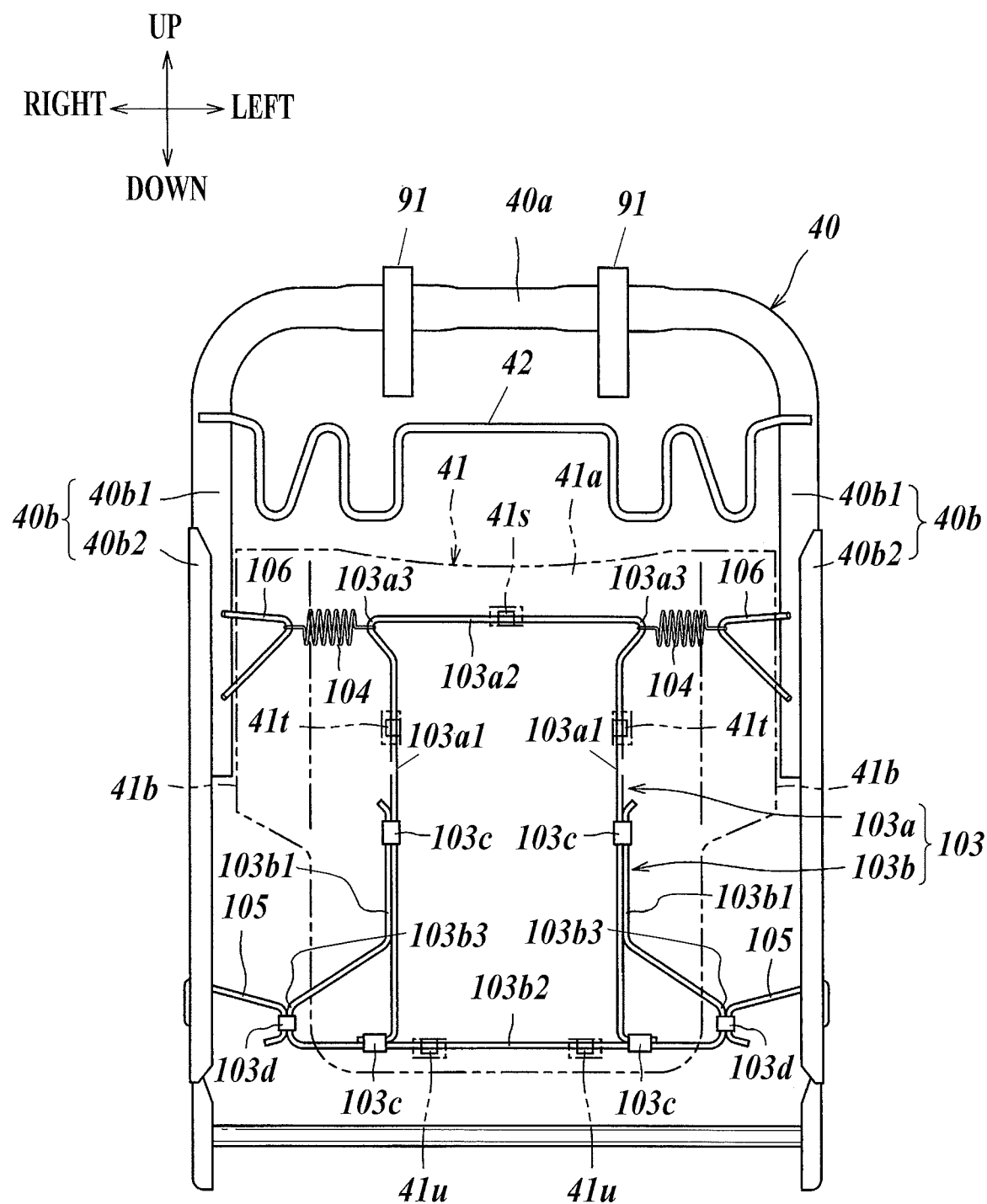
FIG. 48 is a front view of the frame of the backrest according to the third modification of the sixth embodiment of the present invention.
Figure 49:
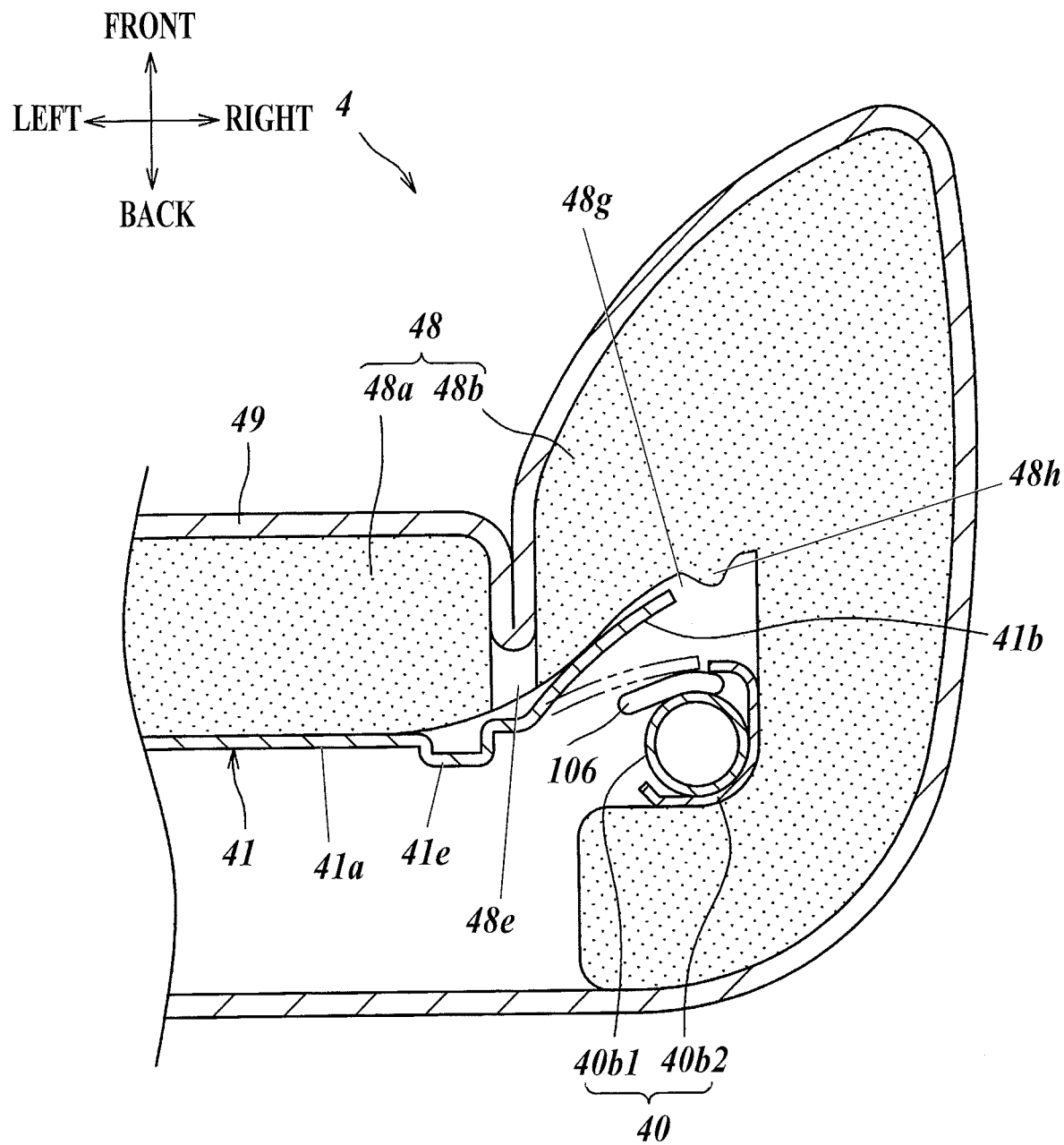
FIG. 49 is an enlarged sectional view of the backrest according to the third modification of the sixth embodiment of the present invention.

FIG. 47 is a perspective view of a backrest frame 40 of a backrest 4 according to a third modification of the sixth embodiment. FIG. 48 is a front view of the backrest frame 40 of the backrest 4 according to the third modification of the sixth embodiment. FIG. 49 is a cross sectional view of the backrest 4 according to the third modification of the sixth embodiment. Since the backrest 4 is formed substantially symmetrically, FIG. 49 is an enlarged view of only the right side frame segment 40b and its surroundings.

In the sixth embodiment, the pressure receiving member 41 is suspended by the upper wire rod 43 and the lower wire rod 44 between the side frame segments 40b. In contrast, the pressure receiving member 41 of the third modification is suspended by a framed wire rod 103, right and left spring wire rods 104, and right and left lower coupling wire rods 105 between the side frame segments 40b. The framed wire rod 103, the right and left spring wire rods 104, and the right and left lower coupling wire rods 105 are disposed inside the backrest 4.

The backrest 4 includes a deformation controlling means for controlling the extent of deformation of the extending parts 41b. The deformation controlling means includes mounting wire rods 106. Each mounting wire rod 106 is formed by bending a metal wire into a substantially V shape. The mounting wire rods 106 are an example of the contact members. Each mounting wire rod 106 has ends fixed to the vertical pipe segment 40b1 near the top end of the main body part 40b2 of each side frame segment by welding.

As shown in FIG. 48, the framed wire rod 103 includes a substantially U-shaped upper wire rod 103a and a lower wire rod 103b swaged with metal sleeves 103c. The framed wire rod 103 is disposed on the rear of the pressure receiving member 41 within the backrest frame 40 (between the left and right side frame segments 40b).

The upper wire rod 103a includes right and left vertical wire segments 103a1, a horizontal wire segment 103a2 and wire connectors 103a3. The vertical wire segments 103a1 extend vertically. The horizontal wire segment 103a2 extends in the right-left direction to couple the top ends of the right and left vertical wire segments 103a1. The wire connectors 103a3 are disposed at the right and left corners at which the vertical wire segments 103a1 and the horizontal wire segment 103a2 are coupled. The wire connectors 103a3 are bent outward in the right-left direction.

Similarly to the upper wire rod 103a, the lower wire rod 103b also includes right and left vertical wire segments 103b1, a horizontal wire segment 103b2, and wire connectors 103b3. The vertical wire segments 103b1 extend vertically. The horizontal wire segment 103b2 extends in the right-left direction to couple the bottom ends of the right and left vertical wire segments 103b1. The wire connectors 103b3 are formed at the right and left corners at which the vertical wire segments 103b1 and the horizontal wire segment 103b2 are coupled. The wire connectors 103b3 are bent outward in the right-left direction.

The pressure receiving member 41 primarily includes a main body part 41a and right and left extending parts 41b. Each extending part 41b can resiliently bend and deform in the front-back direction along the connecting line between the extending part 41b and the main body part 41a. The main body part 41a includes engaging claws 41s, 41t, and 41u for fixing the pressure receiving member 41 to the framed wire rod 103. The engaging claws 41s, 41t and 41u are integrated with the main body part 41a. The engaging claws 41s to 41u each have a substantially U-shape in cross-sectional view. More specifically, each engaging claw extends backward from the rear surface of the main body part 41a, bends, extends along the rear surface of the main body part 41a, and bends frontward. When the engaging claw 41s to 41u are engaged with the framed wire rod 103, the framed wire rod 103 is kept by the engaging claws 41s to 41u between the rear surface of the main body part 41a and the engaging claws 41s to 41u. The single engaging claw 41s is provided near the top end of the main body part 41a at the horizontal center. The engaging claw 41s is engaged with the horizontal wire segment 103a2 of the upper wire rod 103a. The two engaging claws 41t are formed in the upper portion of the main body part 41a side by side in the right-left direction. The engaging claws 41t are engaged with the vertical wire segments 103a1 of the upper wire rod 103a. The two engaging claws 41u are formed near the bottom end of the main body part 41a side by side in the right-left direction. The engaging claws 41u are engaged with the horizontal wire segment 103b2 of the lower wire rod 103b.

The spring wire rods 104 are resilient coupling members having a spring property. The spring wire rods 104 are each formed by winding a metal wire rod spirally. Each spring wire rod 104 has the horizontally inner end coupled to the corresponding wire connector 103a3 of the upper wire rod 103a. Each spring wire rod 104 has the horizontally outer end coupled to the corresponding mounting wire rod 106. The spring wire rods 104 thereby couple the upper portion of the pressure receiving member 41 to the left and right side frame segments 40b.

Each lower coupling wire rod 105 has the horizontally inner end coupled to the corresponding wire connector 103b3 of the lower wire rod 103b by swaging with the metal sleeve 103d. The lower coupling wire rod 105 has the horizontally outer end latched with mounting holes 41b8 formed in the lower part of the main body part 40b2 of the side frame segment (See FIG. 47). The lower coupling wire rods 105 thereby couple the lower portion of the pressure receiving member 41 to the left and right side frame segments 40b.

In front view, the framed wire rod 103 is disposed inside of the extending parts 41b in the right-left direction within the vertical range of the extending parts 41b, that is, on the rear of the main body part 41a. The engaging claw 41s, which couples the pressure receiving member 41 to the horizontal wire segment 103a2 (horizontally extending portion of the framed wire rod 103), and the engaging claws 41t, which couple the pressure receiving member 41 to the vertical wire segments 103a1 (vertically extending parts of the framed wire rod 103) are both within the vertical range of the extending parts 41b.

The third modification having such a configuration can also support a wide range of the upper body of the occupant with the main body part 41a and the extending parts 41b and thus stabilizes the support of the upper body of the occupant. As shown in FIG. 49, at a predetermined amount of bending of the extending parts 41b, the front edges of the extending parts 41b come into contact with the mounting wire rods 106. This contact allows the mounting wire rods 106 to control the extent of deformation of the extending parts 41b. This configuration can preclude excess deformation of the extending parts 41b and thus stabilizes the support of the upper body of the occupant.

In the third modification, the framed wire rod 103 is disposed on the rear of the main body part 41a within the vertical range of the extending parts 41b. Thus, the framed wire rod 103 can stabilize the support of the main body part 41a and can further stabilize the support of the upper body of the occupant.

In the third modification, the engaging claw 41s, which is engaged with the horizontal wire segment 103a2, and the engaging claws 41t, which are engaged with the vertical wire segments 103a1, are within the vertical range of the extending parts 41*b*. This configuration can enhance the mounting rigidity of the pressure receiving member 41 to the framed wire rod 103 at the height of the extending parts 41*b*. The enhanced mounting rigidity stabilizes the posture of the extending parts 41*b* and further stabilizes the support of the upper body of the occupant.

At rear-end collision by another vehicle, the upper body of an occupant is pressed against the cushion pad 48 to significantly deform the near-center portion of the cushion pad 48. If the impulsive force is so large that a backward load exceeding a predetermined value is applied to the pressure receiving member 41 by the upper body of the occupant via the cushion pad 48, the spring wire rods 104 elongate or the lower coupling wire rods 105 bends. The pressure receiving member 41 then moves backward relative to the left and right side frame segments 40*b* and the upper body of the occupant deeply sinks into the backrest 4. As a result, the head of the occupant rapidly approaches the headrest 6 and is supported thereby, thus protecting the head and the neck region of the occupant from the impact of the collision of the rear surface of the vehicle.

In this embodiment, a large backward load applied to the pressure receiving member 41 causes the spring wire rods 104, having a spring property (resilience), to elongate and deform more significantly than the lower coupling wire rods 105. This causes the upper portion of the pressure receiving member 41 to retreat more significantly than the lower portion of the pressure receiving member 41. This configuration allows the breast portion, i.e., the upper portion of the upper body of the occupant, to sink more rapidly and deeply than the waist portion, i.e., the lower portion of the upper body of the occupant relative to the backrest 4. As a result, the head of the occupant, which is close to the breast of the occupant, rapidly approaches the headrest 6 and is supported thereby, thus protecting the head and the neck region of the occupant more effectively.

[Fourth Modification of Sixth Embodiment]

In the sixth embodiment, the extending parts 41*b* are formed only at positions corresponding to the breast height of the occupant, but the present invention should not be limited to this configuration. For example, the extending parts 41*b* may be formed only at positions corresponding to the waist height of the occupant. Extending parts other than the extending parts 41*b* formed at the breast-height positions of the occupant may be formed at the waist-height positions of the occupant. If both the breast-height extending parts and the waist-height extending parts are provided, they may be formed independently or coupled with each other.

[Modification 5 of Sixth Embodiment]

In this embodiment, the coupling portions (claws 41*c*) between the pressure receiving member 41 and the upper wire rod 43 are within the vertical range of the extending parts 41*b*, but the present invention should not be limited to this configuration. For example, with reference to FIG. 42, the claws 41*c* may be disposed outside the vertical range of the extending parts 41*b*. This is also applied to the engaging claws 41*s* and 41*t* according to the third modification. The coupling between the pressure receiving member 41 and the wire rod should not be limited to the use of the claws. For example, pairs of through-holes are disposed in a row in the right-left direction or in the up-down direction on the pressure receiving member 41 and the wire rod is fixed with ties extending through the through-holes.

[Sixth Modification of Sixth Embodiment]

In the first modification, the pan frames 101 are an example of the counter plates, but the present invention should not be limited to this configuration. For example, the counter plates may be the main body parts 40*b*2 of the side frame segments. In the sixth embodiment or the first and second modifications thereof, the supporting wire rods 100 and the pan frames 101 are exemplary contact members, but the present invention should not be limited to this configuration. The contact members may be, for example, the side frame segments 40*b*, which constitute right and left frames of the backrest 4.

[Seventh Modification of Sixth Embodiment]

In the third modification, the framed wire rod 103 is composed of two wire rods (upper wire rod 103*a* and lower wire rod 103*b*), but the present invention is not limited to this configuration. The framed wire rod 103 may be composed of, for example, a single wire.

[Additional Statement on Sixth Embodiment]

As is evident from the above description of the sixth embodiment and its modifications, the description of the sixth embodiment and its modifications include various disclosures on technical ideas in addition to the aspect of the invention described in the following notes.

Note 1.

A vehicle seat including a bottom seat and a backrest, wherein the backrest includes a plate-like pressure receiving member that supports load from an occupant, wherein the pressure receiving member includes a main body part and extending parts, the main body part facing a rear surface of an upper body of the occupant and the extending parts extending from right and left edges of the main body part outward in the right-left direction and being resiliently deformable in the front-back direction, and wherein the backrest has deformation controlling means for controlling an extent of deformation of the extending parts.

Note 2.

The vehicle seat according to note 1, wherein the deformation controlling means is a contact member with which a front edge of each extending part comes into contact at a predetermined amount of deformation of the extending part.

Note 3.

The vehicle seat according to note 2, wherein the backrest includes right and left side frame segments constituting right and left frames of the backrest, each of the side frame segments having a wire member attached to the side frame segment, and wherein each contact member is the wire member.

Note 4.

The vehicle seat according to note 3, wherein a front edge of each extending part is bent backward to form an engaging portion, the engaging portion being caught by the wire member at the time of contact of the front edge with the wire member.

Note 5.

The vehicle seat according to note 2, wherein the backrest includes right and left counter plates facing each other in the right-left direction and disposed outside the pressure receiving member in the right-left direction, and wherein the contact members are the counter plates.

Note 6.

The vehicle seat according to note 5, wherein each counter plate is disposed such that the front edge of the extending part slides on the counter plate and wherein each counter plate includes a controlling portion with which the front edge of the extending part sliding backward comes into contact.

Note 7.

The vehicle seat according to note 1, wherein
the backrest includes right and left counter plates facing each other in the right-left direction,
each extending part is curved into an arch in a horizontal cross sectional view,
the deformation controlling means is formed in each counter plate and is a hole into which the front edge of the extending part is inserted.

Note 8.

The vehicle seat according to one of notes 1 to 7, wherein the backrest includes a backrest frame constituting part of the backrest and a coupling wire put across the backrest frame and coupling the pressure receiving member to the backrest frame, and
wherein a coupling portion between the pressure receiving member and the coupling wire is within a vertical range of the extending parts.

Note 9.

The vehicle seat according to one of notes 1 to 6, wherein the backrest includes a backrest frame constituting part of the backrest and a coupling wire put across the backrest frame and coupling the pressure receiving member to the backrest frame, and
wherein the front edges of the extending parts do not overlap with the coupling wire in front view.

(a) Advantageous Effects of Present Invention Described in Note 1

The central main body part and the right and left extending parts support a wide range of the upper body of the occupant and thus stabilize the support of the upper body of the occupant. The deformation controlling means can control the extent of deformation of the extending parts. This configuration can prevent excess deformation of the extending parts during a normal seating, thereby stabilizing the support of the upper body of the occupant.

(b) Advantageous Effects of Present Invention Described in Note 2

The contact between the front edges of the extending parts and the contact members can prevent excess deformation of the extending parts to stabilize the support of the upper body of the occupant, while allowing the deformation of the extending parts until the front edges of the extending parts come into contact with the contact members. Such a configuration ensures a necessary extent of deformation for the extending parts.

(c) Advantageous Effects of Present Invention Described in Note 3

Unlike a configuration in which the portions that come into contact with the front edges of the extending parts are provided on the side frame segments themselves to use them as contact members, the present invention described in Note 3 eliminates the necessity for forming a contact portion on each side frame segment. This helps prevent the increase in size of the side frame segments and improves the versatility of the side frame segments.

(d) Advantageous Effects of Present Invention Described in Note 4

The engaging portions engaged with the wire members can control the positions of the front edges of the extending parts more strictly. Such a strict control can effectively prevent excess deformation of the extending parts and further stabilize the support of the upper body of the occupant.

(e) Advantageous Effects of Present Invention Described in Note 5

The front edges of the extending parts come into contact with surfaces. Such a contact through surfaces can maintain the contact between the front edges and the counter plates and ensure the prevention of excess deformation of the extending parts. This configuration can further stabilize the support of the upper body of the occupant.

(f) Advantageous Effects of Present Invention Described in Note 6

The sliding contact between the front edges of the extending parts and the counter plates allows deformation of the extending parts until the front edges of the extending parts come into contact with controlling portions, thus ensuring a necessary extent of deformation for the extending parts. The present invention described in Note 6 can prevent excess deformation of the extending parts after the contact between the front edges of the extending parts and the controlling portions. Such a configuration can further stabilize the support of the upper body of the occupant.

(g) Advantageous Effects of Present Invention Described in Note 7

The front edges of the extending parts inserted into the through-holes formed in the counter plates prevent the movement of the front edges of the extending parts and thus excess deformation of the extending parts is prevented. This configuration can stabilize the support of the upper body of the occupant.

(h) Advantageous Effects of Present Invention Described in Note 8

The pressure receiving member is coupled to the backrest frame at the height of the extending parts via the coupling wire rod. This configuration stabilizes the posture of the extending parts and thus can prevent excess deformation of the extending parts with the deformation controlling means, thereby stabilizing the support of the upper body of the occupant.

(i) Advantageous Effects of Present Invention Described in Note 9

The interference does not occur between the front edges of the extending parts and the coupling wire rods even at a front-back movement of the front edges due to deformation of the extending parts.

Seventh Embodiment

Figure 50:
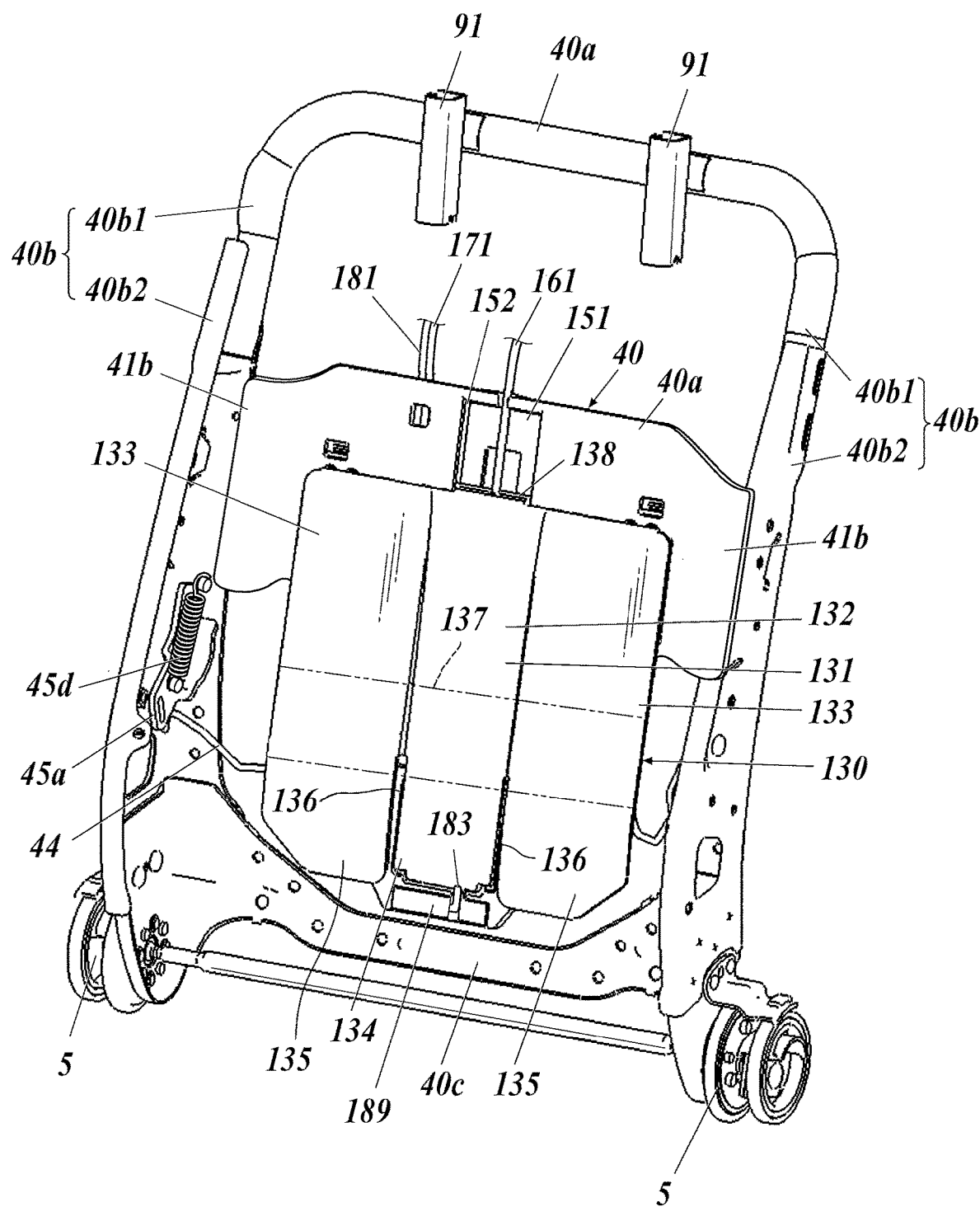
FIG. 50 is a front perspective view of a frame of a backrest according to a seventh embodiment of the present invention.

FIG. 50 is a perspective view of a backrest frame 40 of a seat backrest of the seventh embodiment of the present invention. The same parts between a seat according to the seventh embodiment and the seat 1 according to the first embodiment are given the same reference numerals. If the same parts are provided in the same manner, the explanation thereof will be omitted if possible. The following description focuses on differences between the seat according to the seventh embodiment and the seat 1 according to the first embodiment.

Differences between the seat according to the seventh embodiment and the seat 1 according to the first embodiment lie in the backrest 4. More specifically, the seat according to the seventh embodiment includes a lumbar support plate 130 in front of the main body part 41a of the pressure receiving member 41. In contrast, the seat 1 according to the first embodiment does not include a member equivalent to the lumbar support plate 130 in front of the pressure receiving member 41. The backrest of the seat according to the seventh embodiment is provided in the same manner as that of the seat according to the first embodiment, except for the lumbar support plate 130, which is provided in front of the pressure receiving member 41.

The seat according to the seventh embodiment includes slide rails, a bottom seat, a bottom seat, a recliner mechanism and a headrest, which are provided in the same manner as the slide rails 2, the bottom seat 3, the recliner mechanism 5 and the headrest 6 of the seat 1 according to the first embodiment.

The lumbar support plate 130 and relevant items will now be described.

The lumbar support plate 130 is resiliently bent. The lumbar support plate 130 is disposed in front of the main body part 41*a* such that it faces and is overlaid on the main body part 41*a*. The lumbar support plate 130 is attached to the main body part 41*a* such that the top end and the bottom end of the lumbar support plate 130 are vertically movable relative to the main body part 41*a*. At an upward movement of the bottom end of the lumbar support plate 130 relative to the pressure receiving member 41 without any movement of the top end of the lumbar support plate 130, the lumbar support plate 130 is curved such that it protrudes forward. At a downward movement of the bottom end of the lumbar support plate 130 relative to the pressure receiving member 41 without any movement of the top end of the lumbar support plate 130, the curved lumbar support plate 130 is vertically elongated to less protrude forward. At a concurrent vertical movement of the top end and the bottom end of the lumbar support plate 130, the lumbar support plate 130 moves vertically relative to the pressure receiving member 41 while retaining the extent of the curve (curvature).

Figure 51:
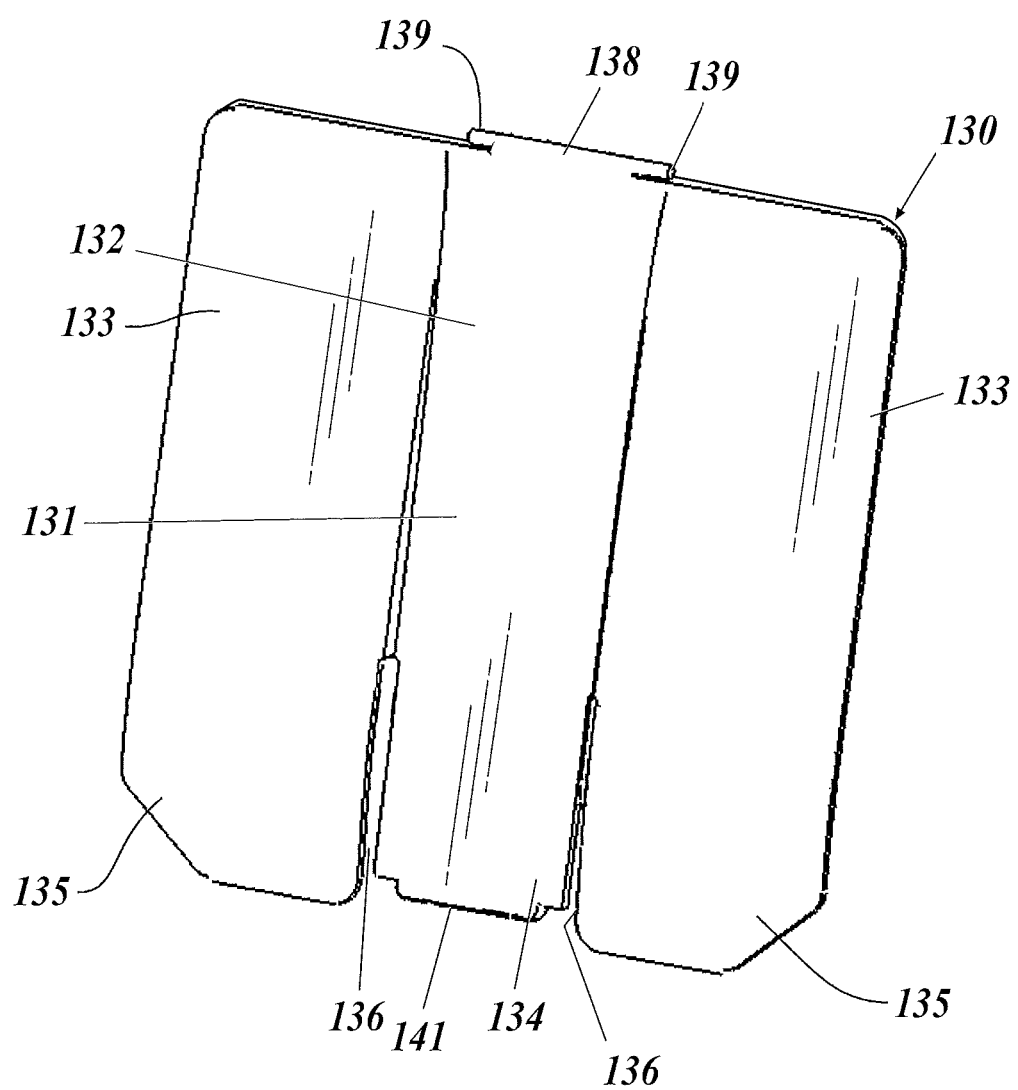
FIG. 51 is a front perspective view of a lumbar support plate of the backrest according to the seventh embodiment of the present invention.
Figure 52:
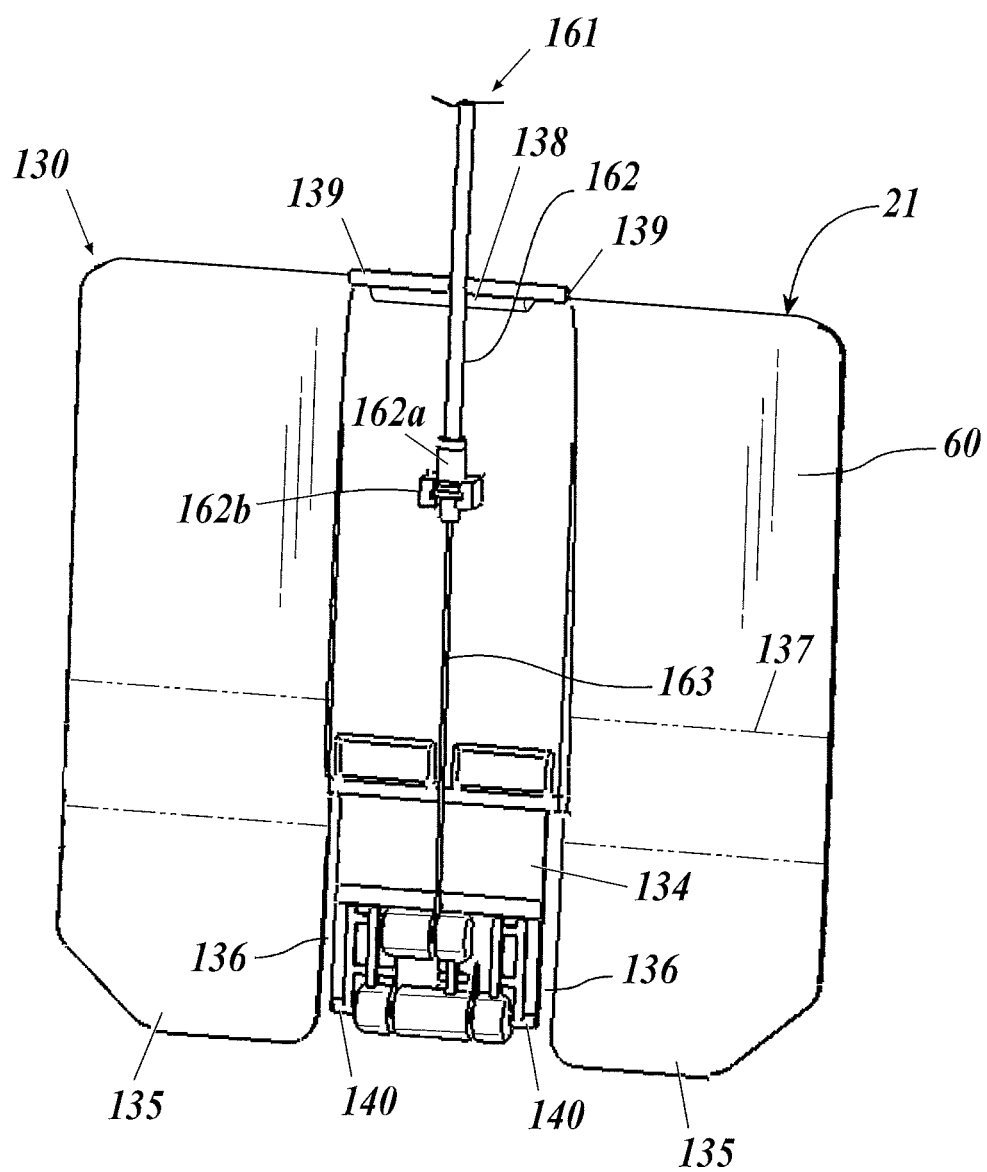
FIG. 52 is a rear perspective view of the lumbar support plate of the backrest according to the seventh embodiment of the present invention.

With reference to FIGS. 50 to 52, the lumbar support plate 130 will now be described in detail. FIG. 51 is a front perspective view of the lumbar support plate 130. FIG. 52 is a rear perspective view of the lumbar support plate 130.

The front surface of the lumbar support plate 130 is provided with a recess 131 at the horizontal center. The recess 131 is formed into a stripe in front view. The stripe extends vertically. The front surface of the lumbar support plate 130 includes a central part 132 and side parts 133. The central part 132 is formed into the recess 131. The side parts 133 are the right and left sides of the recess 131. A step is formed between the central part 132 and each side 133. The central part 132 is recessed backward by the one step relative to the side parts 133.

A movable member 134 is provided in the lower central portion (in the right-left direction) of the lumbar support plate 130. Support members 135 are provided on the right and left sides of the movable member 134. More specifically, two right and left notches 136 are formed from the bottom end of the lumbar support plate 130 along the right and left edges of the recess 131. The lower portion of the lumbar support plate 130 is divided into the movable member 134 and the support members 135 by these notches 136.

The portion between the notches 136 is the movable member 134. The right and left sides of the movable member 134 are the support members 135. Each notch 136 extends from the bottom end of the lumbar support plate 130 to a point slightly below the vertical center of the lumbar support plate 130. The upper end of each notch 136 is slightly below the vertical center of the lumbar support plate 130. An area on the lumbar support plate 130 between the part slightly above the upper ends of the notches 136 and the part slightly below the upper ends of the notches 136 is a pressure area 137. As shown with the two-dot chain lines in FIG. 50, the strip area extending in the right-left direction is the pressure area 137.

The support member 135 is curved so as to protrude diagonally downward to the front in side view.

Figure 53:
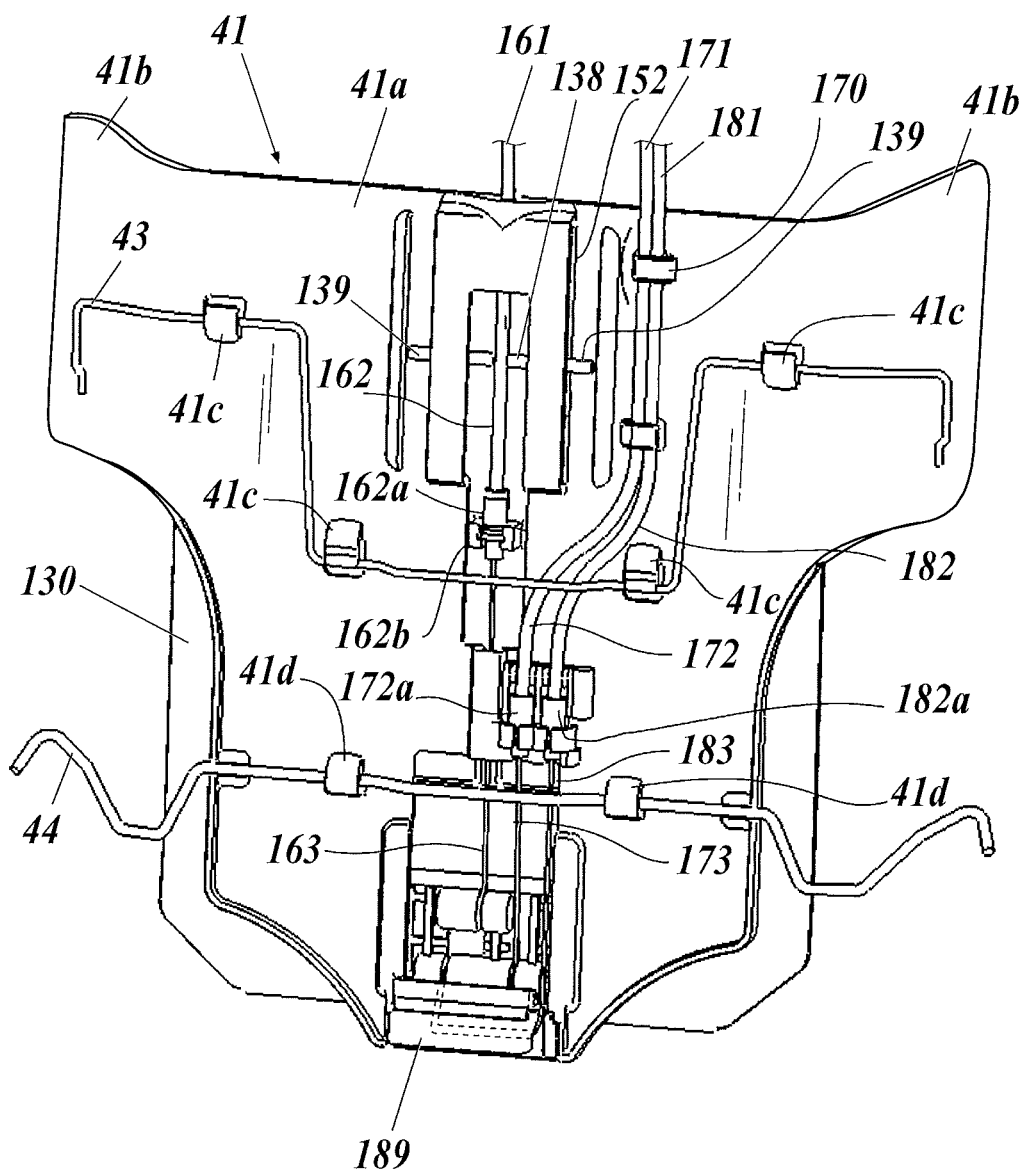
FIG. 53 is a rear perspective view of an assembly of the lumbar support plate of the backrest according to the seventh embodiment assembled and a pressure receiving member.
Figure 54:
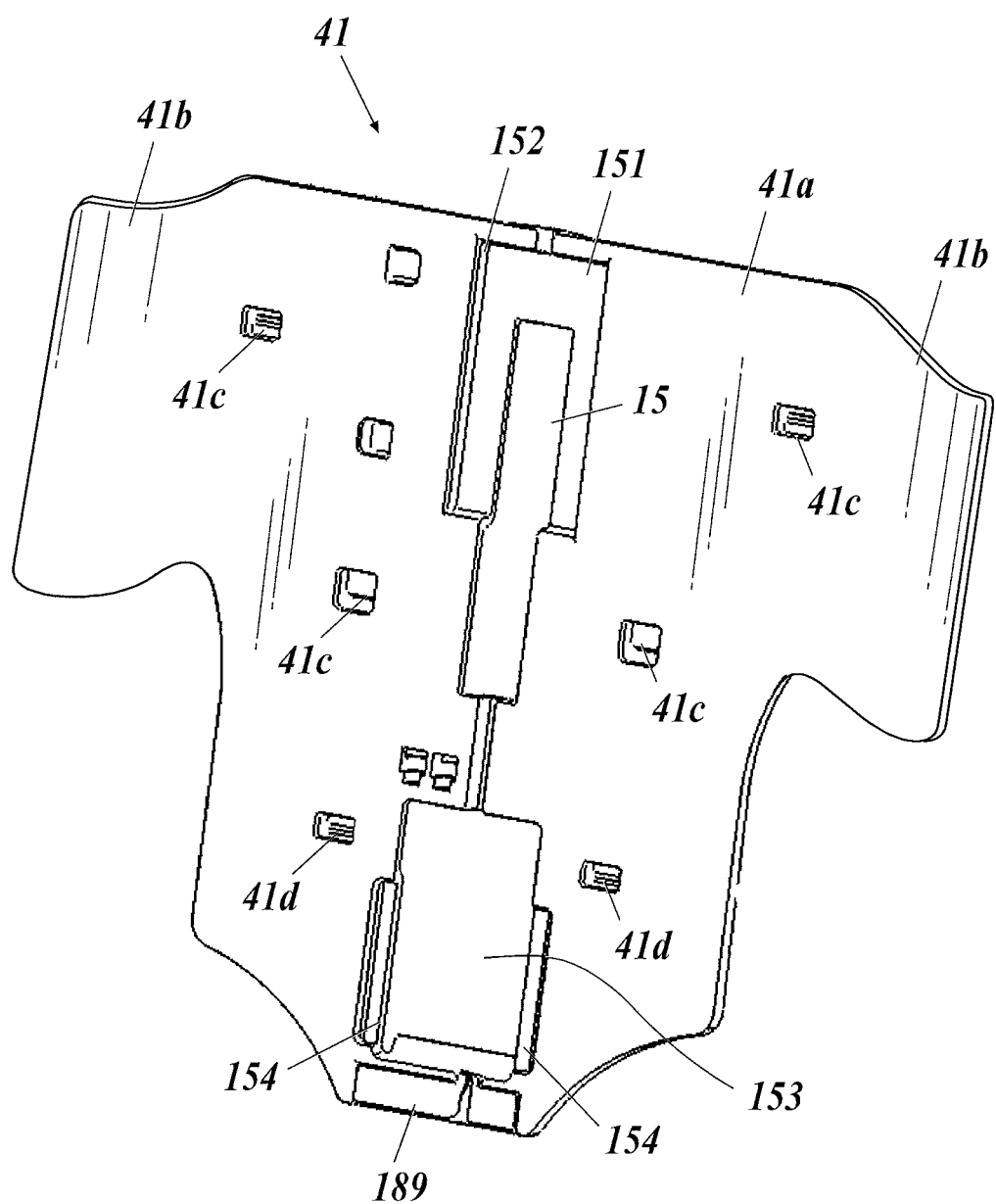
FIG. 54 is a front perspective view of a pressure receiving member of the backrest according to the seventh embodiment of the present invention.

With reference to FIGS. 50 to 54, how the lumbar support plate 130 and the pressure receiving member 41 are assembled will now be described. FIG. 53 is a rear perspective view of an assembly of the lumbar support plate 130 and the pressure receiving member 41. FIG. 54 is a front perspective view of the pressure receiving member 41.

As shown in FIG. 54, a recess 151 is formed in the upper portion of the front surface of the main body part 41*a* of the pressure receiving member 41. The recess 151 has a vertically long rectangular shape (strip) in front view. Slits 152 are formed on the right and left sides of the recess 151. As shown in FIGS. 53 and 54, the right and left slits 152, formed on the sides of the recess 151, penetrate to the rear. The slits 152 extend vertically.

As shown in FIG. 51, a slider 138 is provided at the top end of the rear surface of the lumbar support plate 130. The slider 138 is convex. The slider 138 is provided at the center (in the right-left direction) of the lumbar support plate 130. A sliding bar 139 is provided on each of the right and left sides of the slider 138. The left sliding bar 139 extends leftward from the left surface of the slider 138. The right sliding bar 139 extends rightward from the right surface of the slider 138.

As shown in FIG. 50, the slider 138 is fit to the recess 151 to cause the right and left sides of the recess 151 to constrain the right-left movement of the slider 138. The sliding bars 139 fit to the slits 152 to cause the slits 152 to constrain the anteroposterior movement of the sliding bars 139. This configuration allows the slider 138 and the sliding bar 139 to move vertically. Thus, the lumbar support plate 130 is mounted on the main body part 41*a* such that the top end of the lumbar support plate 130 is movable vertically relative to the main body part 41*a*.

As shown in FIG. 54, the main body part 41*a* of the pressure receiving member 41 has a guide hole 153 in its lower part. The guide hole 153 has a vertically long rectangular shape. Receiving recesses 154 are formed on the front surface of the main body part 41*a* at the right and left edges of the guide hole 153. The receiving recesses 154 extend vertically along the right and left edges of the guide hole 153.

As shown in FIG. 52, sliders 140 are disposed in the area from the lower end of the rear surface of the lumbar support plate 130 to the bottom end surface of the lumbar support plate 130. More specifically, the sliders 140 are disposed in the area from the right and left sides of the lower end of the rear surface of the movable member 134 to the bottom end surface of the movable member 134. The area from the rear to bottom surface of each slider 140 has a cylinder face around the horizontal central axis. As shown in FIG. 51, a convex slider 141 is provided on the bottom end surface of the lumbar support plate 130, more specifically, on the bottom end surface of the movable member 134.

As shown in FIG. 50, each slider 140 fits in the receiving recess 154 and comes into contact with the bottom of the receiving recess 154 to cause the receiving recess 154 to constrain the right-left movement and backward movement of the slider 140. When the movable member 134 is erected relative to the front surface of the lumbar support plate 130, the slider 141 is fit to the guide hole 143 to cause the guide hole 153 to constrain the horizontal movement of the slider 141. This configuration allows the sliders 141 and 140 to be move vertically. Thus, the lumbar support plate 130 is attached to the main body part 41*a* such that the bottom end of the lumbar support plate 130 (more specifically, the bottom end of the movable member 134) can move vertically. Inner wire rods 173 and 183, which are described in detail later, prevent the bottom end of the movable member 134 from being away from the front surface of the pressure receiving member 41 frontward.

As shown in FIGS. 50, 52, and 53, the lumbar support plate 130 is bent by a control cable 161. The control cable 161 includes an outer tube 162 and an inner wire rod 163.

As shown in FIGS. 52 and 53, the outer tube 162 is routed from the top end of the lumbar support plate 130 through the rear surface of the lumbar support plate 130. The outer tube 162 has an end 162a directed downward. The end 162a is fixed to the rear surface of the lumbar support plate 130 above the movable member 134 by an engagement piece 162b.

The inner wire rod 163 extends through the outer tube 162. The inner wire rod 163 is drawn downward from the end 162a of the outer tube 162. The inner wire rod 163 has one end coupled to the rear surface of the movable member 134. The coupling portion between the inner wire rod 163 and the movable member 134 is below the end 162a of the outer tube 162. The coupling portion between the inner wire rod 163 and the movable member 134 is preferably in the lower portion of the movable member 134 below the upper ends of the notches 136.

The engagement piece 162b protrudes from the rear surface of the lumbar support plate 130. The recess 151 of the pressure receiving member 41 has an opening 155. The engagement piece 162b is inserted into the opening 155 and can move vertically along the opening 155. This configuration prevents the interference between the engagement piece 162b and the pressure receiving member 41.

The inner wire rod 163 has the other end drawn from the other end of the outer tube 162. The drawn portion is wound around, for example, a winding mechanism (or an operating part for bending). The inner wire rod 163 can be wound around the winding mechanism or unwound from the winding mechanism. The winding mechanism is, for example, disposed on a side of the backrest 4 or a side of the bottom seat 3.

As shown in FIGS. 50 and 53, the lumbar support plate 130 is lifted up by a control cable 171 and lowered by a control cable 181. The control cable 171 includes an outer tube 172 and an inner wire rod 173. The control cable 181 includes an outer tube 182 and an inner wire rod 183.

As shown in FIG. 53, the outer tubes 172 and 182 are routed from the top end of the pressure receiving member 41 through the rear surface of the pressure receiving member 41. The outer tubes 172 and 182 are fixed to the rear surface of the pressure receiving member 41 by an engagement piece 170 formed on the rear surface of the pressure receiving member 41. The outer tubes 172 and 182 have ends 172a and 182a directed downward and fixed to the rear surface of the lumbar support plate 130 above the guide hole 153 by engagement pieces 172b and 182b, respectively.

The inner wire rod 173 extends through the outer tube 172. The inner wire rod 173 is drawn from the end 172a of the outer tube 172. The inner wire rod 173 has one end coupled to the bottom end of the movable member 134, more specifically, to the bottom end of the rear surface of the movable member 134.

The coupling portion between the inner wire rod 173 and the movable member 134 is below the end 172a of the outer tube 172.

The inner wire rod 183 extends through the outer tube 182. The inner wire rod 183 is drawn from the end 182a of the outer tube 182 and is hooked by a wire hook 189 provided on the bottom end of the pressure receiving member 41 and folded back toward the front surface of the pressure receiving member 41 at the wire hook 189. The inner wire rod 183 extends upward from the wire hook 189 and has the tip coupled to the bottom end of the movable member 134. More specifically, as shown in FIG. 50, one end of the inner wire rod 183 is coupled to the bottom end of the front surface of the movable member 134.

The coupling portion between the inner wire rod 183 and the movable member 134 is above the wire hook 189.

The inner wire rods 173 and 183 have other ends drawn from the other ends of the outer tubes 172 and 182, respectively. The drawn portions are wound around, for example, by a winding mechanism (or an operating part for up-down movement). The inner wire rod 173 can be wound around the winding mechanism while the inner wire rod 183 can be unwound from the winding mechanism. Conversely, the inner wire rod 173 can be unwound from the winding mechanism while the inner wire rod 183 can be wound around the winding mechanism. The winding mechanism is disposed, for example, on a side of the backrest 4 or a side of the bottom seat 3.

The operation and use of the seat according to the seventh embodiment will now be described.

The inner wire rod 163 wound around the winding mechanism causes the inner wire rod 163 drawn from the end 162a of the outer tube 162 to be drawn back into the outer tube 162 to move the tip of the inner wire rod 163 closer to the end 162a of the outer tube 162. This, in turn, causes the bottom end of the movable member 134 to be pulled up by the inner wire rod 163 and move up along the front surface of the main body part 41a of the pressure receiving member 41. As the bottom end of the movable member 134 moves up, the movable member 134 gets erected relative to the front surface of the main body part 41a. This causes the lumbar support plate 130 to be resiliently curved into a mountain shape. As the curvature of the lumbar support plate 130 increases, the pressure area 137 travels frontward more away from the front surface of the pressure receiving member 41. The pressure area 137 of the lumbar support plate 130 presses a back receiving part 48a of the cushion pad 48 forward.

The inner wire rod 163 unwound from the winding mechanism loosens the inner wire rod 163. Force to restore the lumbar support plate 130 to an original shape is applied to the lumbar support plate 130 to reduce the height of mountain of the lumbar support plate 130. As the curvature of the lumbar support plate 130 decreases, the movable member 134 is more inclined toward the front surface of the main body part 41a, and the bottom end of the movable member 134 moves downward along the main body part 41a of the pressure receiving member 41. The inner wire rod 163 is drawn from the end 162a of the outer tube 162. The pressure area 137 approaches the front surface of the pressure receiving member 41 and the back receiving part 48a of the cushion pad 48 retreats backward.

As described above, the curvature of the lumbar support plate 130 can be adjusted by adjusting the position of the bottom end of the movable member 134 with the control cable 161. A curvature that best suits the shapes of the back and waist of the occupant can be found through the adjustment. Locking the winding mechanism prevents winding or unwinding of the inner wire rod 163, thus retaining the curvature of the lumbar support plate 130.

The inner wire rod 173 is wound around the winding mechanism while the inner wire rod 183 is unwound from the winding mechanism to loosen the inner wire rod 183.

This, in turn, causes the bottom end of the movable member 134 to be pulled up by the inner wire rod 173 and move up along the front surface of the main body part 41a of the pressure receiving member 41. As the bottom end of the movable member 134 moves upward, the top end of the lumbar support plate 130 also moves upward along the front surface of the main body part 41a of the pressure receiving member 41 and the entire lumbar support plate 130 moves upward while retaining the curvature thereof.

The inner wire rod 183 is wound around the winding mechanism while the inner wire rod 173 is unwound from the winding mechanism to loosen the inner wire rod 173. This, in turn, causes the bottom end of the movable member 134 to be pulled down by the inner wire rod 183 and move downward along the front surface of the main body part 41a of the pressure receiving member 41. As the bottom end of the movable member 134 moves downward, the top end of the lumbar support plate 130 also moves downward along the front surface of the main body part 41a of the pressure receiving member 41 and the entire lumbar support plate 130 moves upward while retaining the curvature thereof.

As shown above, the vertical position of the lumbar support plate 130 is adjusted with the control cables 171 and 181. This adjustment allows the vertical position of the pressure area 137 of the lumbar support plate 130 to be aligned with the waist height of the occupant. Locking the winding mechanism prevents winding or unwinding of the inner wire rods 173 and 183, thus retaining the vertical position of the lumbar support plate 130.

In the seat described above, the adjustment of the curvature and the vertical position of the lumbar support plate 130 can bring the front surface of the backrest 4 into a close contact with the back of the occupant in conformance with the shape thereof. This improves seating comfort.

The lumbar support plate 130, which is assembled to the pressure receiving member 41, moves together with the pressure receiving member 41 in the front-back direction relative to the backrest frame 40. Thus, the lumbar support plate 130 does not prevent the backward movement of the occupant and can provide a satisfactory cushioning performance.

The recess 131, formed on the front surface of the lumbar support plate 130 at the horizontal center, makes a portion of the cushion pad 48 in front of the recess 131 less compressed than other part of the cushion pad 48. This ensures a satisfactory cushioning performance of a portion of the cushion pad 48 in contact with the spine of the occupant and improves seating comfort.

Since the lower portion of the lumbar support plate 130 is divided, the movement of the hip or back of an occupant while the bottom end of the movable member 134 is being fixed causes greater deformation of the right and left sides of the lumbar support plate 130 than the central portion. This enhances the ability of the lumbar support plate 130 to deform in conformity with changes in the posture of the occupant and thus improves the seating comfort.

Eighth Embodiment

Figure 55:
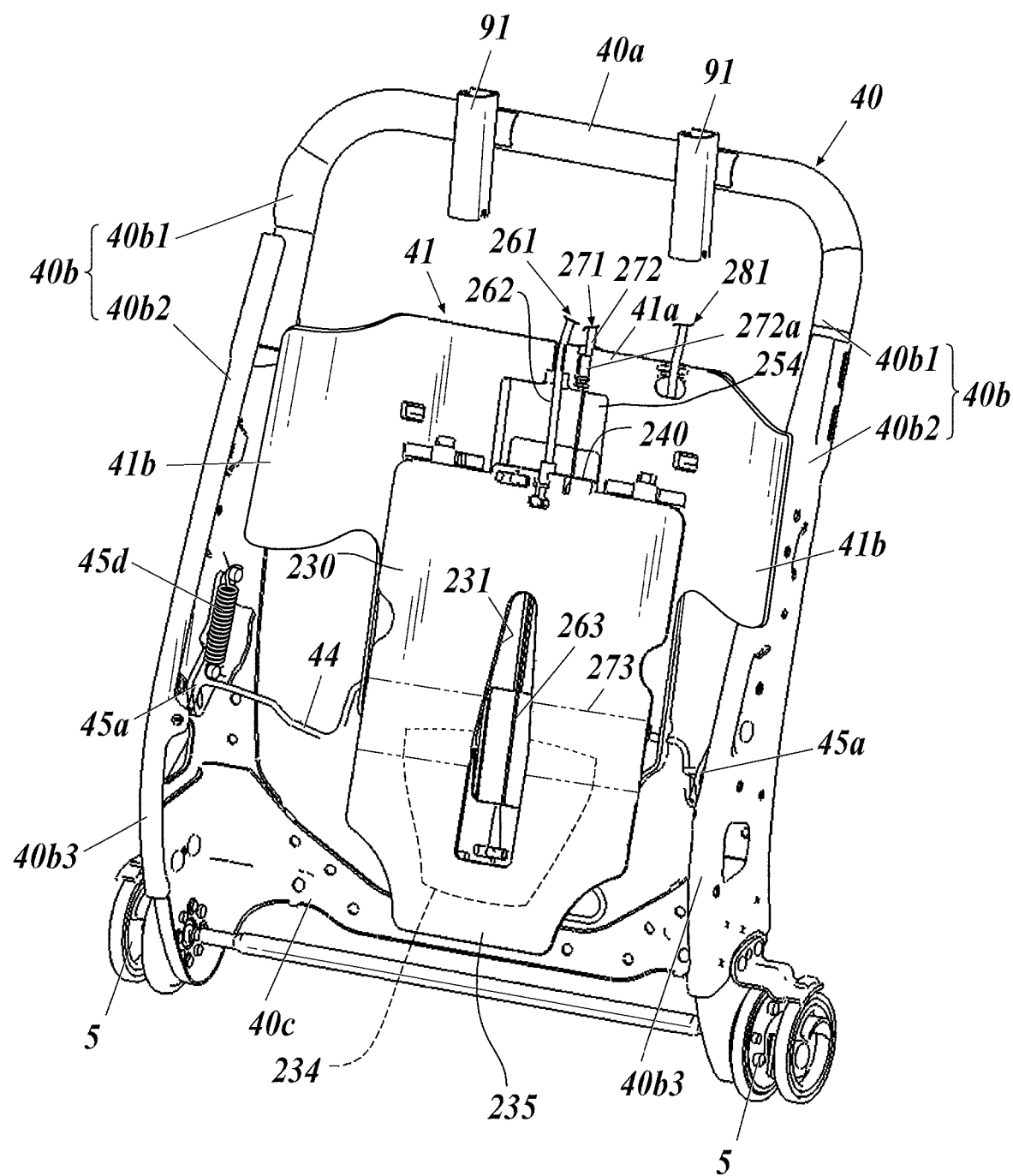
FIG. 55 is a front perspective view of a frame of a backrest according to an eighth embodiment of the present invention.

FIG. 55 is a perspective view of a backrest frame 40 of a seat according to the eighth embodiment of the present invention. The same parts between the seat according to the eighth embodiment and the seat 1 according to the first embodiment are given the same reference numerals. If the same parts are provided in the same manner, the explanation thereof will be omitted if possible. The following description focuses on differences between the seat according to the eighth embodiment and the seat 1 according to the first embodiment.

Differences between the seat according to the eighth embodiment and the seat 1 according to the first embodiment lie in the backrest 4. More specifically, the seat according to the eighth embodiment is provided with a lumbar support plate 230 in front of the main body part 41a of the pressure receiving member 41. In contrast, the seat 1 according to the first embodiment does not include a member equivalent to the lumbar support plate 230 in front of the pressure receiving member 41. The backrest of the seat according to the seventh embodiment is provided in the same manner as that of the seat according to the first embodiment, except for the lumbar support plate 230, which is provided in front of the pressure receiving member 41.

The seat according to the seventh embodiment includes slide rails, a bottom seat, a bottom seat, a recliner mechanism, and a headrest, which are provided in the same manner as the slide rails 2, the bottom seat 3, the recliner mechanism 5, and the headrest 6, which are provided in the seat 1 according to the first embodiment.

The lumbar support plate 230 and relevant items will now be described.

The lumbar support plate 230 is resiliently bent. The lumbar support plate 230 is disposed in front of the main body part 41a such that it faces and is overlaid on the front surface of the main body part 41a. The lumbar support plate 230 is attached to the main body part 41a such that the top end and the bottom end of the lumbar support plate 230 are vertically movable relative to the main body part 41a. At an upward movement of the bottom end of the lumbar support plate 230 relative to the pressure receiving member 41 without any movement of the top end of the lumbar support plate 230, the lumbar support plate 230 is curved such that it protrudes forward. At a downward movement of the bottom end of the lumbar support plate 230 relative to the pressure receiving member 41 without any movement of the top end of the lumbar support plate 230, the curved lumbar support plate 230 is vertically elongated to less protrude forward. At a concurrent vertical movement of the top end and the bottom end of the lumbar support plate 230, the lumbar support plate 230 moves vertically relative to the pressure receiving member 41 while retaining the extent of the curve (curvature).

Figure 56:
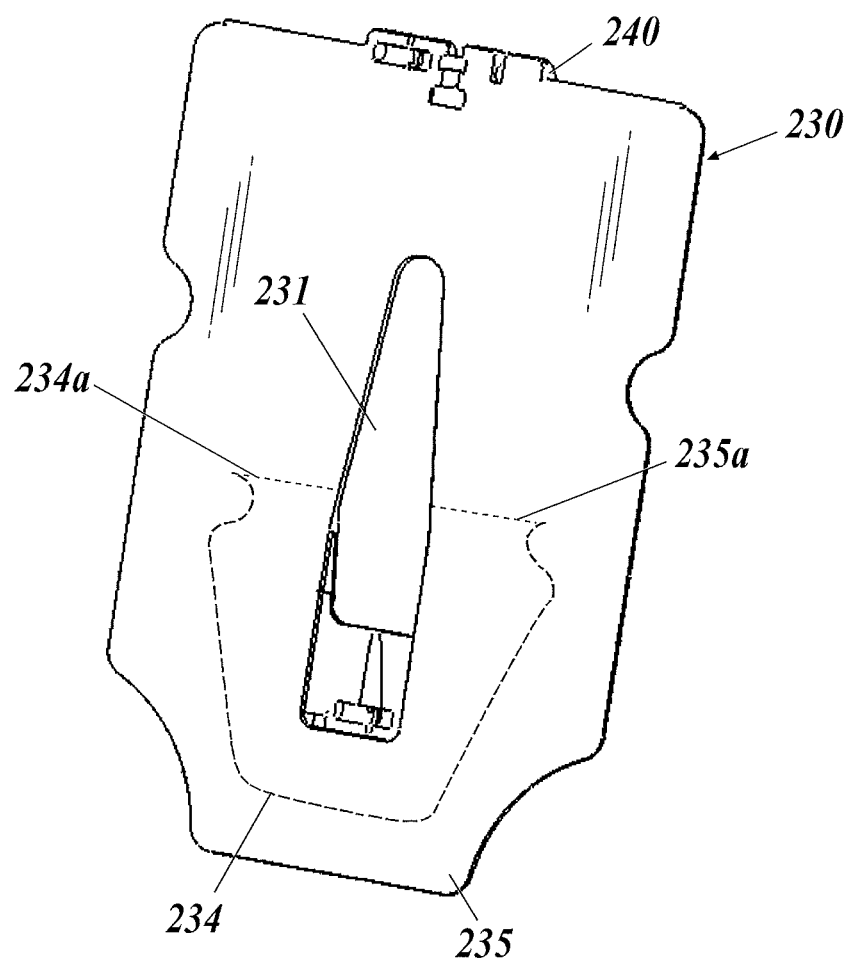
FIG. 56 is a front perspective view of a lumbar support plate of the backrest according to the eighth embodiment of the present invention.
Figure 57:
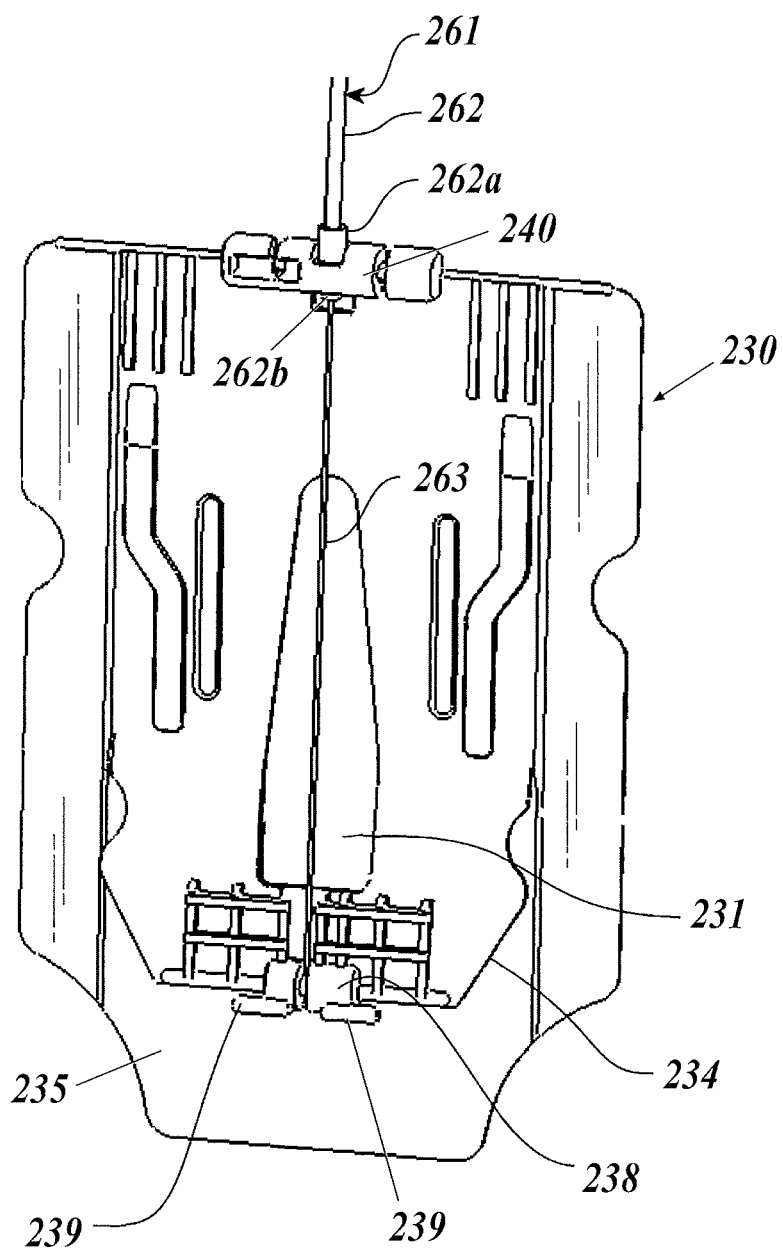
FIG. 57 is a rear perspective view of the lumbar support plate of the backrest according to the eighth embodiment of the present invention.

With reference to FIGS. 55 to 57, the lumbar support plate 230 will now be described in detail. FIG. 56 is a front perspective view of the lumbar support plate 230. FIG. 57 is a rear perspective view of the lumbar support plate 230.

A plate-like movable member 234 is provided in the lower portion of the rear surface of the lumbar support plate 230. A plate-like support member 235 is provided in the lower portion of the front surface of the lumbar support plate 230. More specifically, the lower portion of the lumbar support plate 230 is divided into two parts in the front-back direction: the plate-like support member 235 in front and the plate-like movable member 234 in rear. A top end 235a of the support member 235 and a top end 234a of the movable member 234 are coupled such that the support member 235 and the movable member 234 face each other in the front-back direction. An area on the lumbar support plate 230 from slightly above the top end 235a of the support member 235 and the top end 234a of the movable member 234 to slightly below the ends 235a and 234a is referred to as a pressure area 237. As shown with the two-dot chain lines in FIG. 55, a strip area 237 extending in the right-left direction is the pressure area 237.

The support member 235 is curved so as to protrude diagonally downward to the front in side view.

The lumbar support plate 230 has an opening 231 penetrating in the front-back direction at the horizontal center thereof. The opening 231 is vertically long. The opening 231 starts above the top end 235a of the support member 235 and the top end 234a of the movable member 234 and ends below the top end 235a and the top end 234a thereof in the support member 235 and the movable member 234.

Figure 58:
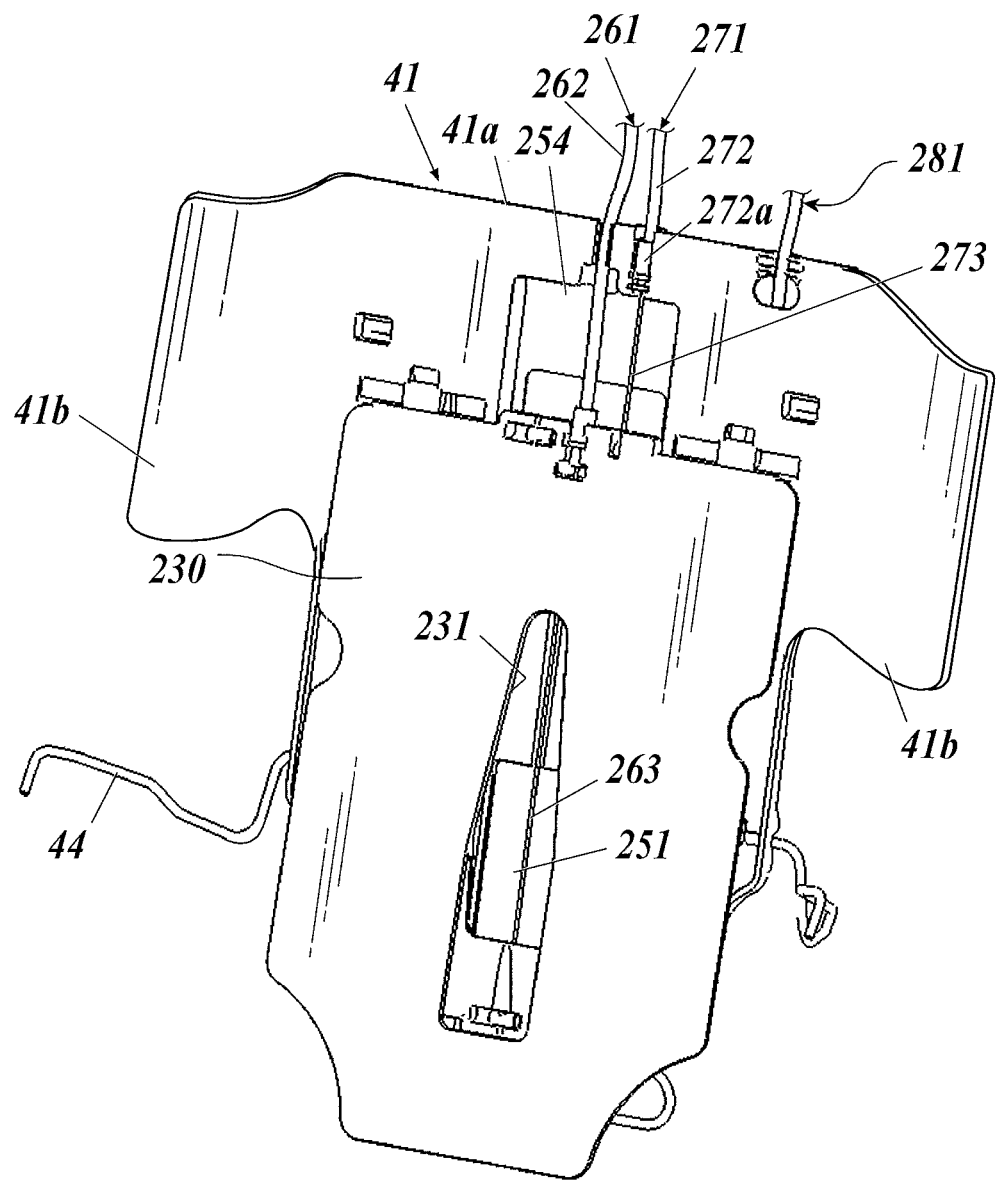
FIG. 58 is a front view of an assembly of the lumbar support plate of the backrest according to the eighth embodiment of the present invention and a pressure receiving member.
Figure 59:
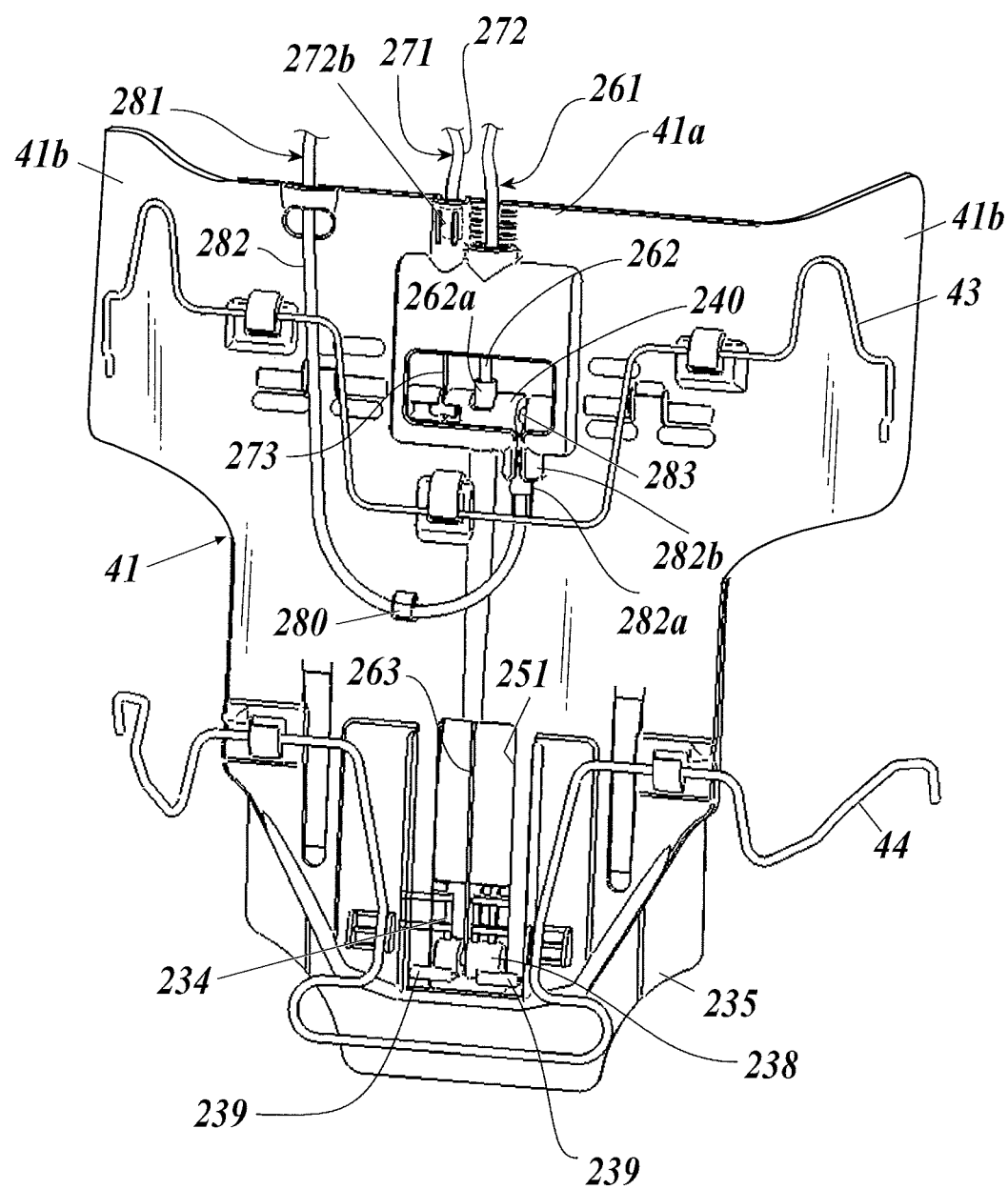
FIG. 59 is a rear perspective view of the assembly of the lumbar support plate of the backrest according to the eighth embodiment assembled and the pressure receiving member.

With reference to FIGS. 55 to 59, how the lumbar support plate 230 and the pressure receiving member 41 are assembled will now be described. FIG. 58 is a front perspective view of an assembly of the lumbar support plate 230 and the pressure receiving member 41. FIG. 59 is a rear perspective view of the assembly of the lumbar support plate 230 and the pressure receiving member 41.

As shown in FIG. 59, the main body part 41a of the pressure receiving member 41 has an opening 251 in the lower portion thereof. The opening 251 has a vertically long rectangular shape (strip) in front view.

As shown in FIGS. 57 and 59, a convex slider 238 is provided at the bottom end of the rear surface of the lumbar support plate 230, more specifically, at the bottom end of the rear surface of the movable member 234. The slider 238 is provided at the horizontal center of the lumbar support plate 230. Sliding bars 239 are provided on the right and left sides of the rear surface of the slider 238. The left sliding bar 239 extends leftward from the slider 238. The right sliding bar 239 extends rightward from the slider 238.

As shown in FIG. 59, the slider 238 is fit to the opening 251 to cause the opening 231 to constrain the right-left movement of the slider 238. The sliding bars 239 come into contact with the rear surface of the main body part 41a of the pressure receiving member 41 on the right and left sides of the opening 251. The rear surface of the movable member 234 comes into contact with the front surface of the main body part 41a of the pressure receiving member 41. The main body part 41a of the pressure receiving member 41 is disposed between the sliding bars 239 and the movable member 234 to cause the movable member 234 to constrain an anteroposterior movement of the sliding bars 239 and the slider 238. The lumbar support plate 230 is attached to the main body part 41a such that the sliding bars 239 can slide vertically along the rear surface of the main body part 41a of the pressure receiving member 41, the bottom end of the rear surface of the movable member 234 can slide vertically along the rear surface of the main body part 41a of the pressure receiving member 41, and such that the bottom end of the lumbar support plate 230 can move vertically relative to the main body part 41a.

As shown in FIG. 58, the main body part 41a of the pressure receiving member 41 has a receiving recess 254 in the upper portion thereof. The receiving recess 254 has a rectangular shape.

As shown in FIG. 57, a slider 240 is provided in the area from the upper end of the rear surface of the lumbar support plate 230 to the top end surface of the lumbar support plate 230. The area from the rear to upper surface of the slider 240 has a cylinder face around a horizontal central axis.

As shown in FIGS. 55, 58, and 59, the slider 240 fits in the receiving recess 254 and comes into contact with the bottom of the receiving recess 254 to cause the receiving recess 154 to constrain horizontal and backward movements of the slider 240. This allows the slider 240 to move vertically, and the lumbar support plate 230 is attached to the main body part 41a such that the top end of the lumbar support plate 230 can move vertically. Inner wire rods 273 and 283, which are described in detail later, prevent the top end of the lumbar support plate 230 from being away from the front surface of the pressure receiving member 41 frontward.

As shown in FIGS. 55, 57, 58, and 59, the lumbar support plate 230 is bent by a control cable 261. The control cable 261 includes an outer tube 262 and an inner wire rod 263.

As shown in FIG. 57, the outer tube 262 is routed from the top end of the lumbar support plate 230 through the rear surface of the lumbar support plate 230. The outer tube 262 has an end 262a directed downward. The end 262a is fixed to the rear surface of the lumbar support plate 230 above the movable member 234 by an engagement piece 262b.

The inner wire rod 263 extends through the outer tube 262. The inner wire rod 263 is drawn downward from the end 262a of the outer tube 262. The inner wire rod 263 has one end coupled to the rear surface of the movable member 234 below the top end of the movable member 234. More specifically, the end of the inner wire rod 263 is coupled to the bottom end of the rear surface of the movable member 234.

The inner wire rod 263 has other end drawn from the other end of the outer tube 262. The drawn portion is wound around, for example, a winding mechanism (or an operating part for bending). The inner wire rod 263 can be wound around the winding mechanism or unwound from the winding mechanism. The winding mechanism is disposed, for example, on a side of the backrest 4 or a side of the bottom seat 3.

As shown in FIGS. 55, 58, and 59, the lumbar support plate 230 is lifted up by a control cable 271 and lowered by a control cable 281. The control cable 271 includes an outer tube 272 and an inner wire rod 273. The control cable 281 includes an outer tube 282 and an inner wire rod 283.

As shown in FIGS. 58 and 59, the outer tube 272 is routed from above the pressure receiving member 41 to the front thereof. The outer tube 272 has an end 272a directed downward. The end 172a is fixed to the front surface of the lumbar support plate 230 above the receiving recess 254 by an engagement piece 272b disposed at the top end of the front surface of the pressure receiving member 41.

The inner wire rod 273 extends through the outer tube 272. The inner wire rod 273 is drawn from the end 272a of the outer tube 272. The inner wire rod 273 has one end coupled to the top end of the lumbar support plate 230. The coupling portion between the inner wire rod 273 and the lumbar support plate 230 is below the end 272a of the outer tube 272.

As shown in FIGS. 58 and 59, the outer tube 282 is routed from above the pressure receiving member 41 to the rear thereof and fixed to the rear surface of the pressure receiving member 41 by an engagement piece 280 disposed on the rear surface of the pressure receiving member 41. The outer tube 282 is folded back upward at the engagement piece 280. The end 282a of the outer tube 282 penetrates through the surface below the receiving recess 254 and is fixed to the front surface of the pressure receiving member 41 with the engagement piece 282b. The end 282a of the outer tube 282 is directed upward.

The inner wire rod 283 extends through the outer tube 282. The inner wire rod 283 is drawn upward from the end 282a of the outer tube 282 and has one end coupled to the top end of the lumbar support plate 230. The coupling portion between the inner wire rod 283 and the lumbar support plate 230 is above the end 272a of the outer tube 272.

The inner wire rods 273 and 283 have other ends drawn from the other ends of the outer tubes 272 and 282, respectively. The drawn portions are wound around, for example, a winding mechanism (or an operating part for up-down movement). The inner wire rod 273 can be wound around the winding mechanism while the inner wire rod 283 can be unwound from the winding mechanism. The inner wire rod 273 can be unwound from the winding mechanism while the inner wire rod 283 can be wound around the winding mechanism. The winding mechanism is disposed, for example, on a side of the backrest 4 or a side of the bottom seat 3.

The operation and use of the seat according to the eighth embodiment will now be described.

The inner wire rod 263 wound around the winding mechanism causes the inner wire rod 263 to be drawn into the outer tube 162. This, in turn, causes the bottom end of the movable member 234 to be pulled up by the inner wire rod 263 and move upward along the front surface of the main body part 41a of the pressure receiving member 41. As the bottom end of the movable member 234 moves up, the movable member 234 gets erected relative to the front surface of the main body part 41a. This causes the lumbar support plate 230 to be resiliently curved into a mountain shape. As the curvature of the lumbar support plate 230 increases, the pressure area 237 travels frontward more away from the front surface of the pressure receiving member 41. The pressure area 237 of the lumbar support plate 230 presses aback receiving part 48a of the cushion pad 48 forward.

The inner wire rod 263 unwound from the winding mechanism loosens the inner wire rod 263. Force to restore the lumbar support plate 230 to an original shape reduces the height of mountain of the lumbar support plate 230 to decrease the curvature of the lumbar support plate 230. As the curvature decreases, the movable member 234 is more inclined toward the front surface of the main body part 41a, and the bottom end of the movable member 234 moves downward along the front surface of the main body part 41a of the pressure receiving member 41. The inner wire rod 263 is drawn from the end 262a of the outer tube 262. The pressure area 237 approaches the front surface of the pressure receiving member 41 and the back receiving part 48a of the cushion pad 48 retreats backward.

The inner wire rod 273 is wound around the winding mechanism while the inner wire rod 273 is unwound from the winding mechanism to loosen the inner wire rod 283. This, in turn, causes the top end of the lumbar support plate 230 to be pulled up by the inner wire rod 273 and move upward along the front surface of the main body part 41a of the pressure receiving member 41. As the top end of the lumbar support plate 230 moves upward, the bottom end of the movable member 234 also moves upward along the front surface of the main body part 41a of the pressure receiving member 41 and the entire lumbar support plate 130 moves upward while retaining the curvature thereof.

The inner wire rod 283 is wound around the winding mechanism while the inner wire rod 273 is unwound from the winding mechanism to loosen the inner wire rod 273. This, in turn, causes the top end of the lumbar support plate 230 to be pulled down by the inner wire rod 283 and move downward along the front surface of the main body part 41a of the pressure receiving member 41. As the top end of the lumbar support plate 230 moves downward, the bottom end of the movable member 234 also moves downward along the front surface of the main body part 41a of the pressure receiving member 41 and the entire lumbar support plate 230 moves upwards while retaining the curvature thereof.

In the seat described above, the adjustment of the curvature and the vertical position of the lumbar support plate 230 can bring the front surface of the backrest 4 into a close contact with the back of the occupant in conformance with the shape thereof. This improves seating comfort.

The lumbar support plate 230, which is assembled to the pressure receiving member 41, moves together with the pressure receiving member 41 in the front-back direction relative to the backrest frame 40. Thus, the lumbar support plate 230 does not prevent the backward movement of the occupant and can provide a satisfactory cushioning performance.

The opening 231, formed on the front surface of the lumbar support plate 230 at the horizontal center, makes a portion of the cushion pad 48 in front of the opening 231 less compressed than other portion of the cushion pad 48. This ensures a satisfactory cushioning performance of a portion of the cushion pad 48 in contact with the spine of the occupant and improves seating comfort.

Since the lower portion of the lumbar support plate 230 is divided, the movement of the hip or back of an occupant while the bottom end of the movable member 234 is being fixed causes deformation of the support member 235. This enhances the ability of the lumbar support plate 230 to deform in conformity with caused by changes in the posture of the occupant and thus improves the seating comfort.

INDUSTRIAL APPLICABILITY

The present invention is applicable to a seat including a pressure receiving member that is disposed inside a backrest and is movable in the front-back direction.

REFERENCE NUMERALS 1, 1A, 1B, 1C, 1D, 1E seat
4 backrest
40 backrest frame
40a upper frame segment
40b side frame segment
40c lower frame segment
pressure receiving member
41a main body part
41b extending part
41b1 front edge of extending part
41f claw (coupling portion between wire rod and pressure receiving member)
48 cushion pad
48a back receiving part
48b bank part
48e slit
48g recess
48h step
49 skin
49a pull strip (pulling member)
49b hook and loop fastener
60 coupling wire (wire)
63 bent segment
71, 72 main body airbag
77L and 77R extending part airbag

The invention claimed is:

1. A vehicle seat, comprising:
right and left side frame segments disposed in parallel in a right-left direction;
a pressure receiving member disposed between the side frame segments, the pressure receiving member being movable in a front-back direction; and
airbags,
wherein
the pressure receiving member includes:
a main body part; and
right and left extending parts extending rightward and leftward continuously from right and left sides of the main body part, and
the airbags include:
a main body airbag mounted on the main body part; and
extending part airbags which are mounted on the extending parts and which each include a dent which is at a position farther away from a center of the vehicle seat in the right-left direction than the main body airbag.

2. The vehicle seat according to claim 1, wherein the main body airbag is between the extending part airbags.

3. The vehicle seat according to claim 1, wherein the main body airbag includes a straight portion that extends in the right-left direction.

4. The vehicle seat according to claim 1, wherein
the dent is formed on a right edge or a left edge of each of the extending part airbags, whichever is closer to the center of the vehicle seat in the right-left direction, and
the dent is dented toward an outer side of the vehicle seat in the right-left direction.

5. A vehicle seat, comprising:
a backrest; and
a bottom seat rotatably connected to the backrest,
wherein
the backrest includes:
right and left side frame segments disposed in parallel in a right-left direction;
a pressure receiving member disposed between the side frame segments, the pressure receiving member being movable in a front-back direction; and
airbags,
the pressure receiving member includes:
a main body part; and
right and left extending parts extending rightward and leftward continuously from right and left sides of the main body part,
the airbags include:
a main body airbag mounted on the main body part; and
extending part airbags which are mounted on the extending parts and which each include a dent which is at a position farther away from a center of the vehicle seat in the right-left direction than the main body airbag, and
the main body airbag is below the extending part airbags.

6. The vehicle seat according to claim 5, wherein a bottom of the main body airbag is below bottoms of the extending part airbags.

7. The vehicle seat according to claim 5, wherein
the backrest further comprises a cross member that bridges the side frame segments above the pressure receiving member, and
the cross member includes a bent portion in a range between the extending part airbags in the right-left direction.

8. The vehicle seat according to claim 7, wherein the main body airbag includes a straight portion that extends in the right-left direction.

9. The vehicle seat according to claim 8, wherein the straight portion of the main body airbag is substantially parallel to the cross member.

10. The vehicle seat according to claim 5, wherein
the dent is formed on a right edge or a left edge of each of the extending part airbags, whichever is closer to the center of the vehicle seat in the right-left direction, and
the dent is dented toward an outer side of the vehicle seat in the right-left direction.

11. The vehicle seat according to claim 10, wherein the dent is at a center of each of the extending part airbags in a vertical direction.

12. The vehicle seat according to claim 5, further comprising:
a headrest which is mounted on a top end of the backrest to support a head of an occupant;
a recliner mechanism that couples an bottom end of the backrest with a rear end of the bottom seat; and
slide rails on which the bottom seat moves in the front-back direction,
wherein
the backrest further comprises:
a cushion pad that covers the side frame segments, the pressure receiving member, and the airbags; and
a skin that covers the cushion pad, and
the bottom seat comprises a frame, a cushion pad that covers the frame, and a skin that covers the cushion pad.

* * * * *